(12) United States Patent
Pester, III

(10) Patent No.: US 7,903,806 B1
(45) Date of Patent: Mar. 8, 2011

(54) EXPERT CALL ANALYZER AND NEXT GENERATION TELEPHONY NETWORK CONFIGURATION SYSTEM

(75) Inventor: Eugene M. Pester, III, Santa Cruz, CA (US)

(73) Assignee: Canoga Perkins Corp., Chatsworth, CA (US)

(*) Notice: Subject to any disclaimer, the term of this patent is extended or adjusted under 35 U.S.C. 154(b) by 0 days.

(21) Appl. No.: 09/478,078

(22) Filed: Jan. 5, 2000

(51) Int. Cl.
*H04M 7/00* (2006.01)

(52) U.S. Cl. .................. 379/230; 379/32.01; 379/133

(58) Field of Classification Search ............... 379/88.17, 379/265.09, 372, 377, 386, 32.01, 133, 900, 379/908, 88.19; 370/352; 709/204, 206, 709/227
See application file for complete search history.

(56) References Cited

U.S. PATENT DOCUMENTS

| | | | |
|---|---|---|---|
| 3,916,123 A * | 10/1975 | Werner et al. | 377/15 |
| 4,935,958 A | 6/1990 | Morganstein et al. | |
| 5,023,906 A | 6/1991 | Novas | |
| 5,388,150 A * | 2/1995 | Schneyer et al. | 379/88.19 |
| 5,448,624 A | 9/1995 | Hardy et al. | |
| 5,483,593 A | 1/1996 | Gupta et al. | |
| 5,590,182 A | 12/1996 | Stevens et al. | |
| 5,787,164 A | 7/1998 | Haines et al. | |
| 5,884,032 A * | 3/1999 | Bateman et al. | 709/204 |
| 5,946,386 A * | 8/1999 | Rogers et al. | 379/265.09 |
| 6,049,602 A * | 4/2000 | Foladare et al. | 379/265.04 |
| 6,094,479 A * | 7/2000 | Lindeberg et al. | 379/220.01 |
| 6,130,933 A * | 10/2000 | Miloslavsky | 379/90.01 |

* cited by examiner

*Primary Examiner* — Ahmad F. Matar
*Assistant Examiner* — Bing Bui
(74) *Attorney, Agent, or Firm* — Philip O. Post

(57) ABSTRACT

A method and apparatus for determining and monitoring the status of telephone calls in a Next Generation Telephony Network (NGTN) is disclosed. The method detects protocols occurring between two or more network elements of a telecommunication circuit and control protocol used to initiate or to react to the events generated by the network elements. One sensor is connected to the telecommunication circuits to sense raw call progress signaling information indicative of an event relative to the call on the monitored line. Another sensor is connected to call control channel of a NGTN network element. The sensors are connected to a call processing system. The call processing system includes a call progress event analyzer module consisting of a call progress event processor and a call progress state machine, a NGTN event processor and a NGTN state machine. The call processing system also includes a protocol independent call processor module and a multi protocol analysis module. Raw call progress signaling information and NGTN message information are converted to logical call handling events and forwarded to the protocol independent call processor module for processing. The protocol independent call processor module includes a timer processor to keep track of timing of events. The call processing system also includes an alarm handler to keep track and generate alarms when an error condition occur after processing the call progress events and the NGTN message events.

23 Claims, 48 Drawing Sheets

| Msg. Type | Time (ms) | Side 1 ABCD | Side 2 ABCD | Side 1 CPT | Side 2 CPT | Ckt ID |
|---|---|---|---|---|---|---|
| Supervision Msg. 1 <CR> | 0000.000 | 0101 | 0101 | | | 1<CR> |
| Supervision Msg. 2 <CR> | 0320.000 | 0000 | 0101 | | | 1<CR> |
| Supervision Msg. 3 <CR> | 0322.000 | 0101 | 0101 | | | 1<CR> |
| Supervision Msg. 4 <CR> | 0326.000 | 0000 | 0101 | | | 1<CR> |
| Supervision Msg. 5 <CR> | 0328.000 | 0101 | 0101 | | | 1<CR> |
| Supervision Msg. 6 <CR> | 0329.455 | 0101 | 1111 | | | 1<CR> |
| Supervision Msg. 7 <CR> | 1565.100 | 0101 | 0101 | | | 1<CR> |

FIG. 3a

| Msg. Type | Time Stamp | Raw Signal | Physical Event |
|---|---|---|---|
| Supervision Msg. 1 <CR> | 0000.000 | 0101,0101 | On Hook |
| Supervision Msg. 2 <CR> | 0320.000 | 0000,0101 | Machine Ring On |
| Supervision Msg. 3 <CR> | 0322.000 | 0101,0101 | Machine Ring Off |
| Supervision Msg. 4 <CR> | 0326.000 | 0000,0101 | Machine Ring On |
| Supervision Msg. 5 <CR> | 0328.000 | 0101,0101 | Machine Ring Off |
| Supervision Msg. 6 <CR> | 0329.455 | 0101,1111 | Off Hook |
| Supervision Msg. 7 <CR> | 1565.100 | 0101,0101 | On Hook |

FIG. 3b

| Msg. Type | Time Stamp | Raw Signal | Physical Event | State |
|---|---|---|---|---|
| Supervision Msg. 1 <CR> | 0000.000 | 0101,0101 | On Hook | Idle |
| Supervision Msg. 2 <CR> | 0320.000 | 0000,0101 | Machine Ring On | Ring On |
| Supervision Msg. 3 <CR> | 0322.000 | 0101,0101 | Machine Ring Off | Ring Off |
| Supervision Msg. 4 <CR> | 0326.000 | 0000,0101 | Machine Ring On | Ring On |
| Supervision Msg. 5 <CR> | 0328.000 | 0101,0101 | Machine Ring Off | Ring Off |
| Supervision Msg. 6 <CR> | 0329.455 | 0101,1111 | Off Hook | Answer |
| Off Hook Timer | 0331.455 | | | Stable Call |
| Supervision Msg. 7 <CR> | 1565.100 | 0101,0101 | On Hook | Station on Hook |

FIG. 3c

| Msg. Type | Time (ms) | | Ckt ID |
|---|---|---|---|
| CA_NotificationRequest | 0000.000 | RQNT 1201 endpoint-1@rgw-2567.whatever.net SGCP 1.1<br>N: ca@cal.whatever.net:5678<br>R: hd | 1<CR> |
| GW_Ack | 0000.123 | 200 1201 OK | 1<CR> |
| CA_NotificationRequest | 0319.856 | RQNT 1202 endpoint-1@rgw-2567.whatever.net SGCP 1.1<br>N: ca@cal.whatever.net:5678<br>R: hd<br>S: rg | 1<CR> |
| GW_Ack | 0319.947 | 200 1202 OK | 1<CR> |
| CA_Notify | 0329.571 | NTFY 2001 endpoint-1@rgw-2567.whatever.net SGCP 1.1<br>N: ca@cal.whatever.net:5678<br>O: hd | 1<CR> |
| CA_Ack | 0330.023 | 200 2001 OK | 1<CR> |
| CA_NotificationRequest | 0332.838 | RQNT 1203 endpoint-1@rgw-2567.whatever.net SGCP 1.<br>N: ca@cal.whatever.net:5678<br>R: hu | 1<CR> |
| GW_Ack | 0332.927 | 200 1203 OK | 1<CR> |
| CA_Notify | 1565.367 | NTFY 2002 endpoint-1@rgw-2567.whatever.net SGCP 1.1<br>N: ca@cal.whatever.net:5678<br>O: hu | 1<CR> |
| CA_Ack | 1565.501 | 200 2002 OK | 1<CR> |
| CA_NotificationRequest | 1572.492 | RQNT 1204 endpoint-1@rgw-2567.whatever.net SGCP 1.1<br>N: ca@cal.whatever.net:5678<br>R: hd | 1<CR> |
| GW_Ack | 1572.612 | 200 1204 OK | 1<CR> |

FIG. 3d

| Msg. Type | Time Stamp | Raw Message | Ckt ID |
|---|---|---|---|
| CA_NotificationRequest | 0000.000 | CA_RQNT,1201,R: hd | 1<CR> |
| GW_Ack | 0000.123 | GW_ACK,1201,200 | 1<CR> |
| CA_NotificationRequest | 0319.856 | CA_RQNT,1202,S: rg | 1<CR> |
| GW_Ack | 0319.947 | GW_ACK,1202,200 | 1<CR> |
| GW_Notify | 0329.571 | GW_NTFY,2001,O: hd | 1<CR> |
| CA_Ack | 0330.023 | CA_ACK,2001,200 | 1<CR> |
| CA_NotificationRequest | 0332.838 | CA_RQNT,1203,R: hu | 1<CR> |
| GW_Ack | 0332.927 | GW_ACK,1203,200 | 1<CR> |
| GW_Notify | 1565.367 | GW_NTFY,2002,O: hu | 1<CR> |
| CA_Ack | 1565.501 | CA_ACK,2002,200 | 1<CR> |
| CA_NotificationRequest | 1572.492 | CA_RQNT,1204,R: hd | 1<CR> |
| GW_Ack | 1572.612 | GW_ACK,1204,200 | 1<CR> |

FIG. 3e

| Msg Type | Time Stamp | Raw Message | Call Control Event | State |
|---|---|---|---|---|
| CA_NotificationRequest | 0000.000 | CA_RQNT,1201,R:hd | Wait for OffHook | IdleWaiting |
| GW_Ack | 0000.123 | GW_ACK,1201,200 | Command Accepted | IdleReady |
| CA_NotificationRequest | 0319.856 | CA_RQNT,1202,S:rg | Ring Phone | AlertingStart |
| GW_Ack | 0319.947 | GW_ACK,1202,200 | Command Accepted | Alerting |
| GW_Notify | 0329.571 | GW_NTFY,2001,O:hd | OffHook | CallAnswered |
| CA_Ack | 0330.023 | CA_ACK,2001,200 | Information Accepted | StableCall |
| CA_NotificationRequest | 0332.838 | CA_RQNT,1203,R:hu | Wait for OffHook | StableCallWaiting |
| GW_Ack | 0332.927 | GW_ACK,1203,200 | Command Accepted | StableCallArmed |
| GW_Notify | 1565.367 | GW_NTFY,2002,O:hu | On Hook | Disconnect |
| CA_Ack | 1565.501 | CA_ACK,2002,200 | Information Accepted | Idle |
| CA_NotificationRequest | 1572.492 | CA_RQNT,1204,R:hd | Wait for OffHook | IdleWaiting |
| GW_Ack | 1572.612 | GW_ACK,1204,200 | Command Accepted | IdleReady |

FIG. 3f

| Time Stamp | Current Call Progress State | Current NGTN Control State | Current Analysis State | New Analysis State |
|---|---|---|---|---|
| 0000.123 | Idle | IdleReady | Idle | Idle |
| 0319.856 | Idle | AlertingStart | Idle | CircuitReady |
| 0319.947 | Idle | Alerting | CircuitReady | AlertingReady |
| 0320.000 | Ring On | Alerting | AlertingReady | AlertingNormal |
| 0322.000 | Ring Off | Alerting | AlertingNormal | AlertingNormal |
| 0326.000 | Ring On | Alerting | AlertingNormal | AlertingNormal |
| 0328.000 | Ring Off | Alerting | AlertingNormal | AlertingNormal |
| 0329.455 | Answer | Alerting | AlertingNormal | StopRinging |
| 0329.571 | Answer | OffHook | StopRinging | RingingStopped |
| 0330.023 | Answer | StableCall | RingingStopped | StableCallWaiting |
| 0331.455 | Stable Call | StableCall | StableCallWaiting | ValidCall |
| 0332.838 | Stable Call | StableCallWaiting | ValidCall | DisconnectWaiting |
| 0332.927 | Stable Call | StableCallArmed | DisconnectWaiting | DisconnectArmed |
| 1565.100 | Station On Hook | StableCallArmed | DisconnectArmed | Disconnect |
| 1565.367 | Station On Hook | Disconnect | Disconnect | CallClearing |
| 1565.501 | Station On Hook | Idle | CallClearing | ValidEndOfCall |
| 1572.492 | Station On Hook | IdleWaiting | ValidEndOfCall | ResetStart |
| 1572.612 | Station On Hook | IdleReady | ResetStart | Idle |

FIG. 3g

| Time Stamp | Current Call Progress State | Current NGTN Control State | Current Analysis State | New Analysis State |
|---|---|---|---|---|
| 0000.123 | Idle | IdleReady | Idle | Idle |
| 0319.856 | Idle | AlertingStart | Idle | CircuitReady |
| 0319.947 | Idle | Alerting | CircuitReady | AlertinReady |
| 0321.949 | Idle | Alerting | AlertingReady | AlertTimeOut |
| 0323.949 | Idle | Alerting | AlertTimeOut | GW_ErrNoRinging |
| 0353.955 | Idle | Disconnect | GW_ErrNoRinging | CallCancel |
| 0354.129 | Idle | Idle | CallCancel | InvalidCall |
| 0363.013 | Idle | IdleWaiting | InvalidCall | ResetStart |
| 0363.131 | Idle | IdleReady | ResetStart | Idle |

FIG. 3h

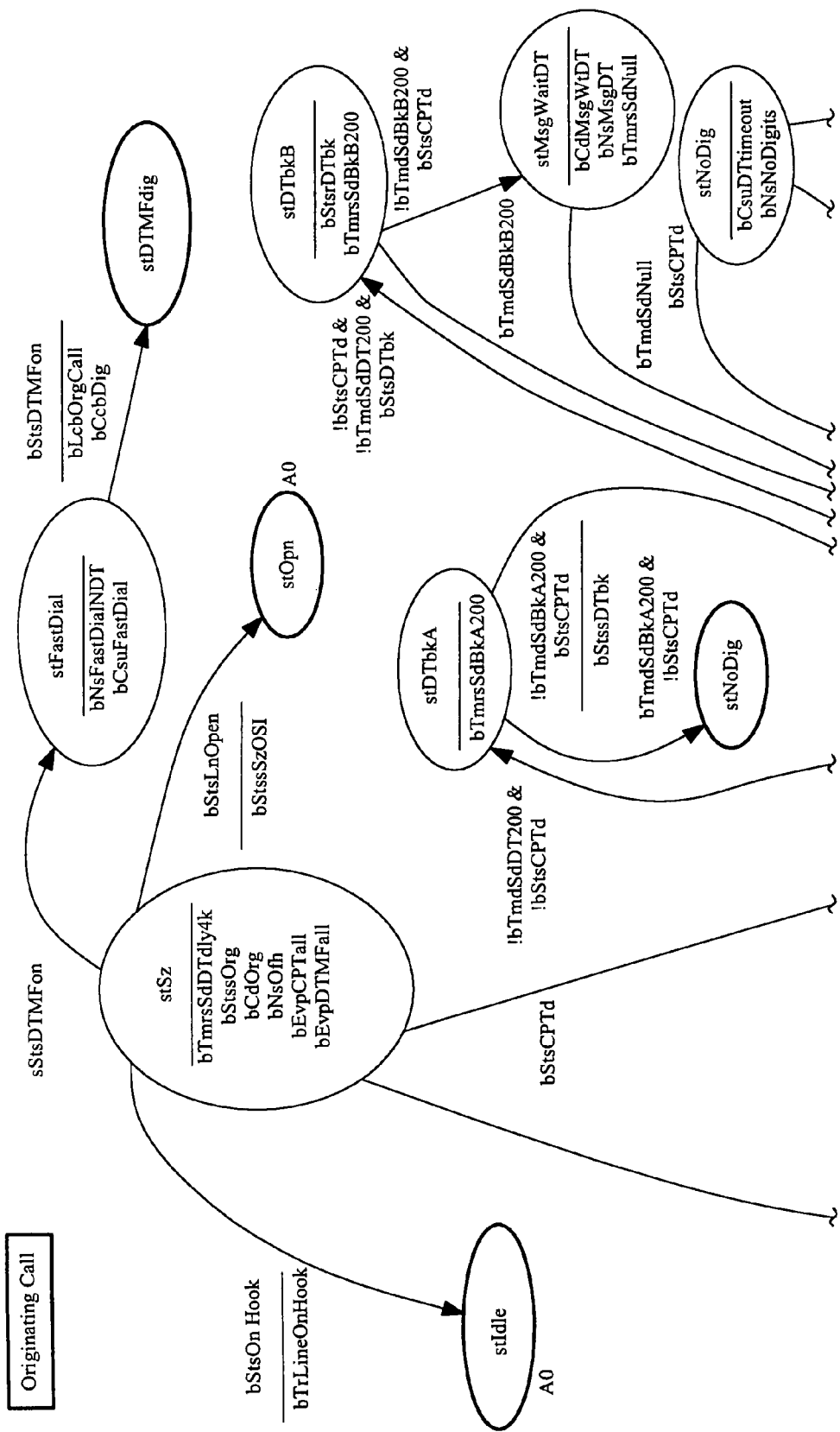
FIG. 6g1

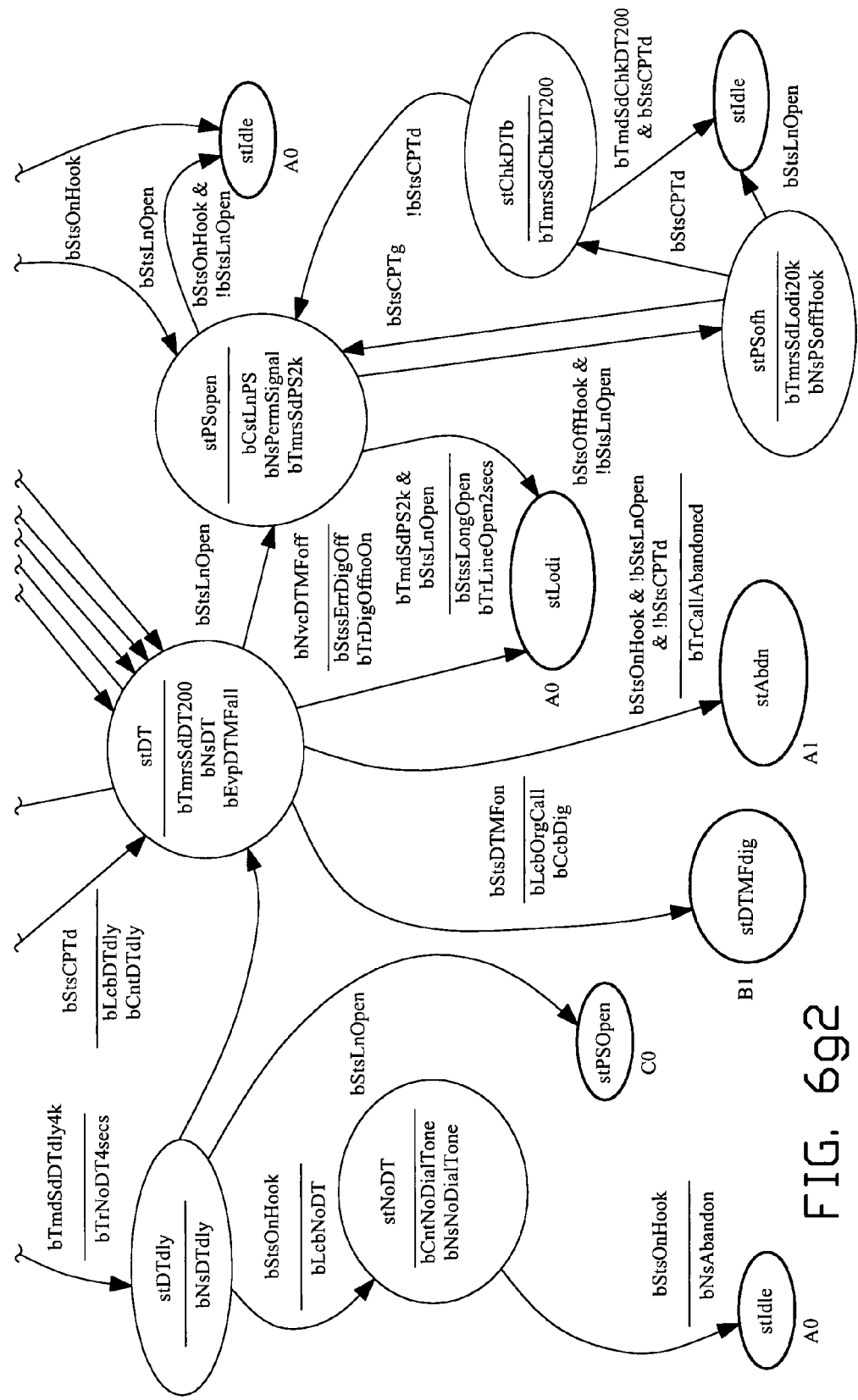
FIG. 6g2

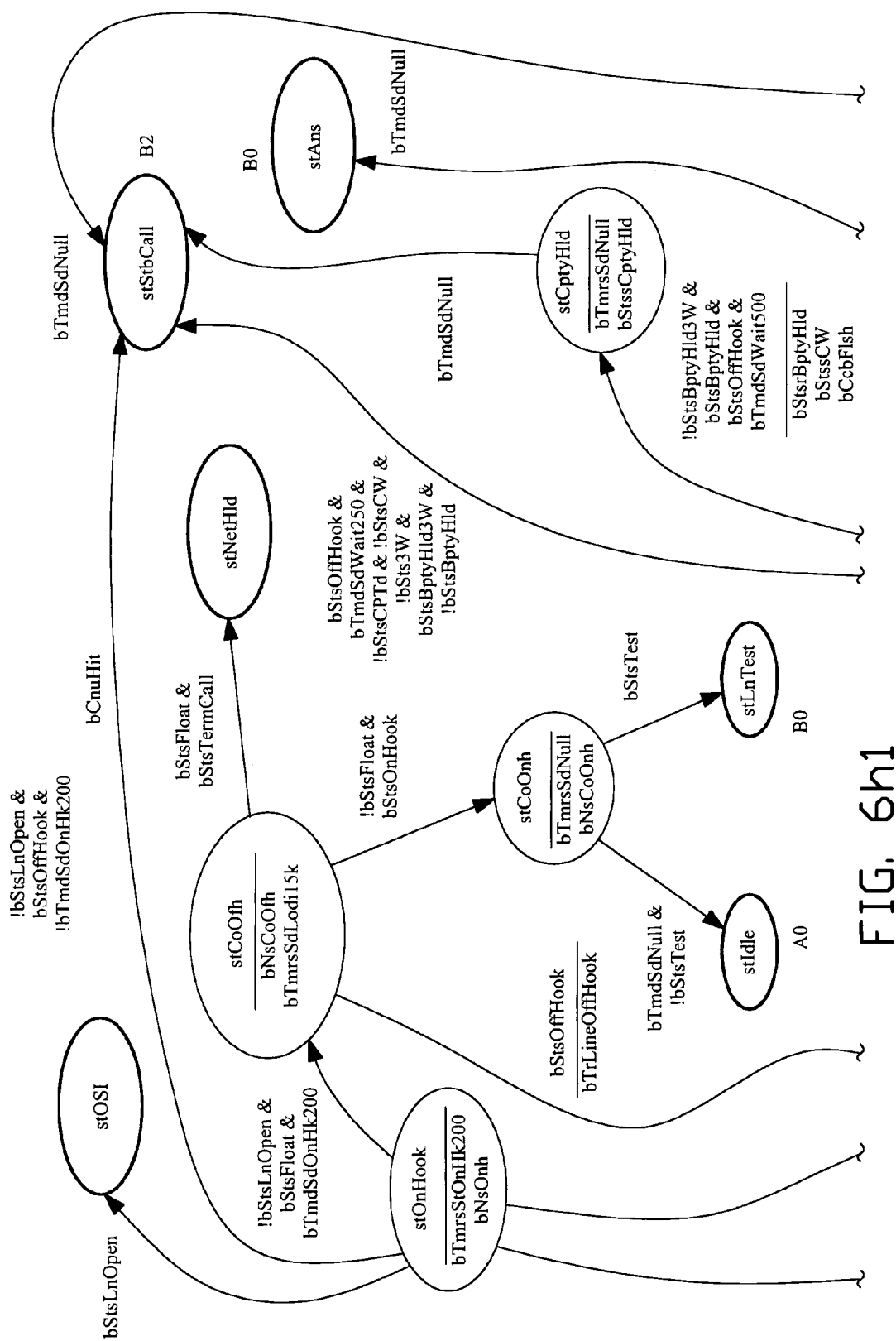
FIG. 6h1

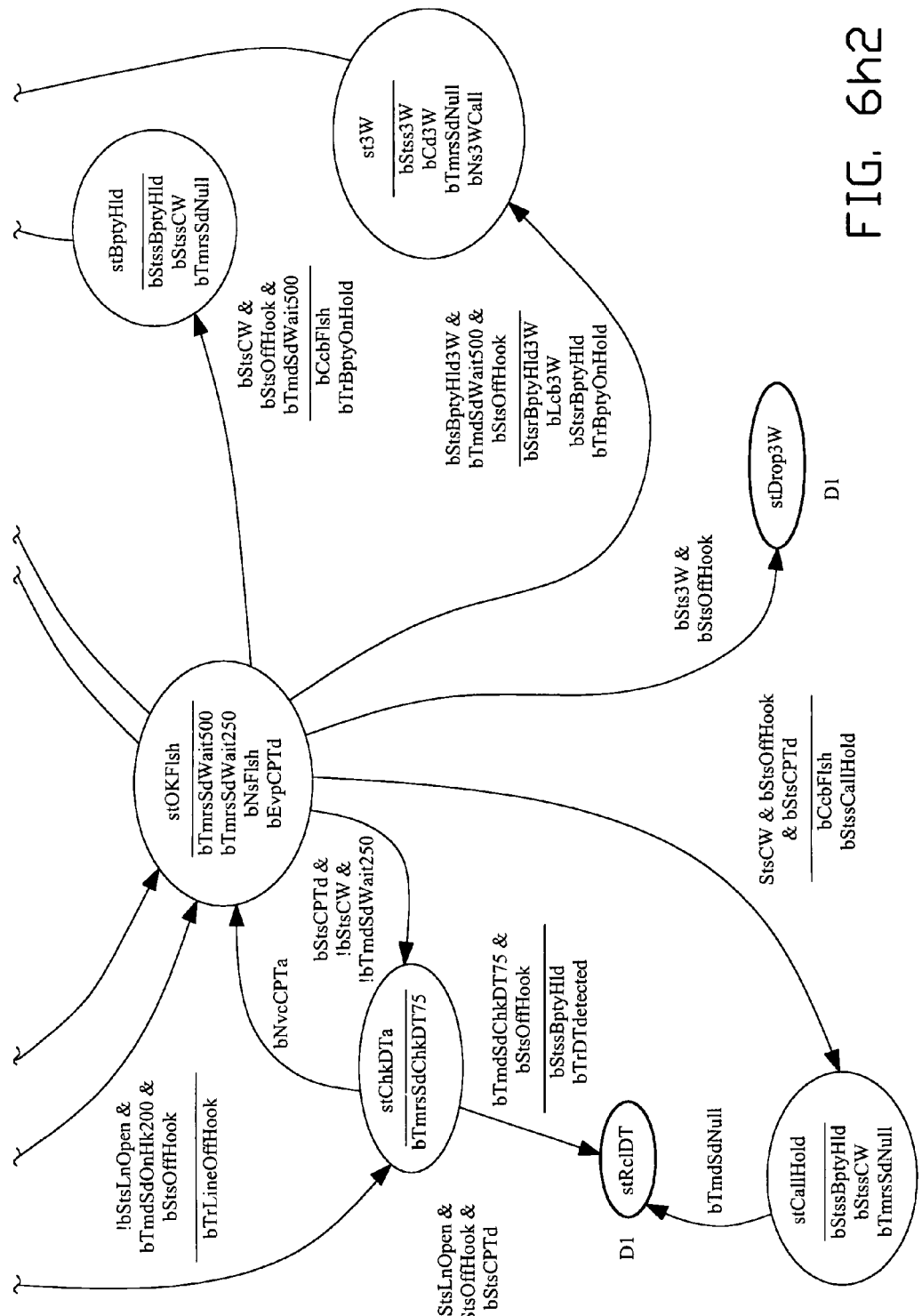
FIG. 6h2

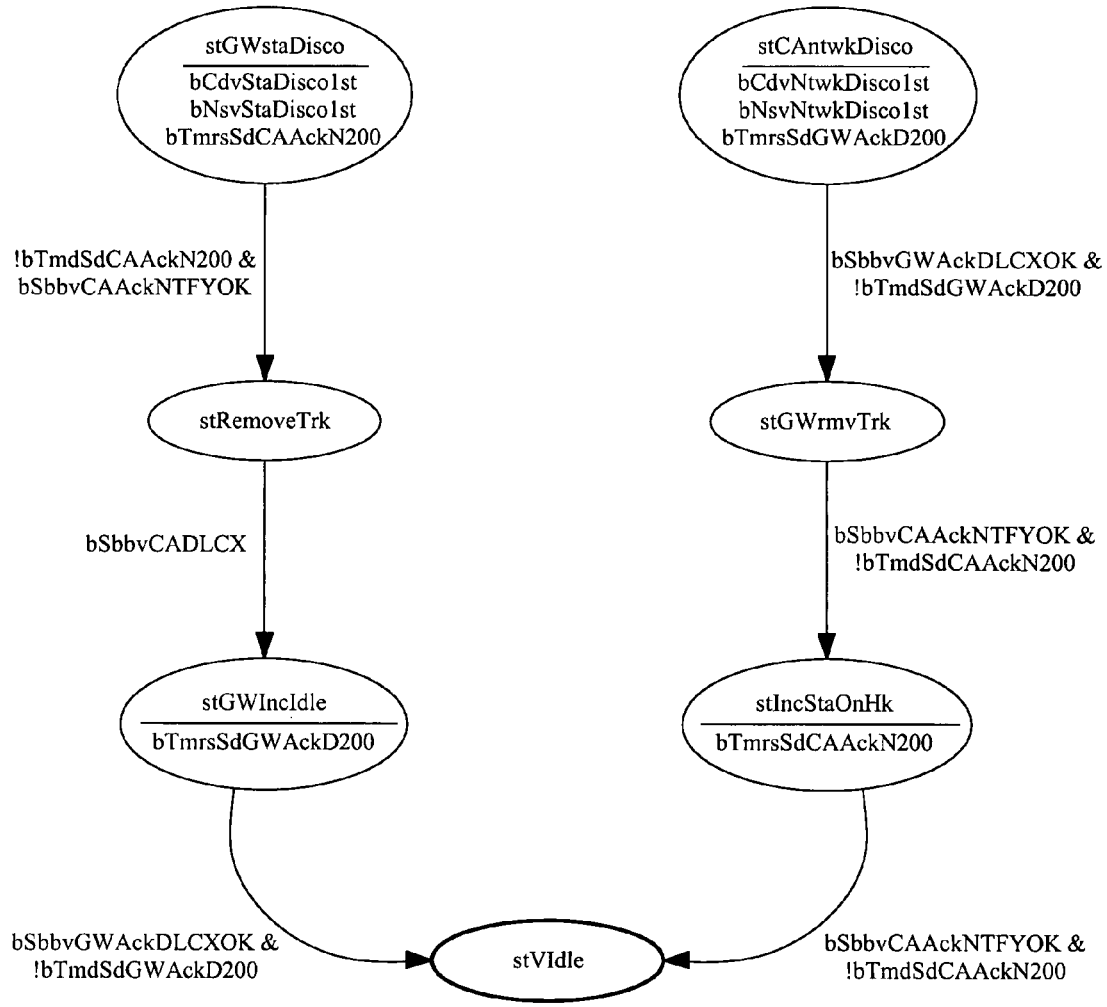
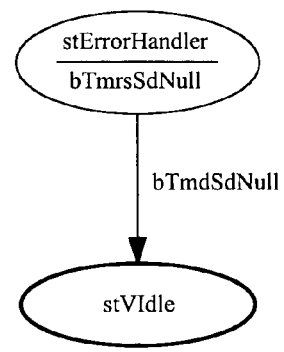
FIG. 6o

```
MDCX 1206 endpoint-1@rgw-2567.whatever.net SGCP1.1
C:A3C47F21456789F0
I:FDE234C8
```

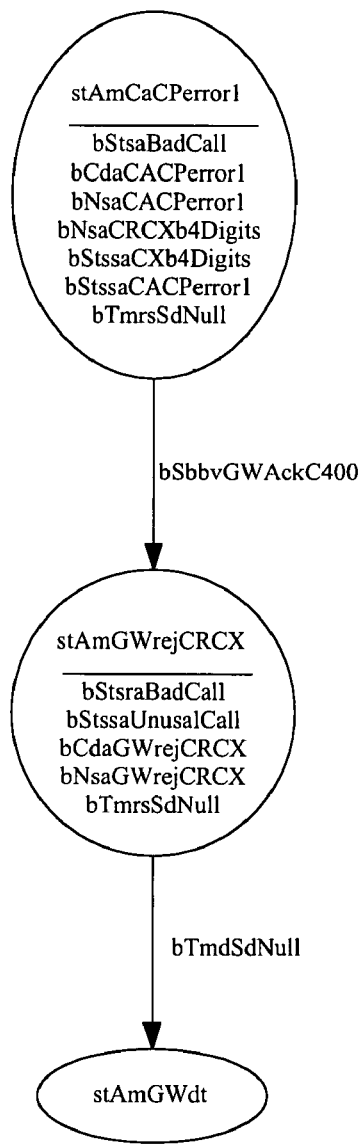
FIG. 6z1

Subscriber:

Facility Type: T1, ESF, B8ZS

Date 04/13/99

| Facility | Channel | Circuit Type | Outgoing Call Count | Incoming Call Count | Status |
|---|---|---|---|---|---|
| 1 | 1 | 2Way Wink Start DTMF | 132 | 0 | |
| 1 | 2 | 2Way Wink Start DTMF | 112 | 0 | |
| 1 | 3 | 2Way Wink Start DTMF | 97 | 0 | |
| 1 | 4 | 2Way Wink Start DTMF | 88 | 0 | |
| 1 | 5 | 2Way Wink Start DTMF | 65 | 0 | |
| 1 | 6 | 2Way Wink Start DTMF | 40 | 0 | |
| 1 | 7 | 2Way Wink Start DTMF | 36 | 1 | |
| 1 | 8 | 2Way Wink Start DTMF | 23 | 1 | |
| 1 | 9 | 2Way Wink Start DTMF | 18 | 4 | |
| 1 | 10 | 2Way Wink Start DTMF | 12 | 7 | |
| 1 | 11 | 2Way Wink Start DTMF | 8 | 11 | |
| 1 | 12 | 2Way Wink Start DTMF | 5 | 34 | |
| 1 | 13 | 2Way Wink Start DTMF | 2 | 46 | |
| 1 | 14 | 2Way Wink Start DTMF | 1 | 58 | |
| 1 | 15 | 2Way Wink Start DTMF | 0 | 69 | |
| 1 | 16 | 2Way Wink Start DTMF | 0 | 81 | |
| 1 | 17 | Not Used | 0 | 0 | |
| 1 | 18 | Not Used | 0 | 0 | |
| 1 | 19 | Not Used | 0 | 0 | |
| 1 | 20 | Loop Start Voice | 15 | 12 | |
| 1 | 21 | Loop Start Voice/Modem | 8 | 10 | |
| 1 | 22 | Loop Start Modem | 5 | 1 | |
| 1 | 23 | Loop Start FAX | 33 | 9 | |
| 1 | 24 | Not Used | 0 | 0 | |
| | | Total | 700 | 344 | |

FIG. 10

Digit Map

Subscriber:

| # of Digits | Digit String | Direction |
|---|---|---|
| 1 | None | |
| 2 | 90 | Outgoing |
| 3 | 900 | Outgoing |
| 4 | XXXX   (4000 – 6500) | Intra PBX |
|   | 9411 | Outgoing |
|   | 9611 | Outgoing |
|   | 9711 | Outgoing |
| 5 | None | |
| 6 | None | |
| 7 | None | |
| 8 | Dial 9, XXXXXXX | Outgoing |
| 9 | None | |
| 10 | None | |
| 11 | Dial 9, 1, NPA-NXX-XXXX | Outgoing |
|   | Dial 8, 1, NPA-NXX-XXXX | Outgoing |
|   | Dial 8, 0, NPA-NXX-XXXX | Outgoing |
| 12 | None | |
| 13 | None | |
| 14 | Dial 8, 011, CC-XXXXXXXX | Outgoing |
| 15 | None | |
| 16 | Dial 8, 011, CC-XXXXXXXXXX | Outgoing |
| 17 | None | |
| 18 | None | |
| 19 | 8, 1010, XXX, 1, NPA-NXX-XXXX | Outgoing |
| | | |
| Misc. | XXXX – IVR/Voice Mail | Incoming |

Notes:

Toll Diversion Detected
Answer Supervision Detected
Avg. Inter-Digit timing = 127 ms
Auto-dialers detected – Inter–digit timing 45 ms
No International calls detected

FIG. 11

Call Handling Performance - Totals

Subscriber:

Date: 04/13/99

| | Attempts | Comp | Bad Digits | Abdn. Calls | Reorder | Busy | Other | Voice | Data | FAX |
|---|---|---|---|---|---|---|---|---|---|---|
| Incoming Calls | 352 | 343 | 0 | 2 | 0 | 5 | 2 | 343 | 1 | 9 |
| Outgoing Calls | 797 | 700 | 23 | 41 | 4 | 16 | 13 | 660 | 7 | 33 |
| Busy Hours | 10:00 | 11:00 | 13:00 | 14:00 | 16:00 | 17:00 | | | | |
| Available Circuits | 20 | 18 | 20 | 20 | 20 | 20 | | | | |
| Required Circuits (.1% Congestion) | 23 | 25 | 19 | 21 | 28 | 22 | | | | |

Top 10 Failures

| Trouble | Direction | % of Total |
|---|---|---|
| Ring No Answer | Outgoing | 4% |
| Bad Digits | Outgoing | 2% |
| Busy | Both | 2% |
| Dead After Dialing | Outgoing | 1% |
| Reorder | Outgoing | .3% |

EXPERT CALL ANALYZER AND NEXT GENERATION TELEPHONY NETWORK CONFIGURATION SYSTEM

FIELD OF THE INVENTION

The present invention relates generally to field of telephone testing and monitoring systems. More specifically, the present invention is directed to a configuration system of analyzing calls in a Next Generation Telephony Network.

BACKGROUND

Traditional telephony networks such as public switched telephone network (PSTN) employ Time Division Multiplex (TDM) circuits, copper cable pairs, and electronic switches to provide voice communication services. The PSTN uses a circuit-switched architecture in which a direct connection, or circuit, is made between two users. The circuit provides a full-duplex, or bi-directional, connection with extremely low latency, or delay, between the two end points. The connection is generally a logical connection through many switches and across a variety of wiring types (twisted-pair, fiber-optic cable, etc.). The users have exclusive and full use of the circuit until the connection is released. This circuit switching technology has slowly evolved over the last 100 years providing a complex mixture of analog and digital circuits with a variety of signaling techniques. Along the way, many different testing methods and monitor systems are developed to assist with the delivery of PSTN telephony signals.

Data communication, on the other hand, uses packet switching transmission technology. Data is assembled into distinct digital "packets" with addresses that are read by switches or routers as the packets are received. The switches/routers forward the packets onto the appropriate destination. Unlike the PSTN technology, there is no dedicated circuit connection between a sending station and a receiving station. As such, data packets from the sending station may take different routes to the same receiving station, depending on network traffic conditions and other factors. This type of transmission is only half-duplex, or unidirectional, which can easily lead to high delays between sending and receiving.

Internet Protocol (IP) provides a connectionless service, tracks Internet addresses of nodes, routes outgoing messages and recognizes incoming messages. In other words, IP provides the addressing needed to enable routers to forward data packets across multiple networks. Due to IP's inherent transmission efficiency of packet switching and IP's ability to run over any network medium (Ethernet, FDDI, ATM, Frame Relay, etc.), circuit switched networks (voice) and packet switched networks (data) are rapidly converging into one network, referred to as a Next Generation Telephony Network (NGTN).

Unlike the existing PSTN network, the new NGTN network is relatively immature and lacks sufficient testing and monitoring capabilities. Telephone service providers such as Competitive Local Exchange Carriers (CLECs), Regional Bell Operating Companies (RBOCs) and Inter-Exchange Carriers (IXCs) that want to take advantage of the IP technology are finding that Customer Premise Equipment (CPE) does not always adhere to established standards. This often makes the transition to the IP technology difficult, as the service providers may need to perform time-consuming manual pre-service tests in order to verify a subscriber's CPE configuration and existing or potential inter-operability problems.

SUMMARY OF THE INVENTION

A method and apparatus for determining and monitoring the status of telephone calls in a Next Generation Telephony Network (NGTN) is disclosed. The method detects protocols occurring between two or more network elements of a telecommunication circuit and control protocol used to initiate or to react to the events generated by the network elements. One sensor is connected to the telecommunication circuits to sense raw call progress signaling information indicative of an event relative to the call on the monitored line. Another sensor is connected to call control channel of a NGTN network element. The sensors are connected to a call processing system. The call processing system includes a call progress event analyzer module consisting of a call progress event processor and a call progress state machine, a NGTN event processor and a NGTN state machine. The call processing system also includes a protocol independent call processor module and a multi protocol analysis module. Raw call progress signaling information and NGTN message information are converted to logical call handling events and forwarded to the protocol independent call processor module for processing. The protocol independent call processor module includes a timer processor to keep track of timing of events. The call processing system also includes an alarm handler to keep track and generate alarms when an error condition occur after processing the call progress events and the NGTN message events.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 3A-FIG. 3H illustrates exemplary embodiments of raw call processing signal information sent by the sensor to the protocol independent call processor module.

FIGS. 6a, 6b, 6c, 6d, 6e, 6f, 6g1, 6g2, 6h1, 6h2, 6i, 6j, and 6k are exemplary state diagrams illustrating the function of the call progress state machine for a loop start circuit.

FIGS. 6l, 6m, 6n, 6o, 6p, and 6q are exemplary state diagrams illustrating the function of the NGTN state machine for a loop start circuit.

FIGS. 6r, 6s, 6t, 6u, 6v, 6w, 6x, 6y, 6z, and 6z1 are exemplary state diagrams illustrating the function of the analysis state machines.

FIG. 10 illustrates an exemplary configuration benchmark report.

FIG. 11 illustrates an exemplary digit map as supported by one embodiment.

FIG. 12 illustrates an exemplary call handling performance report.

DEFINITIONS

Figure 1:
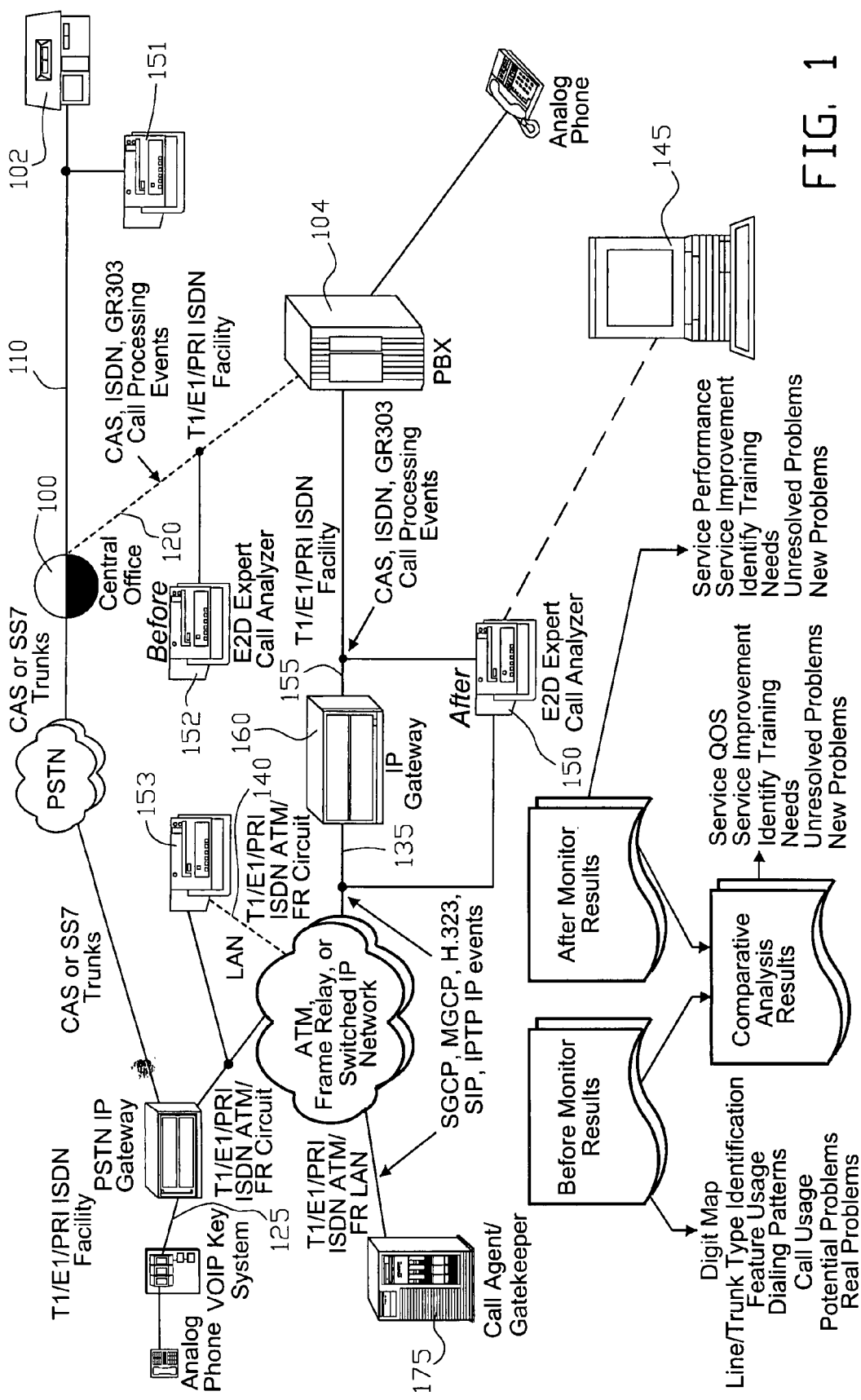
FIG. 1 is an exemplary embodiment illustrating the use of the call analyzer in different configurations.

The following table contains definitions of call states and status as defined in the detailed description and in the drawings.

| SM Variable | Meaning | State Machine |
|---|---|---|
| Notable States | | |
| Ns3WCall | Three way call | CAS |
| NsAbandon | No user action | CAS |
| NsAudRing | Audible Ringing | CAS |
| NsAudRngOff | Audible Ringing Off | CAS |
| NsAudRngOn | Audible Ringing On | CAS |
| NsBsyCall | Busy Call | CAS |
| NsCallAbandon | Call Abandon | CAS |
| NsCallAns | Call Answered | CAS |
| NsCallingPtyHld | Calling Party Hold | CAS |
| NsCircuitOpen | Open Line | CAS |
| NsCoOfh | Central Office Off Hook | CAS |
| NsCoOnh | Central Office On Hook | CAS |
| NsCW | Call Waiting | CAS |
| NsDialing | Dialing | CAS |
| NsDrop3W | Drop Three way call | CAS |
| NsDT | Dial Tone | CAS |
| NsDTdly | Dial Tone delay | CAS |
| NsDThit | Dial Tone hit | CAS |
| NsEndFlash | End Flash | CAS |
| NsFastDialDT | Fast Dial No Dial Tone | CAS |
| NsFeaCall | Feature type Call | CAS |
| NsFlsh | Flash on line | CAS |
| NsIdle | Idle line | CAS |
| NsIncompleteCall | Inncomplete Call | CAS |
| NsLineTest | Central Office Line Test | CAS |
| NsLodi | Process Manually | CAS |
| NsNoDialTone | No Dial Tone | CAS |
| NsNoDigits | No Digits | CAS |
| NsMsgDT | Message waiting Dial Tone | CAS |
| NsOfh | Off Hook | CAS |
| NsOnh | On Hook | CAS |
| NsOpn | Open | CAS |
| NspermSignal | Permanent Signal | CAS |
| NsPSoffHook | Permanent Signal Off Hook | CAS |
| NsRclDT | Recall Dial Tone | CAS |
| NsReOrder | Reorder | CAS |
| NsRngOff | Ringing Off | CAS |
| NsRngOn | Ringing On | CAS |
| NsRngOSI | Ringing Open Switch Interval | CAS |
| NsShrtAns | Short Answer | CAS |
| NsShortCall | Short Call | CAS |
| NsSpeech | False Call progress Tone Identified | CAS |
| NsStb | Stable Call | CAS |
| NsStbDig | Stable Digit | CAS |
| Transition Reasons | | |
| A.sub.-B.sub.-C.sub.-Talking | Feature three way call connected | CAS |
| 2DTMFoffs | Second DTMF Off | CAS |
| Abandon | Abandon | CAS |
| BptyOnHold | "B" Party On Hold Feature Call State | CAS |
| CallAbandoned | Call Abandoned | CAS |
| CallingPtyHld | Calling Party Hold | CAS |
| DialingO | Dialing over | CAS |
| DiaiTone | DialTone | CAS |
| DigOffnoOn | Digit Off Without Digit On | CAS |
| DigLT50ms | Digit less than 50 ms | CAS |
| Dtdetected | Dial Tone detected | CAS |

-continued

| SM Variable | Meaning | State Machine |
|---|---|---|
| Dtoff | Dial Tone Off | CAS |
| LineNormal | Line Normal | CAS |
| LineOffHook | Line Off Hook | CAS |
| LineOnHook | Line On Hook | CAS |
| LineOpen2secs | Line Open for 2 Seconds | CAS |
| LineTest | Central Office Line Test | CAS |
| NoDT4secs | No Dial Tone for 4 Seconds | CAS |
| Openfor500ms | Open line for 500 milliseconds | CAS |
| Openfor10secs | Open line for 10 Seconds | CAS |
| PreTripped | Line trips Ringing before answer | CAS |
| RingNoAnswer | Ringing without answer | CAS |
| RingStopped | Ringing tripped | CAS |
| Call Count Block | | |
| CcbAudRng | Audible Ring(s) | CAS |
| CcbBsyDig | Digit(s) During Busy | CAS |
| CcbCW | Call Waiting Tones | CAS |
| CcbDig | Digit(s) | CAS |
| CcbDPpls | Dial Pulse(s) | CAS |
| CcbFlsh | Flash(es) | CAS |
| CcbRng | Machine Ring(s) | CAS |
| CcbROdig | Digit(s) During Reorder | CAS |
| CcbStbDig | Digit(s) During Talk Interval | CAS |
| Call Dispositions | | |
| Cd3W | Three Way Call | CAS |
| CdAnsCall | Call Answered | CAS |
| CdBsy | Busy | CAS |
| CdCW | Call Waiting | CAS |
| CdDPdig | Dial Pulse Digit | CAS |
| CdDT2 | Second Dial Tone | CAS |
| dLodi | Process Manually | CAS |
| CdMsgWtDT | Message Waiting | CAS |
| CdOrg | Originating Call | CAS |
| CdOrgCallAbdn | Originating Call Abandon | CAS |
| CdOSI | Open Switch Interval (OSI) | CAS |
| CdRingNoAns | Unanswered Mach. Ringing | CAS |
| CdTalk | Completed Call | CAS |
| CdTerm | Terminating Call | CAS |
| CdTermCall | Terminating | CAS |
| CdTermCallAbdn | Call Abandon Terminating | CAS |
| Call Network Trouble | | |
| CntDTdly | Dial Tone Delay | CAS |
| CntNoDialTone | No Dial Tone | CAS |
| CntNoSync | Circuit Open | CAS |
| CntRO | Reorder | CAS |
| Call Network Unusual | | |
| CnuCktOpen | Circuit Open | CAS |
| CnuCWosi | Call Waiting OSI | CAS |
| CnuDThit | Dial Tone Hit | CAS |
| CnuHit | Hit | CAS |
| CnuPreTrp | Pre Trip (Answer) | CAS |
| CnuTmDisc | Timed Disconnect | CAS |
| Call Station Trouble | | |
| CstErrBsyDig | Error Digit during Busy | CAS |
| CstErrDropOff | Error Drop Off | CAS |
| CstLnPS | Line Permanent Signal | CAS |
| CstLongDig | Long Digit | CAS |
| CstPreTrp | Pre Trip. (Answer) | CAS |
| CstROdig | Digit over Reorder | CAS |
| CstShrtDig | Short Digit | CAS |
| Call Station Unusual | | |
| CsuBsyDig | Digit during Busy | CAS |
| CsuDTtimeout | Dial Tone Timeout | CAS |
| CsuEndFlsh | End Flash | CAS |
| CsuFastDial | Fast Dial | CAS |
| CsuOrgCallAbdn | Originating Call Abandon | CAS |
| CsuRclDT | Recall Dial Tone | CAS |
| CsuShrtAns | Short Answer | CAS |
| CsuStaDisc | Station Disconnect | CAS |
| Line Count Block | | CAS |
| lcb3W | (3) Three Way Call | CAS |
| lcbAnsCall | Call Answered | CAS |

-continued

| SM Variable | Meaning | State Machine |
|---|---|---|
| lcbCallNum | Call Count | CAS |
| lcbDTdly | Dial Tone Delay | CAS |
| lcbErrDig | Digit Error | CAS |
| lcbLodi | Analyze Manually | CAS |
| lcbNoDT | No Dial Tone | CAS |
| lcbOrgAbdn | Origination Abandon | CAS |
| lcbOrgCall | Originating Call | CAS |
| lcbOrgCallAbdn | Originating Call Abandon | CAS |
| lcbSeize | Seize | CAS |
| lcbShrtAns | Short Answer | CAS |
| lcbTerm | Terminating | CAS |
| lcbTermCall | Terminating Calls | CAS |
| lcbTermCallAbdn | Terminating Call Abandon | CAS |
| States | | |
| 3W | Three way call | CAS |
| 3WstbCall | Three way Call Stable Call | CAS |
| Abdn | Abandon | CAS |
| AddOnCall | Add OnCall | CAS |
| Ans | Answer | CAS |
| AudRngOff | Audible Ringing Off | CAS |
| AudRngOn | Audible Ringing On | CAS |
| BadDPdig | Bad Dial Pulse Digit | CAS |
| BptyHld | "B" Party Hold | CAS |
| Bsy | Busy | CAS |
| BsyDig | Digit over busy signal | CAS |
| BsyROoff | Busy/Reorder off | CAS |
| BsyROon | Busy/Reorder on | CAS |
| BsyROon2 | Busy/Reorder on second cycle | CAS |
| BsyUnk | Busy Unknown | CAS |
| CallAbdn | Call Abandon | CAS |
| CallHold | Call Hold | CAS |
| CallOnHld | Call on Hold | CAS |
| CallOver | Call Complete | CAS |
| ChkBnchMrk | Check Bench Mark | CAS |
| ChkDP | Check Dial Pulse | CAS |
| ChkDTa | Check Dial Tone a | CAS |
| ChkDTb | Check Dial Tone b | CAS |
| ChkFlsh | Check Flash | CAS |
| CoOfh | Central Office Off Hook | CAS |
| CoOnh | Central OfficeOn Hook | CAS |
| CptyHld | "C" Party Hold | CAS |
| CW | Call Waiting | CAS |
| Cwabdn | Call Waiting Abandon | CAS |
| DetRngOff | Detect Ringing Off | CAS |
| DetRngOn | Detect Ringing On | CAS |
| DigErr | Digit Error | CAS |
| Disc3W | Disconnect three Way | CAS |
| Dpdig | Dial Pulse Digit | CAS |
| DPplsBrk | Dial Pulse Break | CAS |
| DPplsMk | Dial PulseMake | CAS |
| Drop3W | Drop three way | CAS |
| DT | Dial Tone | CAS |
| DTbkA | Dial Tone back A | CAS |
| DTbkB | Dial Tone back B | CAS |
| DTbkC | Dial Tone back C | CAS |
| Dtoff | Dial Tone off | CAS |
| DToffDP | Dial Tone on Dial Pulse | CAS |
| Dtdly | Dial Tone Delay | CAS |
| DTMFdig | Dual Tone Multiple Frequency digit | CAS |
| DTMFoff | Dual Tone Multiple Frequency off | CAS |
| EndFlsh | End Flash | CAS |
| ErrBsyOff | Error Busy Off | CAS |
| ErrorSz | Error Seizure | CAS |
| FastDial | Fast Dial | CAS |
| Float | Float voltage | CAS |
| HitOrFlshTmr | Hit or Flash timer | CAS |
| HitTmr | Hit Timer | CAS |
| Idle | Idle | CAS |
| Idle2 | idle 2 | CAS |
| IsFlsh | Is Flash | CAS |
| LnClose | Line Close | CAS |
| LnTest | Central Office Line test | CAS |
| Lodl | Undefined state Process Manually | CAS |
| LongDig | Long Digit | CAS |
| MissDt | Missing Digit | CAS |
| MoreDig | More Digit | CAS |
| MsgWaitDT | Message waiting dial tone | CAS |

-continued

| SM Variable | Meaning | State Machine |
|---|---|---|
| NetHld | Network Hold | CAS |
| No3W | No three way | CAS |
| NoDig | No digit | CAS |
| NoDT | No dial Tone | CAS |
| NoSync | No Synchronization | CAS |
| OkFlsh | OK Flash | CAS |
| OnHook | On Hook | CAS |
| Opn | Open | CAS |
| OSI | Open Switch Interval | CAS |
| PermSigRing | Permanent Signal Ringing | CAS |
| Psofh | Permanent Signal off hook | CAS |
| Psopen | Permanent Signal open | CAS |
| PSUopen | Phone Service Unit open | CAS |
| RclDT | Recall Dial Tone | CAS |
| RclOff | Recall Off | CAS |
| RclOn | Recall On | CAS |
| RealHit | Real Hit | CAS |
| RngOSI | Ringing Open Switch Interval | CAS |
| RO | ReOrder | CAS |
| Rodig | ReOrder digit detection | CAS |
| SamePSU | Same Phone Service Unit | CAS |
| ShrtAns | Short Answer | CAS |
| ShrtDig | Short Digit | CAS |
| StbCall | Stable Call | CAS |
| StbDig | Stable Digit | CAS |
| Sz | Seizure | CAS |
| TalkOn | Talk On | CAS |
| ToneOn | Tone On | CAS |
| ValidDig | Valid Digit | CAS |
| Unknown Status | Unknown | CAS |
| 2DTMFoffs | Dual Tone Multiple Frequency | CAS |
| 3W | Three Way call | CAS |
| 5E | 5ESS Switch | CAS |
| BptyHld | "B" Party Hold | CAS |
| BptyHld3W | "B" Party Hold three way call | CAS |
| CallHold | Call Hold | CAS |
| CptyHld | "C" Party Hold | CAS |
| CurEqOfh | Current Equal off hook | CAS |
| CurEqOnh | Current Equal On hook | CAS |
| CurAvailable | Current Available | CAS |
| CurRelayClosed | Current Relay Closed | CAS |
| CW | Call Waiting | CAS |
| Cwabdn | Call Waiting Abandon | CAS |
| DigOn | Digit On | CAS |
| Dpdig | Dial Pulse digit | CAS |
| DPOff | Dial Pulse Off | CAS |
| Dtbk | Dial Tone break (Stutter) | CAS |
| ErrDigOff | Error Digit Off | CAS |
| ErrDigOn | Error Digit On | CAS |
| ErrLodi | Error Undefined state Process Manually | CAS |
| ErrSz | Error Seizure | CAS |
| FarEndAns | Far End Answer | CAS |
| FeaCall | Feature Call | CAS |
| Float | Float voltage | CAS |
| LnOpen | Line Open | CAS |
| Lodi | Undefined state Process Manually | CAS |
| LongOpen | Long Open | CAS |
| OffHook | Off Hook | CAS |
| OnHook | On Hook | CAS |
| Org | Originating | CAS |
| PDdigOff | Dial Pulse digit Off | CAS |
| RngEqOfh | Ring Equals Off Hook | CAS |
| RngEqOnh | Ring Equals On Hook | CAS |
| RngGtOfh | Ring Equals Greater than Off Hook | CAS |
| RngGtOnh | Ring Equals Greater than On Hook | CAS |
| RngLtOfh | Ring Equals Less Than Off Hook | CAS |
| RngLtOnh | Ring Equals Less Than On Hook | CAS |
| SzOSI | Seizure | CAS |
| Term | Terminating | CAS |
| TermCall | Terminating Call | CAS |
| Test | Central Office test | CAS |
| TipEqOfh | Tip Equals Off Hook | CAS |
| TipEqOnh | Tip Equals On Hook | CAS |
| TipGtOfh | Tip Equals Greater than Off Hook | CAS |
| TipGtOnh | Tip Equals Greater than | CAS |
| TipLtOfh | Tip Equals Less Than Off Hook | CAS |

-continued

| SM Variable | Meaning | State Machine |
|---|---|---|
| TipLtOnh | Tip Equals Less | CAS |
| VcUnchanged | Voltage Unchanged | CAS |
| VoltEqOfh | Voltage Equals Off Hook | CAS |
| VoltEqOnh | Voltage Equals On Hook | CAS |
| Non-Voltage Event Status | | |
| bStsTimeHrt | heartbeat time condition | CAS |
| bStsTimeTmr | timer condition | CAS |
| bStsTimeFilt | filtered time condition | CAS |
| bStsCPTa | CPT tone(s) has just finished | CAS |
| bStsCPTb | CPT tone 350 Hz | CAS |
| bStsCPTc | CPT tones 350 + 440 Hz | CAS |
| bStsCPTd | CPT tones 440 + 480 Hz | CAS |
| bStsCPTe | CPT tone 480 Hz | CAS |
| bStsCPTf | CPT tones 350 + 480 Hz | CAS |
| bStsCPTg | CPT tones 440 + 480 Hz | CAS |
| bStsCPTh | CPT tones 350 + 440 + 480 Hz | CAS |
| bStsCPTi | CPT tone 620 Hz | CAS |
| bStsCPTj | CPT tones 350 + 620 Hz | CAS |
| bStsCPTk | CPT tones 440 + 620 Hz | CAS |
| bStsCPTl | CPT tones 350 + 440 + 620 Hz | CAS |
| bStsCPTm | CPT tones 480 + 620 Hz | CAS |
| bStsCPTn | CPT tones 350 + 480 + 620 Hz | CAS |
| bStsCPTo | CPT tones 440 + 480 + 620 Hz | CAS |
| bStsCPTp | CPT tones 350 + 440 + 480 + 620 Hz | CAS |
| | | CAS |
| evDTMF | Dual Tone Multiple Frequency event conditions | CAS |
| bStsDTMFone | DTMF digit one 697 + 1209 Hz | CAS |
| bStsDTMFfour | DTMF digit four 770 + 1209 Hz | CAS |
| bStsDTMFseven | DTMF digit seven 852 + 1209 Hz | CAS |
| bStsDTMFstar | DTMF symbol * 941 + 1209 Hz | CAS |
| bStsDTMFtwo | DTMF digit two 697 + 1336 Hz | CAS |
| bStsDTMFfive | DTMF digit five 770 + 1336 Hz | CAS |
| bStsDTMFeight | DTMF digit eight 852 + 1336 Hz | CAS |
| bStsDTMFzero | DTMF digit zero 941 + 1336 Hz | CAS |
| bStsDTMFthree | DTMF digit three 697 + 1477 Hz | CAS |
| bStsDTMFsix | DTMF digit six 770 + 1477 Hz | CAS |
| bStsDTMFnine | DTMF digit nine 852 + 1477 Hz | CAS |
| bStsDTMFpound | DTMF symbol # 941 + 1477 Hz | CAS |
| bStsDTMFa | DTMF character A 697 + 1633 Hz | CAS |
| bStsDTMFb | DTMF character B 770 + 1633 Hz | CAS |
| bStsDTMFc | DTMF character C 852 + 1633 Hz | CAS |
| bStsDTMFd | DTMF character D 941 + 1633 Hz | CAS |
| bStsDTMFoff | DTMF tone(s) has just finished | CAS |
| | | CAS |
| evMF | Multiple Frequency event conditions | CAS |
| bStsMFoff | MF tone(s) just finished | CAS |
| bStsMFone | MF digit one 700 + 900 Hz | CAS |
| bStsMFtwo | MF digit two 700 + 1100 Hz | CAS |
| bStsMFfour | MF symbol four 700 + 1300 Hz | CAS |
| bStsMFseven | MF digit seven 700 + 1500 Hz | CAS |
| bStsMFst3p | MF idicator ST3P 700 + 1700 Hz | CAS |
| bStsMFthree | MF digit three 900 + 1100 Hz | CAS |
| bStsMFfive | MF digit five 900 + 1300 Hz | CAS |
| bStsMFeight | MF digit eight 900 + 1500 Hz | CAS |
| bStsMFstp | MF indicator STP 900 + 1700 Hz | CAS |
| bStsMFsix | MF digit six 1100 + 1300 Hz | CAS |
| bStsMFnine | MF digit nine 1100 + 1500 Hz | CAS |
| bStsMFkp | MF indicator KP 1100 + 1700 Hz | CAS |
| bStsMFzero | MF digit 0 1100 + 1500 Hz | CAS |
| bStsMFst2p | MF indicator ST2P 1300 + 1700 Hz | CAS |
| bStsMFst | MF indicator ST 1500 + 1700 Hz | CAS |
| | | CAS |
| evRng | Ringing event conditions | CAS |
| bStsRngOff | Ringing has just finished | CAS |
| bStsRngOn | Ringing is in progress | CAS |
| evSIT - Special | Information Tone event conditions | CAS |
| bStsSIToff | SIT tone has just finished | CAS |
| bStsSITs1lS | SIT tone segment 1 low short duration (s1 lS) | CAS |
| bStsSITs1hS | SIT tone segment 1 high short duration (s1 hS) | CAS |
| bStsSITs2lS | SIT tone segment 2 low short duration (s2 lS) | CAS |
| bStsSITs2hS | SIT tone segment 2 high short duration (s2 hS) | CAS |
| bStsSITs3lS | SIT tone segment 3 low short duration (s3 lS) | CAS |
| bStsSITs3hS | SIT tone segment high short duration (s3 hS) | CAS |
| bStsSITnst1 | no SIT tone 1 | CAS |
| bStsSITnst2 | no SIT tone 2 | CAS |
| bStsSITs1hL | SIT tone segment 1 low long duration (s1 hL) | CAS |

-continued

| SM Variable | Meaning | State Machine |
|---|---|---|
| bStsSITs1lL | SIT tone segment 1 high long duration (s1 lL) | CAS |
| bStsSITs2lL | SIT tone segment 2 low long duration (s2 lL) | CAS |
| bStsSITs2hL | SIT tone segment 2 high long duration (s2 hL) | CAS |
| bStsSITs3lL | SIT tone segment 3 low long duration (s3 lL) | CAS |
| bStsSITs3hL | SIT tone segment 3 high long duration (s3 hL) | CAS |
| bStsSITnst3 | no SIT tone 3 | CAS |
| evLnCktSnsrOfl | line circuit sensor offline conditions | CAS |
| bStsLnCktSnsrOfl | the line circuit sensor has gone offline | CAS |
| evLnCktSnsrTrblBtn | line circuit sensor trouble button conditions | CAS |
| | | CAS |
| bStsSuTrblBtnOn | line circuit sensor trouble button is being pressed | CAS |
| bStsSuTrblOff | line circuit sensor trouble button just released | CAS |
| bStsCPTon | Call Progress Tone on | CAS |
| bStsDTMFon | Dual Tone Multiple Frequency on | CAS |
| bStsMFon | Multiple Frequency on | CAS |
| bstsMFdigitOn | Multiple Frequency digit On | CAS |
| bStsMFstOn | Multiple Frequency On | CAS |
| bStsSITon | Special Information Tone on | CAS |
| State Dependent Timers | | |
| SdAns100 | Answer 100 ms | CAS |
| SdAns4k | Answer 4000 ms | CAS |
| SdAns12k | Answer 12000 ms | CAS |
| SdAud5200 | Audible 5200 ms | CAS |
| SdBkA200 | Break a 200 ms (Stutter) | CAS |
| SdBkB200 | Break B 200 ms(Stutter) | CAS |
| SdChkDT75 | Check Dial Tone 75 ms | CAS |
| SdChkDT200 | Check Dial Tone 200 ms | CAS |
| SdDigOff10k | Digit Off 10000 ms | CAS |
| SdDP75 | Dial Pulse 75 ms | CAS |
| SdDP500 | Dial Pulse 500 ms 500 ms | CAS |
| SdDPbrk300 | Dial Pulse break 300 ms | CAS |
| SdDPbrk500 | Dial Pulse break 500 ms | CAS |
| SdDPdig10k | Dial Pulse Digit 10000 ms | CAS |
| SdDPmk300 | Dial Pulse Make 300 ms | CAS |
| SdDT200 | Dial Tone 200 ms | CAS |
| SdDTdly4k | Dial Tone Delay 4000 ms | CAS |
| SdDTMFon4k | Dual Tone Multiple Frequency 4000 ms | CAS |
| SdDTMFon50 | Dual Tone Multiple Frequency 50 ms | CAS |
| SdDToff200 | Dial Tone off 200 ms | CAS |
| SdEndFlsh4k | End Flash 4000 ms | CAS |
| SdFlsh1k | Flash 1000 ms | CAS |
| SdGoIdle1k | Go Idle 1000 ms | CAS |
| SdHit400 | Hit 400 ms | CAS |
| SdLnClose2k | Line Closed 2000 ms | CAS |
| SdLodi2k | Undefined state 2000 ms | CAS |
| Process Manually | | CAS |
| SdLodi7k | Undefined state 7000 ms Process Manually | CAS |
| SdLodi15k | Undefined state 15000 ms Process Manually | CAS |
| SdLodi20k | Undefined state 20000 ms Process Manually | CAS |
| | | CAS |
| SdNull0 | Null 10 ms | CAS |
| SdOnHk200 | On Hook 200 ms | CAS |
| SdOpen1k | Open 1000 ms | CAS |
| SdOpen30k | Open 30000 ms | CAS |
| SdOpen400 | Open 400 ms | CAS |
| SdOpen500 | Open 500 ms | CAS |
| SdPS2k | Permanent Signal 2000 ms | CAS |
| SdPSring100 | Permanent Signal Ring 100 ms | CAS |
| SdRclDT125 | Recal Dial Tone 125 ms | CAS |
| SdRclOff200 | Recal Dial Tone 200 ms | CAS |
| SdRclOn160 | Recal Dial Tone 160 ms | CAS |
| SdRng300 | Ringing 300 ms | CAS |
| SdRng5500 | Ringing 5500 ms | CAS |
| SdSUOpen10k | Service Unit Open 10000 ms | CAS |
| SdTermHLd2k | Term Hold 2000 ms | CAS |
| SdWait250 | Wait 250 ms | CAS |
| SdWait500 | Wait 500 ms | CAS |
| State Independent Timers | | |
| SiBsyRO300 | Busy/Reorder 300 ms | CAS |
| SiCW12k | Call Waiting 12000 ms | CAS |
| SiOffHk4k | Off Hook 4000 ms | CAS |
| SiOnHk12k | On Hook 12000 ms | CAS |
| SiOnHk1500 | On Hook 1500 ms | CAS |

| SM Variable | Meaning | State Machine |
|---|---|---|
| Event Filter | | |
| EvCPTall | Call Progress Tone all | CAS |
| EvDTMFall | Dual Tone Multiple Frequency all | CAS |
| EvMFall | Multiple Frequency | CAS |
| Event Pass | | |
| CPTc100 | Call Progress Tone | CAS |
| CPTd | Call Progress Tone Dial Tone | CAS |
| CPTd100 | Call Progress Tone Dial Tone 100 ms | CAS |
| CPTd2k | Call Progress Tone Dial Tone 2000 ms | CAS |
| CPTg | Call Progress Tone Audible Ring | CAS |
| CPTg500 | Call Progress Tone Audible Ring 500 ms | CAS |
| CPTm | Call Progress Tone Busy/Reorder Low Tone | CAS |
| DTMFall100 | Dual Tone Multiple Frequency all 100 ms | CAS |
| DTMFall200 | Dual Tone Multiple Frequency all 200 ms | CAS |
| Non-Voltage Events | | |
| Heartbeat Time | heartbeat time condition | CAS |
| Timer Time | Timer timeout time condition | CAS |
| Filter Time | filtered time condition | CAS |
| CPT Off | CPTa CPT tone(s) has just finished | CAS |
| CPT 350 Hz | CPTb CPT tone 350 Hz | CAS |
| CPT Call Waiting | CPTc CPT tone 440 Hz | CAS |
| CPT Dial Tone | CPTd CPT tones 350 + 440 Hz | CAS |
| CPT Perm Signal | CPTe CPT tone 480 Hz | CAS |
| CPT Recall Tone | CPTf CPT tones 350 + 480 Hz | CAS |
| CPT Aud Ring On | CPTg CPT tones 440 + 480 Hz | CAS |
| CPT 350/440/480 Hz | CPTh CPT tones 350 + 440 + 480 Hz | CAS |
| CPT 620 Hz | CPTi CPT tone 620 Hz | CAS |
| CPT 350/620 Hz | CPTj CPT tones 350 + 620 Hz | CAS |
| CPT Intercept | CPTk CPT tones 440 + 620 Hz | CAS |
| CPT 350/440/620 Hz | CPTl CPT tones 350 + 440 + 620 Hz | CAS |
| CPT Busy/Reorder | CPTm CPT tones 480 + 620 Hz | CAS |
| CPT 350/480/620 | CPTn CPT tones 350 + 480 + 620 Hz | CAS |
| CPT 440/480/620 Hz | CPTo CPT tones 440 + 480 + 620 Hz | CAS |
| CPT 350/440/480/620 Hz | CPTp CPT tones 350 + 440 + 480 + 620 Hz | CAS |
| | | CAS |
| evDTMF | Dual Tone Multiple Frequency event conditions | CAS |
| DTMF 1 | DTMF digit one 697 + 1209 Hz | CAS |
| DTMF 4 | DTMF digit four 770 + 1209 Hz | CAS |
| DTMF 7 | DTMF digit seven 852 + 1209 Hz | CAS |
| DTMF * | DTMF symbol * 941 + 1209 Hz | CAS |
| DTMF 2 | DTMF digit two 697 + 1336 Hz | CAS |
| DTMF 5 | DTMF digit five 770 + 1336 Hz | CAS |
| DTMF 8 | DTMF digit eight 852 + 1336 Hz | CAS |
| DTMF 0 | DTMF digit zero 941 + 1336 Hz | CAS |
| DTMF 3 | DTMF digit three 697 + 1477 Hz | CAS |
| DTMF 6 | DTMF digit six 770 + 1477 Hz | CAS |
| DTMF 9 | DTMF digit nine 852 + 1477 Hz | CAS |
| DTMF # | DTMF symbol # 941 + 1477 Hz | CAS |
| DTMF A | DTMF character A 697 + 1633 Hz | CAS |
| DTMF B | DTMF character B 770 + 1633 Hz | CAS |
| DTMF C | DTMF character C 852 + 1633 Hz | CAS |
| DTMF D | DTMF character D 941 + 1633 Hz | CAS |
| DTMF Off | DTMF tone(s) has just finished | CAS |
| | | CAS |
| evMF | Multiple Frequency event conditions | CAS |
| MF off | MF tone(s) just finished | CAS |
| MF 1 | MF digit one 700 + 900 Hz | CAS |
| MF 2 | MF digit two 700 + 1100 Hz | CAS |
| MF 4 | MF symbol four 700 + 1300 Hz | CAS |
| MF 7 | MF digit seven 700 + 1500 Hz | CAS |
| MF st3p | MF indicator ST3P 700 + 1700 Hz | CAS |
| MF 3 | MF digit three 900 + 1100 Hz | CAS |
| MF 5 | MF digit five 900 + 1300 Hz | CAS |
| MF 8 | MF digit eight 900 + 1500 Hz | CAS |
| MF stp | MF indicator STP 900 + 1700 Hz | CAS |
| MF 6 | MF digit six 1100 + 1300 Hz | CAS |
| MF 9 | MF digit nine 1100 + 1500 Hz | CAS |
| MF kp | MF indicator KP 1100 + 1700 Hz | CAS |
| MF 0 | MF digit 0 1100 + 1500 Hz | CAS |

-continued

| SM Variable | Meaning | State Machine |
|---|---|---|
| MF st2p | MF indicator ST2P 1300 + 1700 Hz | CAS |
| MF st | MF indicator ST 1500 + 1700 Hz | CAS |
| | | CAS |
| evRng | Ringing event conditions | CAS |
| Machine Ring Off | Ringing has just finished | CAS |
| Machine Ring On | Ringing is in progress | CAS |
| | | CAS |
| ecSIT | Special Information Tone event conditions | CAS |
| SIT off | SIT tone has just finished | CAS |
| SIT s1lS | SIT tone segment 1 low short duration (s1 lS) | CAS |
| SIT s1hS | SIT tone segment 1 high short duration (s1 hS) | CAS |
| SIT s2lS | SIT tone segment 2 low short duration (s2 lS) | CAS |
| SIT s2hS | SIT tone segment 2 high short duration (s2 hS) | CAS |
| SIT s3lS | SIT tone segment 3 low short duration (s3 lS) | CAS |
| SIT s3hS | SIT tone segment high short duration (s3 hS) | CAS |
| SIT nst1 | no SIT tone 1 | CAS |
| SIT nst2 | no SIT tone 2 | CAS |
| SIT s1hL | SIT tone segment 1 low long duration (s1 hL) | CAS |
| SIT s1lL | SIT tone segment 1 high long duration (s1 lL) | CAS |
| SIT s2lL | SIT tone segment 2 low long duration (s2 lL) | CAS |
| SIT s2hL | SIT tone segment 2 high long duration (s2 hL) | CAS |
| SIT s3lL | SIT tone segment 3 low long duration (s3 lL) | CAS |
| SIT s3hL | SIT tone segment 3 high long duration (s3 hL) | CAS |
| SIT nst3 | no SIT tone 3 | CAS |
| evSUOfl | line circuit sensor offline conditions | CAS |
| SU Offline | the line circuit sensor has gone offline | CAS |
| evSUTrblBtn | line circuit sensor trouble button conditions | CAS |
| SU Mark Event In | SU trouble button is being pressed | CAS |
| SU Mark Event Out | SU trouble button just released | CAS |
| SGCP Cause Codes | | |
| bCcGWEndPntNoRdy | End Point Not Ready | SGCP |
| bCcGWnoResources | Gateway coes not have the requested capabilitiy | SGCP |
| bCcGWStaOffHk | GW detected station was off hook | SGCP |
| bCcGWwhatEndPnt | GW does not know the end point | SGCP |
| SGCP Message Events | | |
| bSbbvCAAckNTFYOK | Call Agent acknowledgement message of GW Notification message - Status = OK | SGCP |
| bSbbvCACRCX | CA Create Connection message | SGCP |
| bSbbvCADLCX | CA Delete Connection message | SGCP |
| bSbbvCAMDCX | CA Modify Connection message | SGCP |
| bSbbvCARQNT | CA Notification Request message | SGCP |
| bSbbvGWAckCRCXOK | GW acknowledgement message of CA Create Connection message - Status = OK | SGCP |
| bSbbvGWAckDLCXOK | GW acknowledgement message of GW Delete Connection message - Status = OK | SGCP |
| bSbbvGWAckMDCXOK | GW acknowledgement message of GW Modify Connection message - Status = OK | SGCP |
| bSbbvGWAckRQNTOK | GW acknowledgement message of GW Notification Request message - Status = OK | SGCP |
| bSbbvGWNTFY | GW Notify message | SGCP |
| Circuit Configuration Events | | |
| bVaG711 | Compression Algorithm G711 - 8 Khz | SGCP |
| bVaG726_32 | Compression Algorithm G726 - 32 Khz | SGCP |
| bVmAVP711P | Connection Mode G711 - 8 Khz | SGCP |
| bVmAVP726_32_4A | Connection Mode G726 - 32 Khz | SGCP |
| bVmRcvOnly | Connection Mode receive only | SGCP |
| bVmSndRcv | Connection Mode Send/Receive | SGCP |
| bVoDigits | GW Observed Events = Digits | SGCP |
| bVoOnHk | GW Observed Events = Station On Hook | SGCP |
| bVoStaOffHook | GW Observed Events = Station Off Hook | SGCP |
| bVoStaOnHk | GW Observed Events = Station On Hook | SGCP |
| bVpStatsAvail | Performance Statistics Available | SGCP |
| bVrOffHk | GW look for Station Off Hook | SGCP |
| bVrOnHk | GW look for Station Off Hook | SGCP |
| bVrStaOffHk | GW look for Station Off Hook | SGCP |
| bVsDTresp | GW send Dial Tone | SGCP |
| bVsRinging | GW set Ringing AB bit pattern | SGCP |
| bVsRingPhone | GW set Ringing AB bit pattern | SGCP |
| SGCP Call Counts Blocks | | |
| bCcbVGwNoRspAck | Count GW no response time out | SGCP |

-continued

| SM Variable | Meaning | State Machine |
|---|---|---|
| SGCP Call Dispositions | | |
| bCdvCAIncConFail | CA incoming call connection error | SGCP |
| bCdvCANotAck | CA not acknowledging GW message | SGCP |
| bCdvCAnotNtfyAck | CA not acknowledging GW Notify message | SGCP |
| bCdvCANotResp | CA not responding | SGCP |
| bCdvEndPntNoRdy | End point not ready | SGCP |
| bCdvGWAudio8 | Connection mode 8 Khz | SGCP |
| bCdvGWnoResorcs | GW not responding | SGCP |
| bCdvGWrelCall | GW released call | SGCP |
| bCdvGWReorder | GW sending Reorder tone | SGCP |
| bCdvIEmissing | CA or GW message has invalid information | SGCP |
| bCdvInvalidMsg | Invalid message Id | SGCP |
| bCdvLSCircuit | Call is a Loop Start call | SGCP |
| bCdvNtwkCallAns | Network answered call | SGCP |
| bCdvNtwkDisco | Network Disconnect | SGCP |
| bCdvNtwkDisco1st | Network disconnected first | SGCP |
| bCdvResetGW | GW reset | SGCP |
| bCdvStaAlrdyOfHk | Station already off hook | SGCP |
| bCdvStaDisco1st | Station disconnected first | SGCP |
| bCdvStatsAvail | GW statistics available | SGCP |
| bCdvTermCall | Terminating Call | SGCP |
| bCdvWhatEndPnt | End point unknown | SGCP |
| SGCP Network Toruble Events | | |
| bCntCANoWaitOnHk | CA did not wait for On Hook | SGCP |
| SGCP Network Unusual Events | | |
| bCnuCAnoNtyAck | CA not acknowledging GW Notify message | SGCP |
| SGCP Alarms | | |
| bIPMinorAlarm1 | Minor Alarm | SGCP |
| SGCP Notable States | | |
| bNsv1WayTrans | Call is in receive only mode | SGCP |
| bNsv2WayTrans | Call is in Send/receive mode | SGCP |
| bNsvAlerting | GW is alerting station | SGCP |
| bNsvAudRing | GW is generating Audible ringing | SGCP |
| bNsvCAIncConFail | CA incoming call connection failed | SGCP |
| bNsvCallEstb | Call established | SGCP |
| bNsvCAnotNtfyAck | CA not acknowledging GW Notify message | SGCP |
| bNsvCANotResp | CA not responding | SGCP |
| bNsvDigitRcvd | Digit received | SGCP |
| bNsvDigitsAcptd | Digits accepted | SGCP |
| bNsvEndPntNoRdy | End point not ready | SGCP |
| bNsvEstIncTrk | GW established Incoming Trunk | SGCP |
| bNsvGWAudio8 | GW set for Audio 8 Khz | SGCP |
| bNsvGWAudRing | GW sending audible ringing tone | SGCP |
| bNsvGWCollectDig | GW to collect digits | SGCP |
| bNsvGWdialTone | GW sending Dial Tone | SGCP |
| bNsvGWnoResorcs | GW does not have the requested capability | SGCP |
| bNsVGwNoRspAck | GW not responding to CA message | SGCP |
| bNsVGWnotReset | GW is not reset | SGCP |
| bNsvGWOffHook | GW detected Off hook | SGCP |
| bNsvGWready | GW is ready to accept call requests | SGCP |
| bNsvGWrelCall | GW released call | SGCP |
| bNsvGWReorder | GW sending Reorder | SGCP |
| bNsvGWwaitOffHk | GW waiting for Off Hook | SGCP |
| bNsvIBsigNoAvail | In band signaling is not available | SGCP |
| bNsvIdle | Circuit is Idle | SGCP |
| bNsvIdleWaiting | Circuit is Idle and waiting for a call | SGCP |
| bNsvIEmissing | CA or GW message has invalid information | SGCP |
| bNsvInvalidMsg | Invalid message Id | SGCP |
| bNSvLSCircuit | Circuit is Loop Start | SGCP |
| bNsvNtwkCallAns | Network answered the call | SGCP |
| bNsvNtwkCallPres | Network call is present | SGCP |
| bNsvNtwkDisco | Network disconnected the call | SGCP |
| bNsvNtwkDisco1st | Network disconnected first | SGCP |
| bNsvOffHk | Off hook | SGCP |
| bNsvPreStablCall | Presstable call | SGCP |
| bNsvRcvOnly | Circuit is in receive only mode | SGCP |
| bNsvResetGW | GW is reset | SGCP |
| bNsvStaAlrdyOfHk | Station is already off hook | SGCP |
| bNsvStaAns | Station answer | SGCP |
| bNsvStaDisco | Station disconnected | SGCP |
| bNsvStaDisco1st | Station disconnected first | SGCP |

| SM Variable | Meaning | State Machine |
|---|---|---|
| bNsvStatsAvail | GW statistics are available | SGCP |
| bNsvTermCall | Terminating call | SGCP |
| bNsvWait4OnHk | GW is waiting for an off hook | SGCP |
| bNsvWhatEndPnt | Unknown end point | SGCP |
| SGCP Statistics | | |
| bStssaIdleWait | Idle waiting | SGCP |
| bStssNoOffHkID | No off hook identified | SGCP |
| bStssStaDisco2st | Station sent second disconnect | SGCP |
| bStssv1WayTrans | Circuit has one way transmission only | SGCP |
| bStssv1WInTrkRdy | One way incoming trunk ready | SGCP |
| bStssvAlerting | alerting | SGCP |
| bStssvCAIncCFail | CA caused incomplete incoming call failure | SGCP |
| bStssvCAnoNtyAck | CA no GW notify acknowledgement | SGCP |
| bStssvEndPtNoRdy | End point is not ready | SGCP |
| bStssvEstIncTrk | Establishing incoming trunk | SGCP |
| bStssvGWnoResors | GW does not have the requested capability | SGCP |
| bStssVGwNoRspAck | GW not responding to CA message | SGCP |
| bStssvGWReorder | GW sending Reorder | SGCP |
| bStssvIdle | Idle | SGCP |
| bStssvMDCXrcvd | CA MDCX message was received | SGCP |
| bStssvStableCall | Stable call | SGCP |
| bStssvStaOffHk | Station is off hook | SGCP |
| bStssvWhatEndPnt | Unknown End Point | SGCP |
| bStsvWaitOnHk | Waiting for off hook | SGCP |
| bStsvStaDisco1st | Station Disconnected First | SGCP |
| bStsvMDCXrcvd | CA MDCX message received | SGCP |
| SGCP Timer Events | | |
| bTmrrSiCAAckN200 | Set wait for CA Ack to GW Notify message Timer 200 ms | SGCP |
| bTmrrSiGWAckM200 | Set wait for GW Ack to CA Modify Connection message Timer 200 ms | SGCP |
| bTmrrSiGWAckR200 | Set wait for GW Ack to CA GW Notification Request message Timer 200 ms | SGCP |
| bTmrsSd2ndTri200 | Set 2nd Trial Timer expired 200 ms | SGCP |
| bTmrsSdCAAckN200 | Set wait for CA Ack message 200 ms | SGCP |
| bTmrsSdCancel3m | Set Cancel call in 3 minutes Timer | SGCP |
| bTmrsSdGWAckC200 | Set wait for GW Ack to CA Create Connection message Timer 200 ms | SGCP |
| bTmrsSdGWAckD200 | Set wait for GW Ack to CA Delete Connection message Timer 200 ms | SGCP |
| bTmrsSdGWAckM200 | Set wait for GW Ack to CA Modify Connection message Timer 200 ms | SGCP |
| bTmrsSdGWAckR200 | Set wait for GW Ack to CA GW Notification Request message Timer 200 ms | SGCP |
| bTmrsSdNoDig30k | Set no Digit received Timer | SGCP |
| bTmrsSdNull | Set Null Timer | SGCP |
| bTmrsSiCAAckN200 | Set wait for CA Ack to GW Notify message Timer 200 ms | SGCP |
| bTmrsSiGWAckM200 | Set wait for GW Ack to CA Modify Connection message Timer 200 ms | SGCP |
| bTmrsSiGWAckR200 | Set wait for GW Ack to CA Notification Request message Timer 200 ms | SGCP |
| bTmdSd2ndTri200 | 2nd Trial Timer expired 200 ms | SGCP |
| bTmdSdCAAckN200 | Wait for CA Ack message 200 ms | SGCP |
| bTmdSdCancel3m | Cancel call in 3 minutes Timer | SGCP |
| bTmdSdGWAckC200 | Wait for GW Ack to CA Create Connection message Timer 200 ms | SGCP |
| bTmdSdGWAckD200 | Wait for GW Ack to CA Delete Connection message Timer 200 ms | SGCP |
| bTmdSdGWAckM200 | Wait for GW Ack to CA Modify Connection message Timer 200 ms | SGCP |
| bTmdSdGWAckR200 | Wait for GW Ack to CA GW Notification Request message Timer 200 ms | SGCP |
| bTmdSdNull | Null Timer | SGCP |
| bTmdSiCAAckN200 | Wait for CA Ack to GW Notify message Timer 200 ms | SGCP |
| bTmdSiGWAckM200 | Wait for GW Ack to CA Modify Connection message Timer 200 ms | SGCP |
| bTmdSiGWAckR200 | Wait for GW Ack to CA Notification Request message Timer 200 ms | SGCP |
| SGCP States | | |
| stCACallPres | CA Call Present | SGCP |
| stCADigitsAcptd | CS Digits Accepted | SGCP |
| stCAError1 | CS Error1 | SGCP |
| stCallInProg | Call in Progress | SGCP |
| stCAntwkDisco | CA Network Disconnect | SGCP |

-continued

| SM Variable | Meaning | State Machine |
| --- | --- | --- |
| StCreateGWtrk | Create GW Trunk | SGCP |
| stCutThruTrk | Cut Through Trunk | SGCP |
| stDiscoGWTrk | Disconnect GW Trunk | SGCP |
| stEndPntNoRdy | End Point Not Ready | SGCP |
| stErrorHandler | Error Handler | SGCP |
| stGWaudiContMade | GW Audio Connection Made | SGCP |
| stGwAudRing | GW Audible Ringing | SGCP |
| stGWaudRingSent | GW Audible Ringing Sent | SGCP |
| stGWCallAcptd | Call Accepted | SGCP |
| stGWcutThruTrk | GW Cut Through Trunk | SGCP |
| stGWDigitRcvd | GW Digit Received | SGCP |
| stGWIdle | GWE Idle | SGCP |
| stGWIncIdle | GW Incoming Idle | SGCP |
| stGWOffHook | GW Off Hook | SGCP |
| stGWOnHkReady | GW On Hook Ready | SGCP |
| stGwReset | GW Reset | SGCP |
| stGwResetReq | GW Reset Requested | SGCP |
| stGWrmvTrk | GW Remove Trunk | SGCP |
| stGWstaDisco | GW Station Disconnect | SGCP |
| stGwTrkRel | GW Trunk Released | SGCP |
| stGWwaitOnHk | GW Waiting On Hook | SGCP |
| stIncStaOnHk | Incoming Station On Hook | SGCP |
| stIPAlertReq | IP Alert Requested | SGCP |
| stIPCANotResp | CA not Responding | SGCP |
| stIPOffHook | OFF Hook | SGCP |
| stIPResetGW | GW Reset | SGCP |
| stNtwkCallAns | Network Call Answered | SGCP |
| stNtwkDisco | Network Disconnect | SGCP |
| stReceiveDigits | Received Digits | SGCP |
| stRemoveTrk | Remove trunk | SGCP |
| stStableCall | Stable Call | SGCP |
| stStaDisco | Station Disconnect | SGCP |
| StStaOnHk | Station On Hook | SGCP |
| stVAlertgStart | Alerting Started | SGCP |
| stVAlerting | Alerting | SGCP |
| stvCAIncConFail | CA Incoming Connection Failed | SGCP |
| stvCAnotNtfyAck | CA Not responding to GW Notify message | SGCP |
| stVCAnotResp1 | CA Not Responding 1 | SGCP |
| stVEstIncTrk | Established Incoming Trunk | SGCP |
| stVGWnoResources | GW no Resources Available | SGCP |
| stVGwNotRespCR | GW not Responding to CRCX | SGCP |
| stVIdle | Idle | SGCP |
| stVIdleReady | Idle Ready | SGCP |
| stVIdleWaiting | Idle Waiting | SGCP |
| stVIncTrkEstb | Incoming trunk Established | SGCP |
| stVnoWhatEndPnt | End Point Unknown | SGCP |
| stvPreStableCall | Pre Stable Call | SGCP |
| stVStaAlrdyOffHk | Station Already Off Hook | SGCP |
| StvStblCallWaitg | Stable Call Waiting | SGCP |
| stvStCallArmed | Call Armed | SGCP |
| Analysis Call Count Blocks | | |
| bCcbaCAConDly | CA connection delay | Analyze |
| bCcbaCAnoMDerr | CA no MDCX message sent error | Analyze |
| BCcbaGWnoFNtfy | No NTFY message sent by GW | Analyze |
| bCcbaGWnoOHkDt | No Off Hook detected by GW | Analyze |
| bCcbaGWnoRQNTOK | GW did not respond to CA RQNT message | Analyze |
| bCcbAGwNotResp2C | GW not responding to CA CRCX message | Analyze |
| bCcbaGWnotRng | GW not ringing | Analyze |
| bCcbaGWRingErr | GW ringing error | Analyze |
| bCcbStaPermSig | Station went to Permanent Signal | Analyze |
| Analysis Call Dispositions | | |
| bCda3WayCall | 3 Way Call | Analyze |
| bCdaBadCall | Bad Call | Analyze |
| bCdaCAcktSetpErr | CA circuit setup error | Analyze |
| bCdaCAConDly | CA CRCX delay | Analyze |
| bCdaCACPerror1 | CA Call Processing error | Analyze |
| bCdaCAerror | CA error | Analyze |
| bCdaCallFailure | Call Failure | Analyze |
| bCdaCAnoMDCXerr | CA did not send MDCX message | Analyze |
| bCdaCktNotIdle | Circuit is not idle | Analyze |
| bCdaDtDly | Dial Tone Delay | Analyze |
| bCdaErrorCall | Erred call | Analyze |
| bCdaGoodCall | Good Call | Analyze |
| bCdaGW2RngTmrBad | GW timer has timed out twice | Analyze |

-continued

| SM Variable | Meaning | State Machine |
|---|---|---|
| bCdaGWDigitTO | GW Timed Out waiting for digit | Analyze |
| bCdaGWnoDigIdent | GW did not identify digits even though they were sent | Analyze |
| bCdaGWnoFlshNtfy | GW did not detect a legitimate Flash | Analyze |
| bCdaGWnoOfHkDet | GW did not detect a legitimate Off Hook | Analyze |
| bCdaGWnoRngAck | GW did not send Ringing acknowledgement message | Analyze |
| bCdaGWnoRQNTOK | GW did not send RQNT acknowledgement message | Analyze |
| bCdAGWnotResp2C | GW not responding to second CRCX message | Analyze |
| bCdaGWOffHkErr1 | GW Off Hook Error 1 | Analyze |
| bCdaGWProtoErr2 | GW Protocol Error 2 | Analyze |
| bCdaGWrejCRCX | GW rejected CA CRCX message | Analyze |
| bCdaGWringEarly | GW rang the station early | Analyze |
| bCdaGWringError | GW ringing error | Analyze |
| bCdaGWRingLate | GW ringing late | Analyze |
| bCdaGWtermCall | GW terminating Call | Analyze |
| bCdaNoDigDetErr | GW no digits reported error | Analyze |
| bCdaNtwkAbdnCall | Network abandoned call | Analyze |
| bCdaNtwkDiscEly | Network disconnected early | Analyze |
| bCdaOrgCall | Originating Call | Analyze |
| bCdaRngConfirm | GW Ringing confirmed | Analyze |
| bCdaStaAbdnCall | Station abandoned call | Analyze |
| bCdaStableCall | Stable call | Analyze |
| bCdaStaOffHkErr | Station Off Hook error | Analyze |
| bCdaStaPermSig | Station in Permanent Signal mode | Analyze |
| bCdaSubAnswer | Station answered | Analyze |
| Analysis Network Unusual Events | | |
| bCnuaGWnoRngAck | GW did not send Ringing acknowledgement message | Analyze |
| bCnuaGWringEarly | GW rang the station early | Analyze |
| Analysis Notable States | | |
| bNsa3WayCall | 3 Way Call | Analyze |
| bNsa3WayCallSt | 3 Way call starting | Analyze |
| bNsaCA2CompCall | CA tried twice to complete call | Analyze |
| bNsaCAcktSetpErr | CA circuit setup error | Analyze |
| bNsaCAcktSetup | CA attempting to set up a call | Analyze |
| bNsaCAConDly | CA connection delay | Analyze |
| bNsaCACPerror1 | CA Call Processing error 1 | Analyze |
| bNsaCAerror | CA error | Analyze |
| bNsaCAflashOK | CA Flash OK | Analyze |
| bNsaCAnoMDCXerr | CA did not send MDCX message | Analyze |
| bNsaCktDiscoCmp | Circuit disconnect complete | Analyze |
| bNsaCktNotIdle | Circuit is not idle | Analyze |
| bNsaCRCXb4Digits | CRCX message received before digits were sent | Analyze |
| bNsaDtDly | Dial Tone Delay | Analyze |
| bNsaGoodCall | Good Call | Analyze |
| bNsaGWDetDig | GW detected digits | Analyze |
| bNsaGWDigitTO | GW Timed Out waiting for digit | Analyze |
| bNsaGWDTerror | GW dial Tone error | Analyze |
| bNsaGWIdle | GW Idle | Analyze |
| bNsaGWnoDigIdent | GW did not identify digits even though they were sent | Analyze |
| bNsaGWnoFlshNtfy | GW did not detect a legitimate Flash | Analyze |
| bNsaGWnoOfHkDet | GW did not detect a legitimate Off Hook | Analyze |
| bNsaGWNoRingErr | GW did not send Ringing acknowledgement message | Analyze |
| bNsaGWnoRngAck | GW did not send RQNT acknowledgement message | Analyze |
| bNsaGWnoRQNTOK | GW did not respond to RQNT message | Analyze |
| bNsAGWnotResp2C | GW did not respond to CA CRCX message | Analyze |
| bNsaGWOffHkErr1 | GW Off Hook Error 1 | Analyze |
| bNsaGWrecovrNoRg | GW recovered form No ringing state | Analyze |
| bNsaGWrejCRCX | GW rejected CA CRCX message | Analyze |
| bNsaGWringEarly | GW rang the station early | Analyze |
| bNsaGWringError | GW ringing error | Analyze |
| bNsaGWRinging | GW ringing station | Analyze |
| bNsaGWRingLate | GW ringing late | Analyze |
| bNsaGWRngSta | GW Ringing Station | Analyze |
| bNsaGWsndDT | GW sent Dial Tone | Analyze |
| bNsaGWtermCall | GW Terminating Call | Analyze |
| bNsaInBndCPNBusy | Calling Party's line is busy, busy tone supplied in band | Analyze |
| bNsaInCallPresnt | Ca;; presented to GW | Analyze |
| bNsaNoDigDetErr | GW no digits reported error | Analyze |
| bNsaNoTransPath | No transmission path provided | Analyze |
| bNsaNtwkDiscEly | Network disconnected early | Analyze |
| bNsaNtwkDisco | Network initiated disconnect | Analyze |
| bNsaOrgCall | Originating Call | Analyze |
| bNsaOrgNkDisco | Network disconnect for an Originating call | Analyze |
| bNsaOrgStbCall | Stable Originating call | Analyze |
| bNsaPreOnHk | Pre On Hook state | Analyze |

| SM Variable | Meaning | State Machine |
| --- | --- | --- |
| bNsaStaAbdnCall | Station abandoned call | Analyze |
| bNsaStaAudRing | Audible ringing sent to Station | Analyze |
| bNsaStaDigRcvd | GW detected Station digits | Analyze |
| bNsaStaDisco | Station initiated disconnect | Analyze |
| bNsaStaDiscoErr | Station was disconnected in error | Analyze |
| bNsaStaHk | Station On Hook | Analyze |
| bNsaStaIdle | Station is Idle | Analyze |
| bNsaStaOffHkErr | Station Off Hook error | Analyze |
| bNsaStaPermSig | Station in Permanent Signal mode | Analyze |
| bNsaSubAnswer | Station answered | Analyze |
| bNsaTranCutThru | Transmission is now 2 way | Analyze |
| bNsGwOffHkNtfy | GW notified CA of Station Off Hook | Analyze |
| bNsGWTrkRel | GE released the trunk | Analyze |
| bNsOrgCallPres | Originating call present | Analyze |
| bNsSetup2ndCall | Second call setup attempt | Analyze |
| Analysis Statistics | | |
| bStsaBadCall | Bad Call | Analyze |
| bStsaGWrcvrNoRg | GW received no ringing message | Analyze |
| bStssa3WayCall | 3 Way Call | Analyze |
| bStsaGWNoRngErr | GE did not set Ringing AB bits | Analyze |
| bStsaGWOfHkErr1 | GW did not detect Off Hook | Analyze |
| bStsaGWofHkNtfy | GW did not notify CA of an Event | Analyze |
| bStsaGWRingCnf | Ringing confirmed - both LS and SGCP CPs verified ringing | Analyze |
| bStsaGWRinging | GW is ringing the station | Analyze |
| bStsaSubAnswer | Station Answered | Analyze |
| bStsaUnusalCall | Collection of calls that had unusual events - call processing was successful | Analyze |
| bStssa3WayCallSt | 3 Way call starting | Analyze |
| bStssaBadCall | Bad Call | Analyze |
| bStssaCA2ComCall | CA tried twice to complete call | Analyze |
| bStssaCAcktSetup | CA attempting to set up a call | Analyze |
| bStssaCAcktSUErr | CA circuit setup error | Analyze |
| bStssaCAConDly | CA connection delay | Analyze |
| bStssaCACPerror1 | CA Call Processing error 1 | Analyze |
| bStssaCAerror | CA error | Analyze |
| bStssaCAnoMDerr | CA did not send MDCX message error | Analyze |
| bStssaCktDiscCmp | Circuit disconnect complete | Analyze |
| bStssaCktNotIdle | Circuit is not idle | Analyze |
| bStssaCXb4Digits | CRCX message received before digits were sent | Analyze |
| bStssaDtDly | Dial Tone Delay | Analyze |
| bStssaGoodCall | Good Call | Analyze |
| bStssaGW2RgTmBad | GW ringing timing bad | Analyze |
| bStssaGWDigitTO | GW Timed Out waiting for digit | Analyze |
| bStssaGWDTerror | GW dial Tone error | Analyze |
| bStssaGWflash | GW detected Flash | Analyze |
| bStssaGWIdle | GW Idle | Analyze |
| bStssaGWnoDigsId | GW did not identify digits even though they were sent | Analyze |
| bStssaGWnoFNtfy | GW did not detect a legitimate Flash | Analyze |
| bStssaGWnoOHkDt | GW did not detect a legitimate Off Hook | Analyze |
| bStssaGWnoRngAck | GW did not send Ringing acknowledgement message | Analyze |
| bStssaGWNoRngErr | GW did not ring station | Analyze |
| bStssaGWOfHkErr1 | GW Off Hook Error 1 | Analyze |
| bStssaGWofHkNtfy | GW off Hook Notify message sent | Analyze |
| bStssaGWRingCnf | GW Ringing confirmed | Analyze |
| bStssaGWringErly | GW rang the station early | Analyze |
| bStssaGWRinging | GW Ringing Station | Analyze |
| bStssaGWRingLate | GW ringing late | Analyze |
| bStssaGWrngError | GW ringing error | Analyze |
| bStssaGWRngSta | GW ringing station | Analyze |
| bStssaGWsndDT | GW sent Dial Tone | Analyze |
| bStssaGWtermCall | GW Terminating Call | Analyze |
| bStssaGWTrkRel | GW released Trunk | Analyze |
| bStssaInBdCPNBsy | Calling Party's line is busy, busy tone supplied in band | Analyze |
| bStssaInCallPres | Call presented to GW | Analyze |
| bStssaNkDiscEly | Network disconnected call early | Analyze |
| bStssaNoDigDet | GW no digits reported error | Analyze |
| bStssaloTrnsPath | No transmission path provided | Analyze |
| bStssaOrgCall | Originating Call | Analyze |
| bStssaOrgCalPres | Originating call present | Analyze |
| bStssaOrgStbCall | Stable Originating call | Analyze |
| bStssaPreOnHk | Pre On Hook state | Analyze |
| bStssaSetupCall2 | Second call setup attempt | Analyze |
| bStssaStaAudRing | Audible ringing sent to Station | Analyze |
| bStssaStableCall | Stable call | Analyze |
| bStssaStaDigRcvd | GW detected Station digits | Analyze |

-continued

| SM Variable | Meaning | State Machine |
|---|---|---|
| bStssaStaDisco | Station initiated disconnect | Analyze |
| bStssaStaOffHk | Station Off Hook | Analyze |
| bStssaStaOfHkErr | Station Off Hook error | Analyze |
| bStssaStaPermSig | Station in Permanent Signal mode | Analyze |
| bStssaSubAnswer | Station answered | Analyze |
| bStssaTrnCutThru | Transmission is now 2 way | Analyze |
| Analysis Timer Events | | |
| bTmrsaCktRdy5k | Circuit ready timer - 5 seconds | Analyze |
| bTmrsaDigTO5k | GW Digit report timer - 5 seconds | Analyze |
| bTmrsaGWack200 | GW acknowledgement message timer - 200 ms | Analyze |
| bTmrsaGWnoRng7k | No Ringing detection timer - 7 seconds | Analyze |
| bTmrsAmRngDet4k | Ringing detection timer - 4 seconds | Analyze |
| bTmrsaPSig20k | GW station Permanent Signal timer - 20 seconds | Analyze |
| bTmrsaSdGWsdDT3k | GW stutter Dial Tone over timer - 3 seconds | Analyze |
| bTmrsaSdWait1k | 1 second wait timer | Analyze |
| bTmrsaSdWtCon500 | 500 ms wait for create connection timer | Analyze |
| bTmrsaWait13k | 13 second wait timer | Analyze |
| bTmrsaWtStOH30k | 30 second wait for on hook timer | Analyze |
| bTmdaDigTO5k | GW Digit report timer - 5 seconds | Analyze |
| bTmdaGWack200 | GW acknowledgement message timer - 200 ms | Analyze |
| bTmdaGWFlsh200 | GW Flash reporting timer - 200 ms | Analyze |
| bTmdAmRngDet4k | Ringing detection timer - 4 seconds | Analyze |
| bTmdaPSig20k | GW station Permanent Signal timer - 20 seconds | Analyze |
| bTmdaSdGWsdDT3k | GW stutter Dial Tone over timer - 3 seconds | Analyze |
| bTmdaSdWait1k | 1 second wait timer | Analyze |
| bTmdaSdWtCon500 | 500 ms wait for create connection timer | Analyze |
| bTmdaWait13k | 13 second wait timer | Analyze |
| bTmdaWtStOH30k | 30 second wait for on hook timer | Analyze |
| bTmrsGWnoRng7k | No Ringing detection timer - 7 seconds | Analyze |
| Analysis States | | |
| sAmtStaDigRcvd | Station digits received | Analyze |
| stAm3WayCall | 3 Way Call | Analyze |
| stAm3WayCallSt | 3 Way call Start | Analyze |
| stAm3WdigCmp | 3 way digits complete | Analyze |
| stAmAlertNorm | Alert Normal | Analyze |
| stAmAlertReady | Alert Ready | Analyze |
| stAmCA2CompCall | CA to complete call | Analyze |
| stAMCAcktSetpErr | CA circuit setup error | Analyze |
| stAmCAcktSetup | CA circuit setup | Analyze |
| StAmCAConDly | CA Connection Delay | Analyze |
| stAmCaCPerror1 | CA Call Processing error | Analyze |
| stAmCAflshOK | CA Flash Ok | Analyze |
| stAmCaGlareIdent | CA Glare Identified | Analyze |
| stAmCAnoMDCXerr | CA No MDCX message sent | Analyze |
| stAmCAsetDT | CA set Dial Tone | Analyze |
| stAmCircuitReady | Circuit ready | Analyze |
| stAmCktDiscoCmp | Circuit Disconnect complete | Analyze |
| stAmCktNotIdle | Circuit not Idle | Analyze |
| stAmDigitTO | Digit Time Out | Analyze |
| stAmGWCECXerr1 | GW create connection error 1 | Analyze |
| stAmGWdt | GE dial Tone | Analyze |
| stAmGWidle | GW Idle | Analyze |
| stAmGWInCallPres | Gateway Incoming call present | Analyze |
| stAmGWnoDigDet | GW no Digits Detected | Analyze |
| stAmGWnoDigits | GW No Digits | Analyze |
| StAmGWnoOfHkDet | GW No Off Hook Detected | Analyze |
| stAmGWNoRingErr | GW No Ringing Error | Analyze |
| StAmGWnoRngAck | GW No Ringing Acknowledge | Analyze |
| stAmGWOffHkErr1 | GW Off Hook Error 1 | Analyze |
| stAmGwOffHkNtfy | GW Off Hook Notify | Analyze |
| stAmGWrecovrNoRg | GW recovered ringing | Analyze |
| stAmGWrejCRCX | GW rejected CRCX message | Analyze |
| stAmGWRelTrk | GW released Trunk | Analyze |
| stAmGWrinfEarly | GW Ringing early | Analyze |
| stAmGWringError | GW Ringing Error | Analyze |
| stAmGWRngLate | GW Ringing Late | Analyze |
| stAmGWRngSta | GW Ringing Station | Analyze |
| stAmInBndCPNBusy | In band Calling Party Number Busy | Analyze |
| stAMNtwkDiscEly | Network Disconnect Early | Analyze |
| stAmNtwkDisco | Network Disconnect | Analyze |
| stAmOrgCallPres | Originating Call Present | Analyze |
| stAmOrgNtwkDisco | Originating Network Disconnect | Analyze |
| stAmOrgStbCall | Originating Stable Call | Analyze |
| stAmPreDisco | Pre Disconnect | Analyze |
| stAmSetup2ndCall | Setup second Call | Analyze |
| stAmStaAbdnCall | Station Abandon Call | Analyze |

-continued

| SM Variable | Meaning | State Machine |
|---|---|---|
| stAmStaAudRing | Station Audible Ringing | Analyze |
| stAMStableCallWt | Stable call Waiting | Analyze |
| stAmStaDisco | Station Disconnected | Analyze |
| stAmStaDiscoErr | Station Disconnect Error | Analyze |
| stAmStaDiscSt | Station Disconnect Start | Analyze |
| stAmStaIdle | Station Idle | Analyze |
| stAmStaOffHkErr | Station Off Hook Error | Analyze |
| stAmStaOnHk | Station On Hook | Analyze |
| stAmStaPermSig | Station Permanent Signal | Analyze |
| stAmSubAnswer | Station Answered | Analyze |
| stAmTalkPathRdy | Talk Path Ready | Analyze |
| stAmTCallAnal1 | Terminating Call Analysis 1 | Analyze |
| stAmTermNKDiscSt | Terminating Network Disconnect Start | Analyze |
| stAmTermStaDisSt | Terminating Station Disconnect Start | Analyze |
| stAmTranCutThru | Transmission cut through | Analyze |
| stAOrgCallInit | Originating call Initiated | Analyze |
| stGWnoDigsIdent | GW no Digits Identified | Analyze |
| stStaDialing | Station Dialing | Analyze |

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, elements, algorithms, and circuits have not been described in detail so as not to obscure the invention.

The present invention discloses a method of testing, monitoring, and analyzing traffic in a Next Generation Telephony Network (NGTN) using call analyzers. FIG. 1 illustrates in diagram form various exemplary connection configurations using the call analyzer in accordance with the present invention. The call analyzer may monitor status of calls originating and terminating at a variety of devices. Referring to FIG. 1, the call analyzer, referred to herein as a Expert Call Analyzer (ECA) may be connected to monitor a simple telephony environment such as a call which exists between the central office (CO) 100 and a residence 102. The ECA may also be connected to a more complex environment such as a business having a private branch exchange (PBX) 104.

In the NGTN network, the ECA may passively monitors the protocol between two or more network elements in a circuit while simultaneously monitoring control and status messages from an NGTN call Agent, Gatekeeper or Gateway. For example, the ECA 150 monitors the protocol between the PBX 104 and the IP Gateway 160. The ECA 150 also monitors the control and status messages between the call Agent or Gatekeeper 175 and the IP Gateway 160. This is different from prior art devices that are active elements of the circuit and therefore requiring that a portion of the protocol created relates to the functioning of the network element performing the monitoring. The call analyzer of the present invention provides detailed analysis of the progress of the call by monitoring signals originating from more than one network element and the response to these signals by the NGTN Gateway and call control managers such as, for example, Call Agent or Gatekeeper 175.

In the present embodiment, the ECA may be connected to the NGTN switched circuits that contain raw call progress signaling. The ECA may also be connected to the call control channel (LAN, H323, H225, etc.) that carries information indicative of the progress of a call. The type of raw call progress signaling information is dependent upon the environment monitored. For example, the sensors may provide physical events (DC/AC voltage and current changes, tones, etc.), call setup messages (ISDN D-Channel messages, CCS7-ISUP messages, etc.) or digital carrier signaling bits (T1/E1 A&B signaling bits). Thus, if the call progress event sensor is to provide physical event information, it may provide a voltage transition from 48 volts (ring conductor to ground) to 36 volts (ring conductor to ground) indicative of an off hook event, or a voltage transition from 36 volts (ring conductor to ground) to 48 volts (ring conductor to ground) indicative of an on hook event, or a dual frequency detection of 770 Hz and 1336 Hz indicative of a DTMF (dual tone multiple frequency) Digit 5 On event. Alternatively, if the NGTN control channel sensor is to provide call setup and status information, it may provide a Notification Request message decode indicative of the Call Agent's 175 request to the IP Gateway 160 to initiate a call, or a Status message decode indicative of the IP Gateway's 160 detection of an Off Hook condition.

The ECA tracks the number of calls generated over the monitored circuit and captures all raw call progress signaling information that occurs between the origination and termination of each call. The ECA may be placed in the serving Central Office (CO) 100 and/or the subscriber locations such as, for example, the residence 102 and the business 104.

As illustrated in FIG. 1, the ECA may be connected to wide variety of circuits or facilities that carry telephone or telephone-like calls. For example, ECA 151 is connected to a local subscriber cable pair 110; ECA 152 is connected to a T1/E1 Digital Carrier (CXR) 120; ECA 153 is connected to an Integrated Services Digital Network (ISDN)/Aysnc., Symmetrical, Variable, High bit rate, etc. Digital Subscriber Line (DSL) cable pair 125; ECA 150 is connected to an ATM or Frame Relay T1 facilities 135; ECA 153 is connected to a LAN/WAN 140.

The Call Progress event sensor and the NGTN control channel sensor of the ECA can be connected intrusively or non-intrusively to the circuit. When the Call Progress event sensor is connected non-intrusively, it is half tapped on the circuit via a high resistance. This permits the Call Progress event sensor to be connected while the circuit is in use without affecting the circuit. In one embodiment, it is preferable to use this type of connection for data circuits, 911 circuits, and other sensitive type circuits. When the Call Progress event sensor is connected intrusively, the circuit is opened up and taken out of service for a short time in order to connect the sensor. Therefore, the circuit is connected through the sensor.

This connection permits current detection in analog circuits, making it more accurate since current can be used as an additional parameter for analysis. Current can not be detected in non-intrusive connections.

The NGTN control channel sensor can be connected non-intrusively to a LAN/WAN via a hub, or as a Terminal on a LAN by half tapping the T1 or E1 facility carrying the control channel. Intrusive access can be provided for T1/E1 facility access but is not necessary for LAN/WAN access. Using either type of connection, the ECA 150 can generate accurate determination as to the current value that is present at any time because the states are monitored so closely. From the raw call progress signaling and NGTN call control information, the ECA 150 processes the detected events and, in the present embodiment outputs call count and call event information to an output device such as, for example, an external display system 145.

Referring to FIG. 1, ECA 150 is connected to T1 facility 155 that feeds a subscriber's PBX 104. When a call is placed to the PBX 104 on one of the T1 channels, the Call Progress event sensor of the ECA 150 captures the raw call progress signaling information indicative of the occurrence of physical events, for example an AB bit change to 0001 for 2 seconds, an AB bit change to 0101 for 4 seconds, an AB bit change to 0111, and an AB bit change to 0101. The sensor identifies the AB bit change and passes the raw call progress signaling information to the call progress event analyzer module of the ECA 150, where each raw call progress signaling event detected is time stamped and converted to logical call handling events for subsequent processing by the system. The logical call handling events may include Machine Ring On, Machine Ring Off, Off Hook, and On Hook. The logical call handling events are passed to the protocol independent call processor module that calls a timer processor which calculates the elapsed time from the previous call progress event, determines if any other timer(s) previously set by the call progress state machine has expired. These timers are used to determine the wait for an expected call progress event, for example dial tone should be detected within 4 seconds after an off hook event is detected, or validate the duration of a call progress event, for example DTMF digits should remain on for at least 50 ms to be valid.

Similarly, the NGTN call control sensor identifies NGTN call control message and status message, and passes the decodes of these messages to the NGTN event analyzer module, where each message detected is time stamped and converted to logical call handling events for subsequent processing by the system. Additional information about the meaning of the NGTN message is provided by the call control message information element (IE) information. The call control message information element (IE) information is a part of the NGTN message. For example, an NGTN message, Notify, sent by the Gateway informs the Call Agent that a request event or events had occurred. The information element (IE) with in the Notify message could be Dialed Digits, an Off Hook indication, Flash, Bandwidth requested, Sequence number, error code, etc. These are common building blocks of both NGTN and Call Progress (ISDN, SS7, etc.) messages. The message type (Notify, Notification Request, Create Connection, etc) is the event, the IE is data describing the event. The state machine doesn't always need all the IE information, but it is included in the call record, therefore it is set by the either the event processor and/or qualified by the state machine.

NGTN control and status message may include Notification Request message to ring the phone and upon detection of an off hook remove the ringing, Notify message indicating the Off hook was detected, Notification Request message to wait for an On Hook, and Notify message indicating an On Hook was detected. The logical call handling events are passed to the protocol independent call processor module that calls a timer processor which calculates the elapsed time from the previous NGTN message event to receipt or generation of the NGTN message event, determines if any other timer(s) previously set by the NGTN state machine has expired. These timers are used to determine the wait for an expected NGTN control or status message, for example a Notification message should be sent within 100 ms of the time call progress event was detected, or validate response times between gateway and Call Agent, for example an Acknowledgement message should be sent back to the originator within 1 second of a transmitted message.

The timer processor selects the most recent event in time, for example expired-timer or call progress event, and clocks the call progress state machine. When clocked, the call progress state machine analyzes the event and current call status indicators provided by a call status handler located in the protocol independent call processor module. The call status handler is used to track the current status of the call, for example dial tone received, the call is an originating call, circuit is off hook, etc. The call progress state machine either transitions to a new state or remains in the current state. If it transitions to a new state, the call progress state machine updates the call status handler with the new status information, updates a state tracker processor of the protocol independent call processor module with the new state and informs the timer processor that state machine has completed the current cycle. If the call progress state machine did not transition to a new state, it informs the timer processor that it has completed the current cycle without altering the contents of the call status handler of state tracker. This process is performed for the logical call handling event and each expired timer identified by the timer processor. The protocol independent call processor module and the call progress state machine then wait for the next event to occur.

Similarly, the timer processor selects the most recent NGTN control or status event, for example expired-timer or presence of a control or status message, and clocks the NGTN state machine. When clocked, NGTN state machine analyzes the event and current call handling status indicators provided by a call status handler located in the protocol independent call processor module. The call status handler is used to track the current status of the call as seen by the call control manager (Call Agent/Gatekeeper) 175, for example digits detected notification message sent by the IP Gateway 160, call control manager 175 responded with Ack message within 100 ms, and call terminated by call control manager 175, etc. The NGTN state machine either transitions to a new state or remains in the current state. If it transitions to a new state, the NGTN state machine updates the call status handler with the new status information, updates a state tracker processor of the protocol independent call processor module with the new state and informs the timer processor that state machine has completed the current cycle. If the NGTN state machine did not transition to a new state, it informs the timer processor that it has completed the current cycle without altering the contents of the call status handler of state tracker. This process is performed for the NGTN control or status event and each expired timer identified by the timer processor.

When either the call progress or NGTN state machines have been updated with new event information, an analysis engine consisting of an analysis state machine and Alarm Handler evaluates their current state. The Analysis state machine is also referred to as a multi protocol analyzer. The multi protocol analyzer has a total view of the call, where as the call progress state machine's view is limited to the PBX 104 and IP Gateway 160 TDM/ISDN interface, and the NGTN state machine's view is limited to the call handling of the IP Gateway control channel 160 and the call control manager 175.

The multi protocol analyzer or analysis state machine is triggered by the timer processor at the end of the NGTN or Call Progress state machine cycle. When triggered, the analysis state machine uses state, event and status information from the status handler to transition to a new state. For example when the last digit was sent from the PBX 104, the IP Gateway 160 sends a notification message to the call control manager 175. The notification message contains the same digits detected by the call progress state machine. The analysis state machine transitions to a Call Initiated state. If the trigger does not result in a new analysis state, it informs the timer processor that it has completed the current cycle. All state machines are now ready for the next event.

If the multi protocol analyzer/analysis state machine transitions to an alarm or error state, the timer processor is notified and an alarm condition is sent to the alarm handler. For example, a digits-received notification is sent by the IP gateway 160 to the call control manager 175, but an Ack message was not returned by the call control manager 175. The alarm handler uses priority treatment algorithms to evaluate the severity of the alarm. Depending on the implementation of the invention, a server alarm condition could cause an alarm message to be sent to the user's network management system. In any event, the alarm condition is archived along with the call progress and NGTN status information in the status handler.

The states indicative of progression of the call are maintained for further analysis and reference. The information maintained is useful to test/maintenance personnel for analysis of the sensed circuit. For example, when the call progress state machine determines that the call has terminated, the information maintained may include Idle, Machine Ring On, Machine Ring Off, Station Off Hook, Stable Call, Station On Hook, and CO On Hook. The NGTN information that is maintained may include Call Agent Notification Request (ring station and wait for Off hook), Gateway Ack (ready), Gateway Notification (Call Answered), Call Agent Ack (ready), Call Agent Notification Request (wait for On Hook), Gateway Ack (ready), Call Agent Notification Request (Go On Hook, wait for Off Hook), Gateway Ack (ready), Gateway Notification (Call Cleared, waiting for Off Hook), and Call Agent Ack (ready). The Analysis Information that is maintained may include Normal Call Handling.

The state machines also determine unusual call events. For example, if a caller on the monitored line abandons the call before it is answered, the output of the state machine may include One Terminating Call, One Unusual Event—Caller Abandon. The output may also include events such as Idle, Machine Ring On, Machine Ring Off, and CO On Hook. The NGTN information may include Call Agent Notification Request (ring station and wait for Off hook), Gateway Ack (ready), Call Agent Notification Request (Go On Hook, wait for Off Hook), Gateway Ack (ready), Gateway Notification (Call Cleared, waiting for Off Hook), and Call Agent Ack (ready). The Analysis Information may include Normal Call Handling. It should be noted that even though the caller abandoned the call, from a call handling view, the call was handled normally.

Features such as described above allow maintenance personnel responsible for call processing to identify potentially bad Gateway circuits and correct them before subscriber trouble reports are generated.

Figure 2:
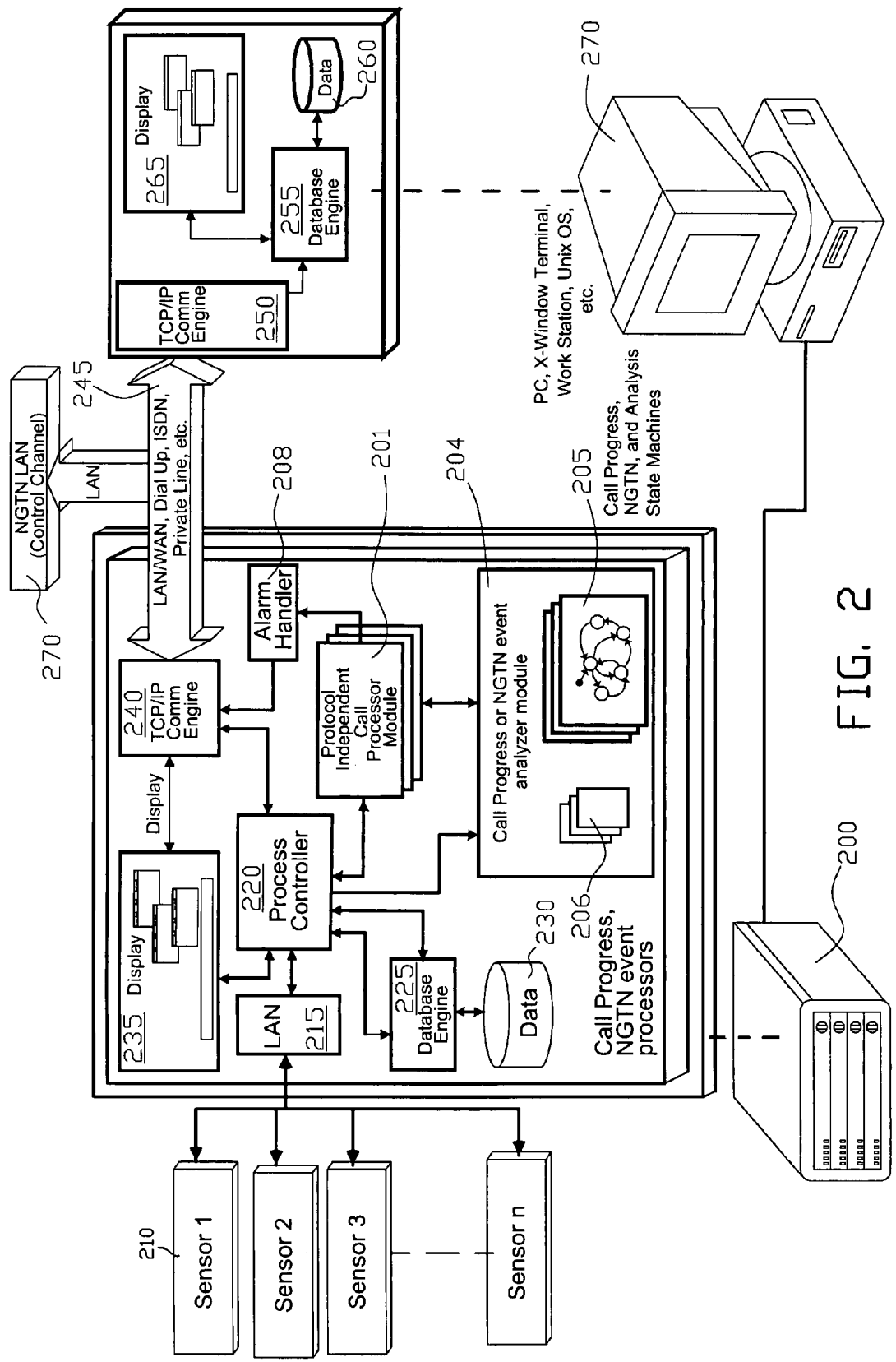
FIG. 2 is a simplified block diagram illustrating one exemplary embodiment of a configuration of the call analyzer coupled to sensors and remote devices.

FIG. 2 illustrates one embodiment of the system of the present invention. Device 200 captures raw call progress, NGTN call control and status information, indicative of progress of a call, detected on the monitored line and NGTN call control channel. The sensors 210 are connected to switched and/or NGTN network circuits coupled to the line to be monitored. The raw call progress signaling, the NGTN call control and status information is encoded into a data message and sent to a data communication device such as local area network (LAN) 215 where it is decoded and passed to an Call Progress or NGTN event analyzer module 204 via a Process Controller 220. NGTN control and status information can also be obtained from the NGTN LAN 270 where it is decoded and passed to an appropriate or NGTN event analyzer module 204 via a TCP/IP Communication Engines 240 and Process Controller 220. In one embodiment, it is preferable that a event analyzer module 204 consisting of a event processors and 201 and associated Call Progress State Machine 205, and a protocol independent call processor module is created for each switched or NGTN network circuit and NGTN Control channel connected to the system 200.

The event analyzer module 204 receives the physical event data from the sensors 210 and generates logical call handling event, passing it to the protocol independent call processor module where expired timer information and event information is used to clock the inputs to the call progress, NGTN, and analysis state machines/multi protocol analyzer 205. The call progress, NGTN, and Analysis state machines 205 determines the state the call has transitioned to based on the new event information and timer information and reports the state change, if any, back to the protocol independent call processor module. The protocol independent call processor module 201 updates call status, for example, either updates a local display 235 or a remote display 265, via a communication device 245 and 250, with the new call status. The state information can be output a variety of ways including displaying the results locally or on a remote display. In addition, the state information can be output to a database for archive purposes. In one embodiment, it is preferable that, once a completed call is detected by the call progress state, NGTN, and analysis state machines 205, the protocol independent call processor module 201 creates a call record containing event information and corresponding call states. The call record is passed to a database engine device 225 via the process controller device 220, which archives the call record in a database 230.

The archive of calls may be later accessed for a variety of analysis. For example, if a user wishes to retrieve archived call records, a remote terminal 270 could access the system via a communication device 250 and 245 and down load the call record database to a remote database engine 255 which saves the call records to a local database 260. The user can then browse the call record data base as needed. This permits the user to review the corresponding subscriber circuit(s), switched network circuit(s), and NGTN network circuit(s) usage patterns and call processing performance. If an anomaly is detected, corrective action can be taken to eliminate any potential service problems.

An example of information transferred in one embodiment is illustrated in FIGS. 3*a*, 3*b*, 3*c*, 3*d*, 3*e*, 3*f*, 3*g*, and 3*h*. Illustrated in FIG. 3*a* is the raw call processing signal information sent by the sensor to the event analyzer module 204 and protocol independent call processor module 201. This information includes an identification of the type of message (e.g., Supervision Message), a time stamp, detailed portion of the message (in the present example, ABCD bit signaling information and circuit ID). The protocol independent call processor module 201 determines the corresponding event and forwards it to the call processor state machine. FIG. 3*b* illustrates the corresponding events for the received raw call processing signal information. In one embodiment, it is preferable that the protocol independent call processor module forwards each event to the state machine, along with the type of message and date-time stamp. The state machine determines the corresponding state. FIG. 3*c* illustrates the states determined from the corresponding events. In one embodiment, the system provides some analysis regarding the call. With respect to the above illustration, the following exemplary analysis are provided by the system and stored in the call status module for subsequent output:

Call=terminating (since the machine ringing was detected—if the call was an originating call, a dial tone would have been detected)

No Unusual Events (the state machine did not detect any anomalous events)

Physical Events=Idle, Machine Ring On=2, Machine Ring Off=2, Station Off Hook (answer), Stable Call, Station On Hook, CO On Hook.

NGTN information is handled in a similar way. FIG. 3*d* illustrates the Gateway and call control message information sent by the sensor or LAN controller to the NGTN event analyzer module 204 and passes it to the protocol independent call processor module. This information includes an identification of the type of message (e.g., CA Notification Request Message), a time stamp, detailed portion of the message (in the present example, Call Agent and Gateway messages information), and circuit ID. The protocol independent call processor module determines the corresponding event and forwards it to the NGTN state machine. FIG. 3*e* illustrates the corresponding events for the detected call control message information. In one embodiment, the protocol independent call processor module forwards each event to the NGTN state machine, along with the type of message and date-time stamp. The state machine determines the corresponding state. FIG. 3*f* illustrates the states determined from the corresponding events. In one embodiment, the system provides some analysis regarding the call handling by the Gateway or call controller. With respect to the above illustration, for example, the following analysis are provided by the system and stored in the call status module for subsequent output:

Call=terminating (since the Call Agent initiated ringing towards the station—if the call was originating, the Gateway would have detected an Off Hook)

No Unusual Events (the NGTN state machine did not detect any anomalous events)

Physical Events=CA NotificationRequests=3, CA Acknowledgements=2, GW Notify messages=2, GW Acknowledgements=3, Ring Station=1, Station Off Hook, Stable Call, Station On Hook, Network On Hook, GW Reset for Org Call detection.

The Analysis information is processed as each call progress or NGTN event is detected and presented to the protocol independent call processor module. FIG. 3*g* illustrates the call progress and NGTN state and status information is made available by the call status handler and timer processor to the analysis state machine. The timer processor clocks the analysis state machine after an event has been processed by either the call progress or NGTN state machines and the protocol independent call processor module. The information provided is used to analyze the performance of the station equipment (PBX), Gateway and call controller (Call Agent/Gatekeeper). Once clocked, the analysis state machine determines the new state. In one embodiment, the system provides some analysis regarding the call handling by the Station equipment, Gateway and call controller. With respect to the above illustration, for example, the following analysis are provided by the system and stored in the call status module for subsequent output:

Call Type=Terminating (both call progress and NGTN status indicators are verified to insure they agree)

Call Handling=Valid Call, Valid End of Call

Analysis=Idle, Circuit Ready, Alerting Ready, Normal Alerting, Stop Ringing, Ringing Stopped, Stable Call Waiting, Disconnect Waiting, Call Clearing, Call Cleared, GW Reset for Org Call.

FIG. 3*h* illustrates an analysis of a call that failed. In this example, the Gateway never sent ringing towards the station (call progress state machine indicates Idle State not Machine Ring) even though it had acknowledged doing so (AlertingReady). This caused the analysis state machine to go to an error state (GW_ErrNoRinging). The error state information would be sent to the Alarm Handler for processing. The error state information is also referred to as the call handling error information. With respect to the above illustration, for example, the following analysis are provided by the system and stored in the call status module for subsequent output:

Call Type=Terminating

Call Handling=GW not Ringing Station, Call Canceled by CA

Figure 4:
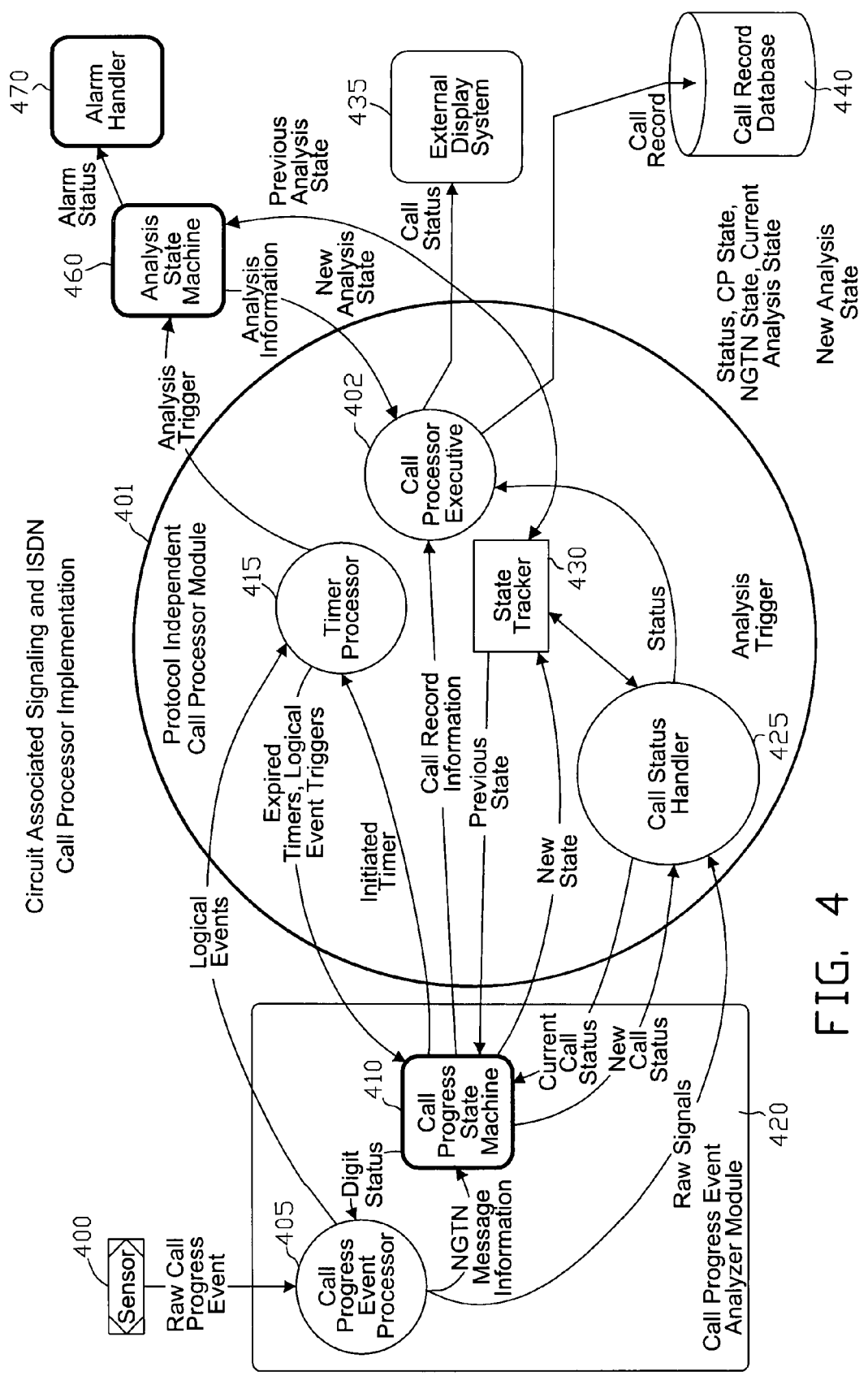
FIG. 4 illustrates an exemplary embodiment of an implementation of an event analyzer module including a call progress event processor and call progress state machine coupled to a protocol independent call processor module and an analysis state machine.

Analysis=Idle, Circuit Ready, Alerting Ready, Alert Time Out–GW not Responding, Invalid Call, GW Reset for Org Call FIG. 4 illustrates the operation of the call progress event analyzer module and protocol independent call processor module. The call progress event analyzer module 420 includes a call progress event processor module 405 and a call progress state machine 410. The protocol independent call processor module 401 includes a call status handler module 425, state tracker module 430, timer processor module 415 and call processor executive module 402. During the progress of a call, the call status handler module 425 maintains a record status of the call, including the state of the call and all raw call progress signals, for each physical event received.

When raw call progress signal information is passed from the sensor 400 to the call progress event processor 405, the call progress event processor 405 translates the raw call progress signal information into logical call handing event information (e.g., On Hook, Off Hook, Audible Ringing On, Dial Tone On, Dial Tone Off, etc.) and passes this information to the protocol independent call processor module. The protocol independent call processor module calculates the delta time (the elapsed time between physical events) and passes the elapsed timing events and logical call handling event information to the call progress state machine 410. In one embodiment, The protocol independent call processor module 401 sends events (timing events received from the timer processor module 415 and logical call handing received from the call progress event processor module 405) one at a time for processing by the call progress state machine 410. In one embodiment, the timing events are sent first, the last event sent being the logical call handing event. It should be realized that during the processing of an event additional events can be generated that require processing by the call progress state machine. For example, a time-out could occur, causing a timing event to be generated. Alternately, the processing of timing or logical call handing events by the call progress state machine can cause the initiation of additional timers which may time-out causing additional timing events to be generated and processed by the call progress state machine 410. The call progress event processor 405 also accumulates dialed and mid-call digit information for channel associated signaling circuits and element information for common channel signaling circuits.

The call progress state machine 410 retrieves the previous call state information from the state tracker 430 module and determines if the new logical call handing event and current call status information (call status information includes the number or digits, type of call, any abnormalities or troubles in the call, call dispositions, busy, how many rings, how many calls there has been, on hook/off hook, etc.) obtained from the call status handler module 425 and/or any expired timer information obtained from the timer processor module 415 indicates a transition to a new call state. If the call progress state machine 410 does not receive enough information to cause a transition to a new state, it will stay in its current state until a new event is presented to it.

If a new state is identified, the call progress state machine transitions to the new state. Once transitioned to the new state, the call progress state machine 410 updates the state tracker module 430 with the new state information and the call status handler 425 with new call status information. If new timers are to be enabled as a result of transitioning to the new state, the call progress state machine updates the protocol independent call processor module timer processor 415 with the timer information to enable specified timers. In one embodiment, two types of timers are used, dependent timer and independent timer. Dependent timers are dependent upon the state and disabled when the state is exited. Independent timers are independent of state and remain enabled through state transitions.

In one embodiment, the call processor executive module receives call information that can include the new call state information and call status information. This information is translated and transmitted to an external display system 435 for display of the new call state and status. If the call progress state machine 410 determines that the new state indicates that the call has been terminated or abandoned, the state machine inform the call processor executive 402 and call status handler 425 that the current call has terminated. The call status handler 425 forwards call status information to the call processor executive 402 will then creates a call record for output to the call record database 440. The structure of the system permits determination of the final status of the call, e.g., abandoned, dial tone delay, improper digits, etc. Table 1 illustrates the events that occurred during a call that was subsequently abandoned.

The call progress event processor and timer processor can filter out events from reaching the call progress state machine. The state machine has the capability to initiate filter functions. In one embodiment, these filter functions are maintained through the states unless disabled or changed by the state machine. For example, the state machine can issue a signal to filter out a certain event unless it is on for a predetermined amount of time. Thus, when the raw signal is detected by the sensor, the corresponding logical call handling event is not passed to the state machine unless the signal is on for the predetermined amount of time as timed by the timer processor. Similarly, the signal can be filtered if not of a short enough duration. The filter functions can filter out a wide variety of events based upon a variety of criteria. For example, certain types of events (e.g., DTMF signals) can be filtered out altogether. The type of filter functions described above are exemplary; it is readily apparent to one skilled in the art that other filter functions can be implemented. In addition, the filter function may function by filtering out the raw call progress signaling information at the call progress event processor 405. Alternately, the filter function can operate by disabling the sensing of particular raw progress signals at the sensor 400.

Figure 4A:
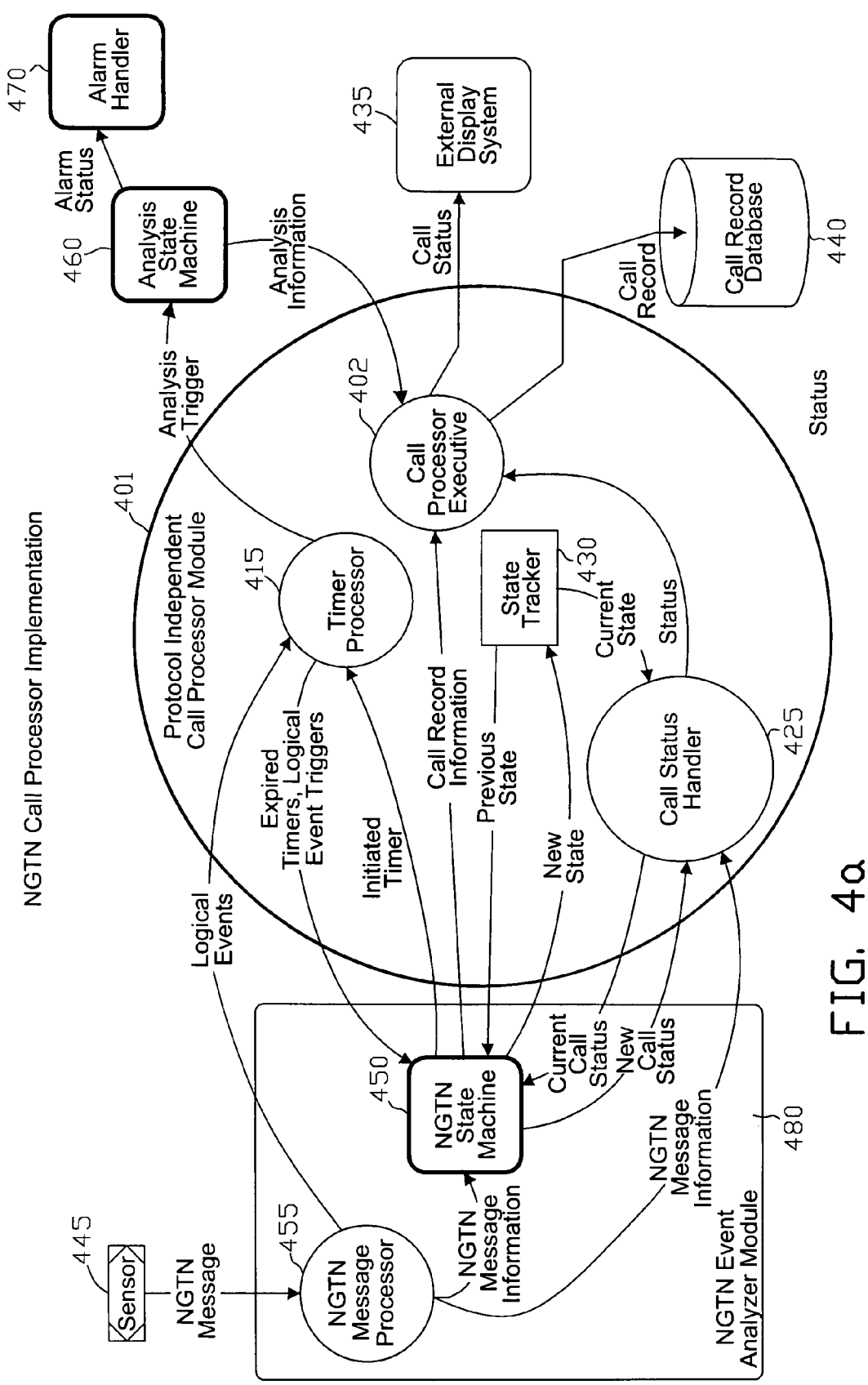
FIG. 4A illustrates an exemplary embodiment of an implementation of an event analyzer module including a NGTN event processor and NGTN state machine coupled to a protocol independent call processor module and an analysis state machine.

FIG. 4a illustrates the operation of the NGTN event analyzer module and protocol independent call processor module. The NGTN event analyzer module 480 includes a NGTN event processor module 455 and a NGTN state machine 450. The protocol independent call processor module 401 includes a call status handler module 425, state tracker module 430, timer processor module 415 and call processor executive module 402. During the progress of a call, the call status handler module 425 maintains a record status of the call, including the state of the call control and all NGTN message information, for each call control message received.

When the NGTN message information is passed from the sensor 445 to the NGTN message processor 455, the NGTN message processor 455 translates the message information into logical call handling event information (e.g., Wait for Off Hook, Command Accepted, Ring Phone, Off Hook, Dial Tone On, etc.) and passes this information to the protocol independent call processor module. The protocol independent call processor module calculates delta time (the elapsed time between message events) elapsed timing events and logical call handling event information to the NGTN state machine 450. In one embodiment, the NGTN message pro-

| Message | Physical Event | Call Progress | Event State Machine |
|---|---|---|---|
| Supervision Msg 1 | 0000.000 ,0101,0101, | <CR> = On Hook | Idle |
| Supervision Msg 2 | 0320.000 ,0000,0101, | <CR> = Machine Ring On | RingOn |
| Supervision Msg 3 | 0322.000 ,0101,0101, | <CR> = Machine Ring Off | RingOff |
| Supervision Msg 4 | 0326.000 ,0000,0101, | <CR> = Machine Ring | RingOn |
| Supervision Msg 5 | 0328.000 ,0101,0101, | <CR> = Machine Ring Off | RingOff |
| Supervision Msg 6 | 1573.235 ,0101,0101, | <CR> = On Hook | CO On Hook |

In this example, as the station never went off-hook, the call was not answered. Since the ringing stopped after only two rings were detected, the state machine assumes the caller hung up. Therefore, the state machine sets call status bits indicative of the following:

Call=terminating

Unusual Events=1 abandoned call

Physical Events=Idle, Machine Ring On=2, Machine Ring Off=2, CO On Hook.

cessor 455 sends events (timing events received from the timer processor module 415 and NGTN logical call handling events generated by the NGTN event processor module 455) one at a time for processing by the NGTN state machine 450. In one embodiment, the timing events are sent first, the last event sent being the logical call handling event. It should be realized that during the processing of an event additional events can be generated that require processing by the NGTN state machine. For example, a time-out could occur, causing a timing event to be generated. Alternatively, the processing of timing or logical call handing events by the NGTN state machine can cause the initiation of additional timers which may time-out causing additional timing events to be generated and processed by the NGTN state machine 450.

The NGTN state machine 450 retrieves the previous call state information from the state tracker 430 module and determines if the new logical call handing event and current call status information (call status information includes the digit map match, type of call, any abnormalities or troubles in the call, call dispositions, busy, how many retries, how many calls there has been, on hook/off hook, etc.) obtained from the call status handler module 425 and/or any expired timer information obtained from the timer processor module 415 indicates a transition to a new NGTN call state. If the NGTN state machine 450 does not receive enough information to cause a transition to a new state, it will stay in its current state until a new event is presented to it.

If a new state is identified, the NGTN state machine clocks itself to move to the new state. Once transitioned to the new state, the NGTN state machine 450 updates the state tracker module 430 with the new state information and the call status handler 425 with new call status information. If new timers are to be enabled as a result of transitioning to the new state, the NGTN state machine updates the protocol independent call processor module timer processor 415 with the timer information to enable specified timers. In one embodiment, two types of timers are used, dependent timer and independent timer. The dependent timers are dependent upon the state and disabled when the state is exited. The independent timers are independent of state and remain enabled through state transitions.

In one embodiment, the call processor executive module 402 receives call information, which can include the new call state information and call status information. This information is translated and transmitted to an external display system 435 for display of the new call handling state and status. If the NGTN state machine 450 determines that the new state indicates that the call has been terminated or abandoned, the state machine informs the call processor executive 402 and the call status handler 425 that the current call has terminated. The call status handler 425 forwards call status information to the call processor executive 402 will then creates a call record for output to the call record database 440.

The structure of the system permits determination of the final status of the call as viewed by the call controller and Gateway, e.g., valid call, GW error, CA error, etc. Table 1A illustrates the events that occurred during a call that was subsequently abandoned.

| Msg. Type | Time Stamp | Raw Message | Call Control Event | State |
|---|---|---|---|---|
| CA_Notification-Request | 0000.000 | CA_RQNT, 1201,R: hd | Wait for Off Hook | IdleWaiting |
| GW_Ack | 0000.123 | GW_ACK, 1201,200 | Command Accepted | IdleReady |
| CA_Notification-Request | 0319.856 | CA_RQNT, 1202,S: rg | Ring Phone | AlertingStart |
| GW_Ack | 0319.947 | GW_ACK, 1202,200 | Command Accepted | Alerting |
| CA_Notification-Request | 0332.838 | CA_RQNT, 1203,R: hu S: hd | CO On Hook | NtwkDisco |
| GW_Ack | 0332.927 | GW_ACK, 1203,200 | Command Accepted | IdleReady |

In this example, as the Gateway never detected a station off-hook, the call was not answered. Since a CO On Hook message was received by the Gateway, the state machine assumes the caller hung up. Therefore, the NGTB state machine sets call status bits indicative of the following:

Call=terminating
Unusual Events=1 abandoned call
Physical Events=Idle, Ringing, CO On Hook.

Referring to FIG. 4 and FIG. 4A, both the call progress state machine 410 of FIG. 4 and the NGTN state machine 450 of FIG. 4A share the same protocol independent call processor module, even though each state machine is triggered by different events from different sensors, i.e. sensor 400 and sensor 445. Each time one of the state machines is triggered and has completed, if any, a transitions to a new state, the timer processor 415 clocks the analysis state machine. The current state and status information from the call status handler is made available to the analysis state machine, which uses this information to transition to a new state, or remain in the current one. New analysis state and status information from the analysis state machine is returned to the status handler. In this way, the analysis state machine compares and evaluates the station's (PBX) reaction to Gateway signals, the Gateway's interpretation of the station's signals, the Gateways detection and notification of events to the call controller and the call controller's call progress handling of the call. If a call handling anomaly is detected via reaching an error state, the analysis state machine passes an error indication or alarm status to the alarm handler 470. The alarm handler 470 is a user-defined set of algorithms designed to set alarm reporting priorities. Alarm messages can be generated and passed to an external network management system if required. In one embodiment, alarm messages are generated when an alarm count exceeds a defined threshold. In any event, the alarm information is contained in the analysis status information and passed to the call status handler 425.

Though this is the preferred method for analyzing related call events, each state machine could run independent and correlation be performed by a state machine interface module. It is also possible that the state machines could reside in different computers, linked to each other via a LAN. Again, an interface and synchronization module would be required to coordinate the analysis process. Whichever implementation is used, the process of evaluating call performance remains the same.

Figure 5:
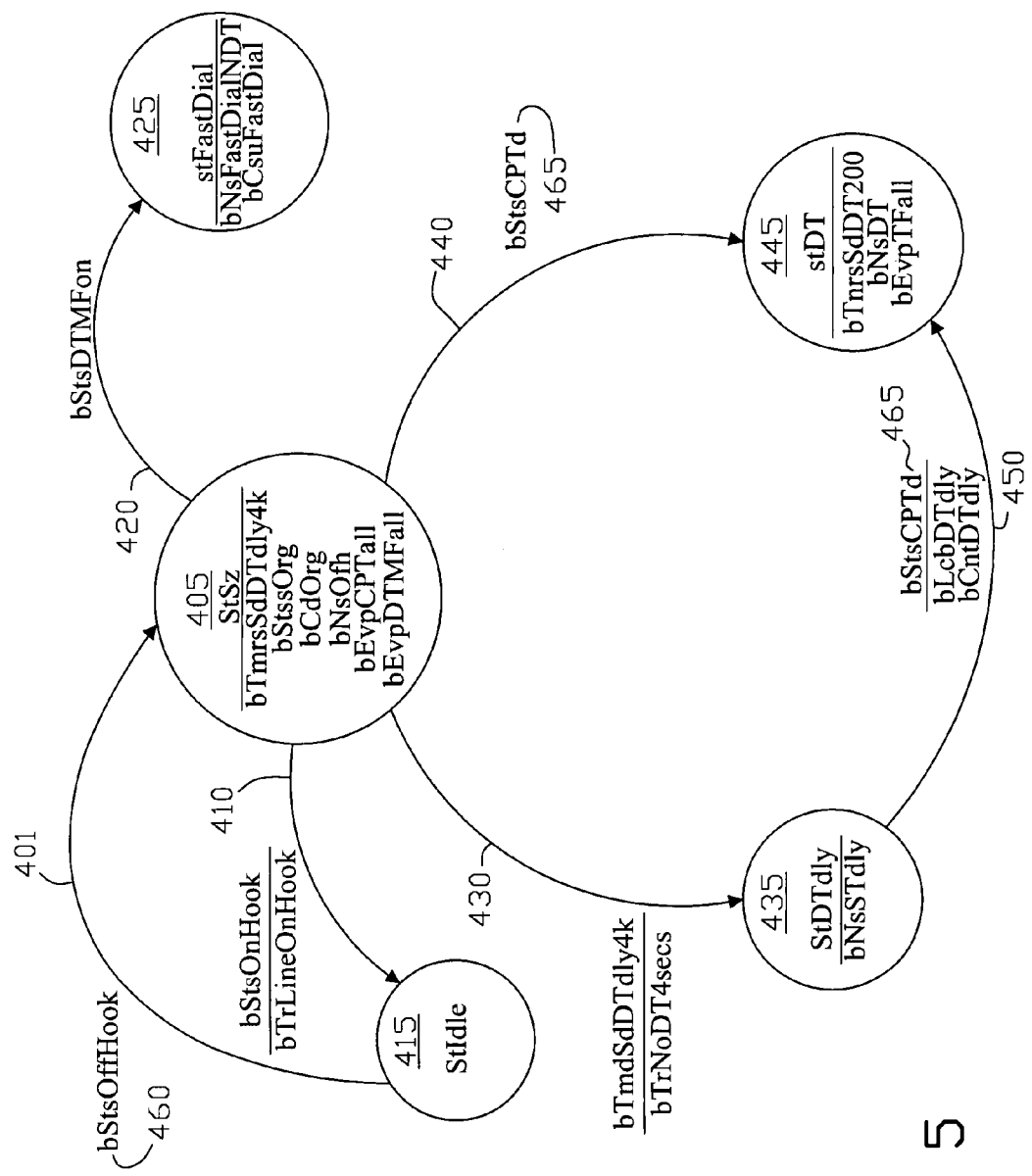
FIG. 5 illustrates an exemplary embodiment of a call progress state machine.

FIG. 5 is an exemplary embodiment illustrating a section of a typical call progress state machine. As is readily apparent to one skilled in the art, this is exemplary and can be extended to a variety of states for a variety of telephony configurations. In this example, the call progress state machine is in the StIdle State (i.e., circuit idle state) 415. A new physical event—bStsOffHook 401 (off hook) is detected by the sensors and passed to the call progress state machine. This causes a transition from the StIdle State 415 to a StSz State 405 (Circuit Seized). The call progress state machine then performs the following functions:

1. Sends a signal to the timer processor module to initiate a timer bTmrsSdDTdly4k (Timer for the receipt of Dial Tone);
2. Sets a status variable in the call status handler, bStssOrg, indicating the call is an originating call;
3. Sets a call disposition variable in the call status handler, bCdOrg, indicating the call disposition at this time is originating call;
4. Sets a notable state variable in the call status handler, bNsOfh, indicating the state of the call is Off Hook;

5. Sets an event filter variable in the call progress event processor, bEvpCPTall, indicating that all Call Progress Tones (CPT) detection should be active;

6. Sets a second event filter variable in the call progress event processor, bEvpDTMFall, indicating that all Dual Tone Multi-Frequency (DTMF) tone detection should be active 7. Passes an identification (ID) of the new state to the protocol independent call processor module state tracker module indicating that the new state of the call (Progress Call State) is stSz, making the previous call state equal to StIdle.

The transition to a new state can cause the initiation of timers in the timer processor. Continuing with the present example, if the next physical event is bStsCPTd 450 (Dial Tone on), the call progress state machine calls the timer Processor, bTmrsSdDTdly4k, to initiate a dial tone timer to track the time for detection of dial tones and provide time out information if a dial tone is not initiated within a specified period of time.

At completion of determining the new state based upon a singular event information received, The call progress state machine sleeps until the next event is presented to it by the call progress event processor.

Continuing reference to FIG. 5, the function of the timer processor will be discussed. In this example, the time delta is calculated between the receipt of the bStsOffHook (event 460 FIG. 5) and the time of the current event bStsCPTd (event 465 FIG. 5). When the off-hook event 460 occurs, the StSz state 405 is entered. At this state, the delay timer, bTmrsSdDTdly4k, is initiated. When a new event is identified (e.g., dial tone, bStsCPTd 465) the call progress event processor notifies the timer processor of the time delta. The timer processor compares the time delta to the initiated timers to determine if any timers have expired. In the present example, the dial tone delay timer, bTmrsSdDTdly4k, expired. The timer processor therefore issues a message to the call progress event processor which clocks the call progress state machine, passing the expired timer variable, bTmdSdDTdly4k. The call progress state machine transitions 430 to a new state, StDTdly 435. Control is then passed back to the call progress event processor which then asks the timer processor if any other expired timers have occurred. If other expired timers have not been processed by the call progress state machine, in one embodiment, these are forwarded one at a time, the shortest timer first, to the call progress state machine for processing. Once all expired timers have been processed, the call progress event processor forwards the physical eventbStsCPTd 465 to the call progress state machine (transition 450).

If, upon entering state StSz 405 no timers have expired, the call progress event processor forwards the physical event bStsCPTd 465 to the call progress state machine (transistions 440). Another event causing a transition from at StSz state 405 is bStsDTMFon (non voltage event DTMF on) 420. This event causes a transition to stFastDial (fast dial state) 425. In this state, the bNsFastDialNDT (notable state, fast dial, no dial tone) variable and the bCsuFastDial (call status unusual, fast dial) are set.

FIG. 5 provides a simplified example of one portion of the call progress state machine. FIGS. 6a-6k provide more detailed state diagrams of the operation of the call progress state machine for a loop start line. As is readily apparent, FIGS. 6a-6k provide the logic for one type of circuit; it is obvious to one skilled in the art, that the logic could be modified to provide accurate protocol analysis for different types of circuits.

Figure 5A:
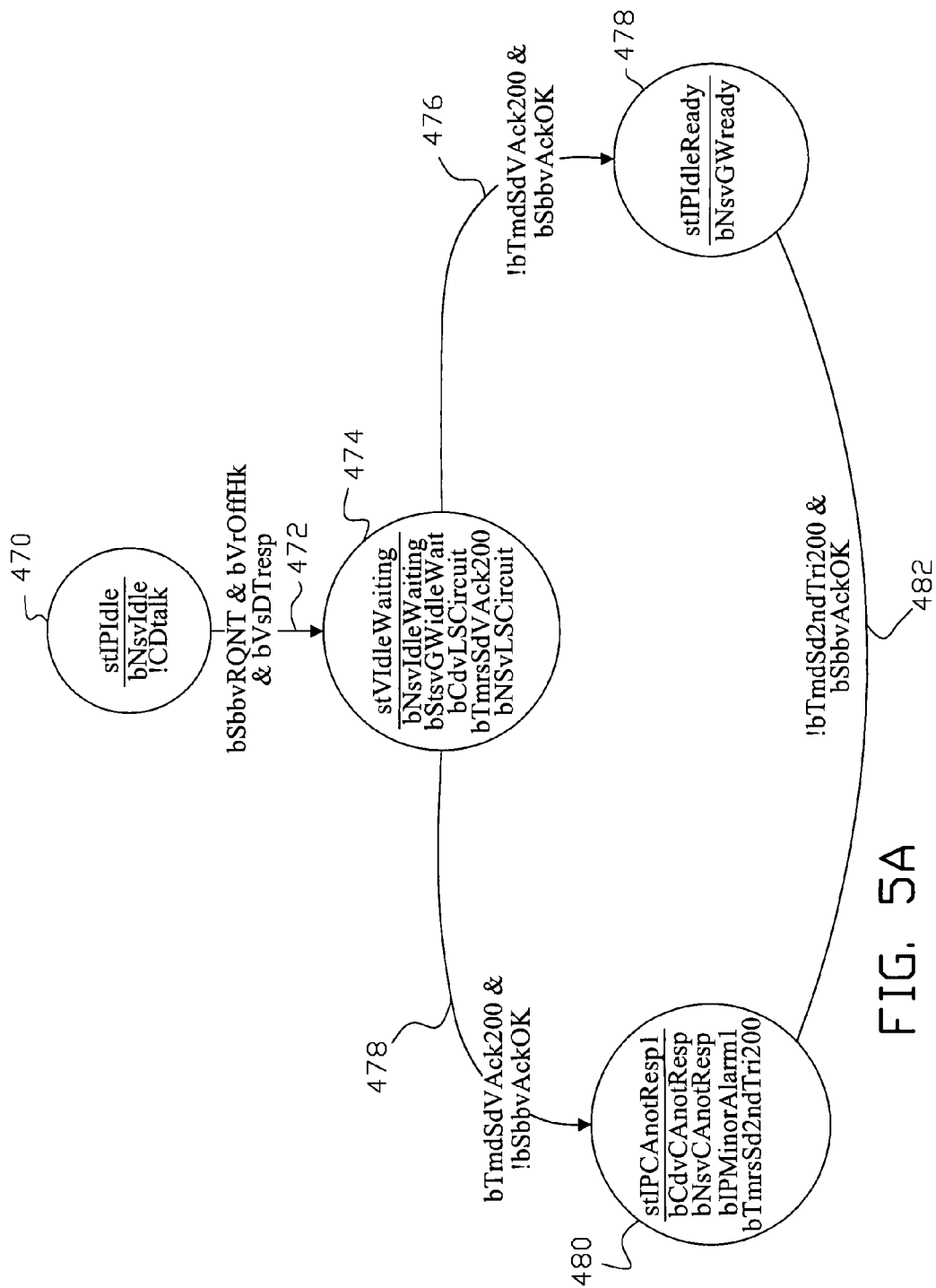
FIG. 5A illustrates an exemplary embodiment of a NGTN state machine.

FIG. 5A illustrates an exemplary section of a typical NGTN state machine. As is readily apparent to one skilled in the art, this is exemplary and can be extended to a variety of states for a variety of NGTN telephony configurations. In this example, the NGTN state machine is in the stIPIdle State (i.e., GW circuit idle state) 470. A new NGTN message event—bSbbvRQNT & bVrOffHk & bVsDTresp 472 (set GW to detect Off Hook and if Off Hook is detected place dial tone on the station circuit) is detected by the sensors and passed to the NGTN state machine. This causes a transition from the stIPIdle State 470 to a stVIdleWaiting State 474 (wait for GW to acknowledge message). The NGTN state machine then performs the following functions:

1. Sends a signal to the timer processor module to initiate a timer bTmrsSdVAck200 (Timer for the receipt of GW Ack message);
2. Sets a status variable in the call status handler, bStsvGWidleWait, indicating the call agent is waiting for a acknowledge message;
3. Sets a call disposition variable in the call status handler, bCdvLSCircuit, indicating GW circuit is a Loop Start line;
4. Sets a notable state variable in the call status handler, bNsvldleWaiting, indicating the state of the call is waiting for a GW acknowledge message;
5. Sets a notable state variable in the call status handler, bNSvLSCircuit, indicating the GW circuit is a Loop Start line;
6. Passes an identification (ID) of the new state to the protocol independent call processor module state tracker module indicating that the new state of the call (NGTN State) is stVIdleWaiting 474, making the previous NGTN state equal to stIPIdle 470.

The NGTN state machine calls the timer processor, bTmrsSdVAck200, to initiate a GW Ack timer to track the time for detection of GW Ack message and provide time out information if a GW Ack message was not sent within a specified period of time. The transition to a new state can cause the initiation of timers in the timer processor. Continuing with the present example, if the next message event is bSbbvAckOK (GW Ack message detected), the NGTN state machine calls the timer Processor, bTmrsSdVAck200, to initiate a GW Ack timer to track the time for detection of a GW Ack message and provide time out information if a dial tone is not initiated within a specified period of time.

At completion of determining the new state based upon a singular event information received, The NGTN state machine sleeps until the next event is presented to it by the call progress event processor.

Continuing reference to FIG. 5A, the function of the timer processor will be discussed. In this example, the time delta is calculated between the receipt of the bSbbvRQNT (event 472 FIG. 5A) and the time of the current event bSbbvAckOK (event 476 FIG. 5A). When the Notification Request event 472 occurs, the stVIdleWaiting state 474 is entered. At this state, the GW Ack timer, bTmrsSdVAck200, is initiated. When a new event is identified (e.g., GW Ack, bSbbvAckOK 476) the NGTN event processor notifies the timer processor of the time of the new event. The delta time is calculated between the receipt of bSbbvRQNT and receipt of the bSbbvAckOK. The timer processor compares the time delta to the initiated timers to determine if any timers have expired. In the present example, the GW Ack delay timer, bTmrsSdVAck200, expired 478. The timer processor therefore issues a message to the NGTN state machine which clocks the NGTN state machine, passing the expired timer variable, bTmdSdVAck200. The NGTN state machine transitions 478 to a new state, stIPCAnotResp1 480. Control is then passed back to the timer processor which determines if any other expired timers have occurred. If other expired timers have not been processed by the timer processor, these are forwarded one at a time, in one embodiment the shortest timer first, to the NGTN state machine for processing.

FIG. 5A provides a simplified example of one section of the NGTN state machine. FIGS. 6*l*-6*q* provide more detailed state diagrams of the operation of the NGTN state machine for a loop start line. As is readily apparent, FIGS. 6*l*-6*q* provide the logic for one type of call handling protocol (SGCP); it is obvious to one skilled in the art, that the logic could be modified to provide accurate protocol analysis for different types of NGTN call handling protocols.

Figure 5B:
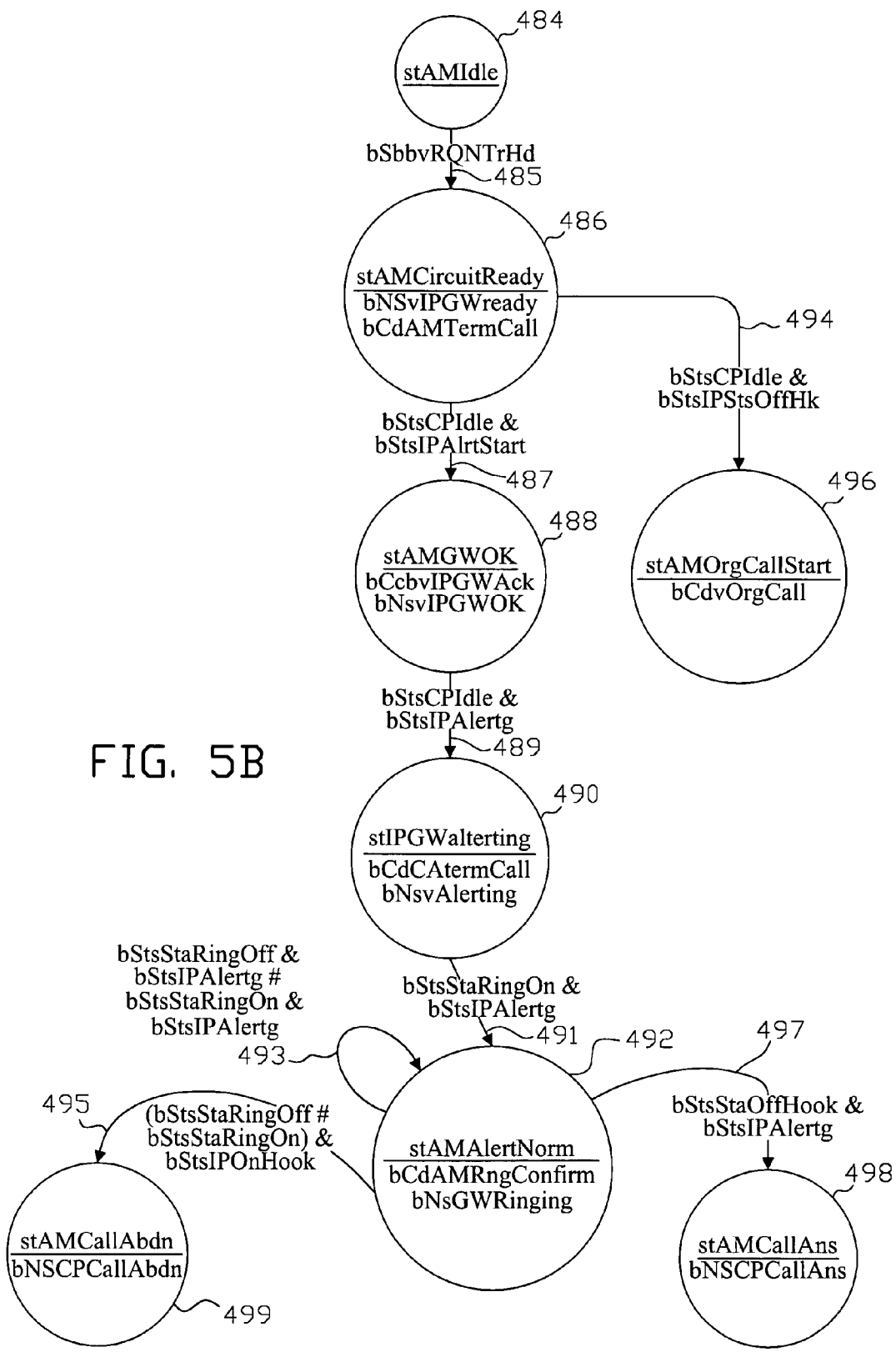
FIG. 5B illustrates an exemplary embodiment of an analysis state machine.
Figure 6A:
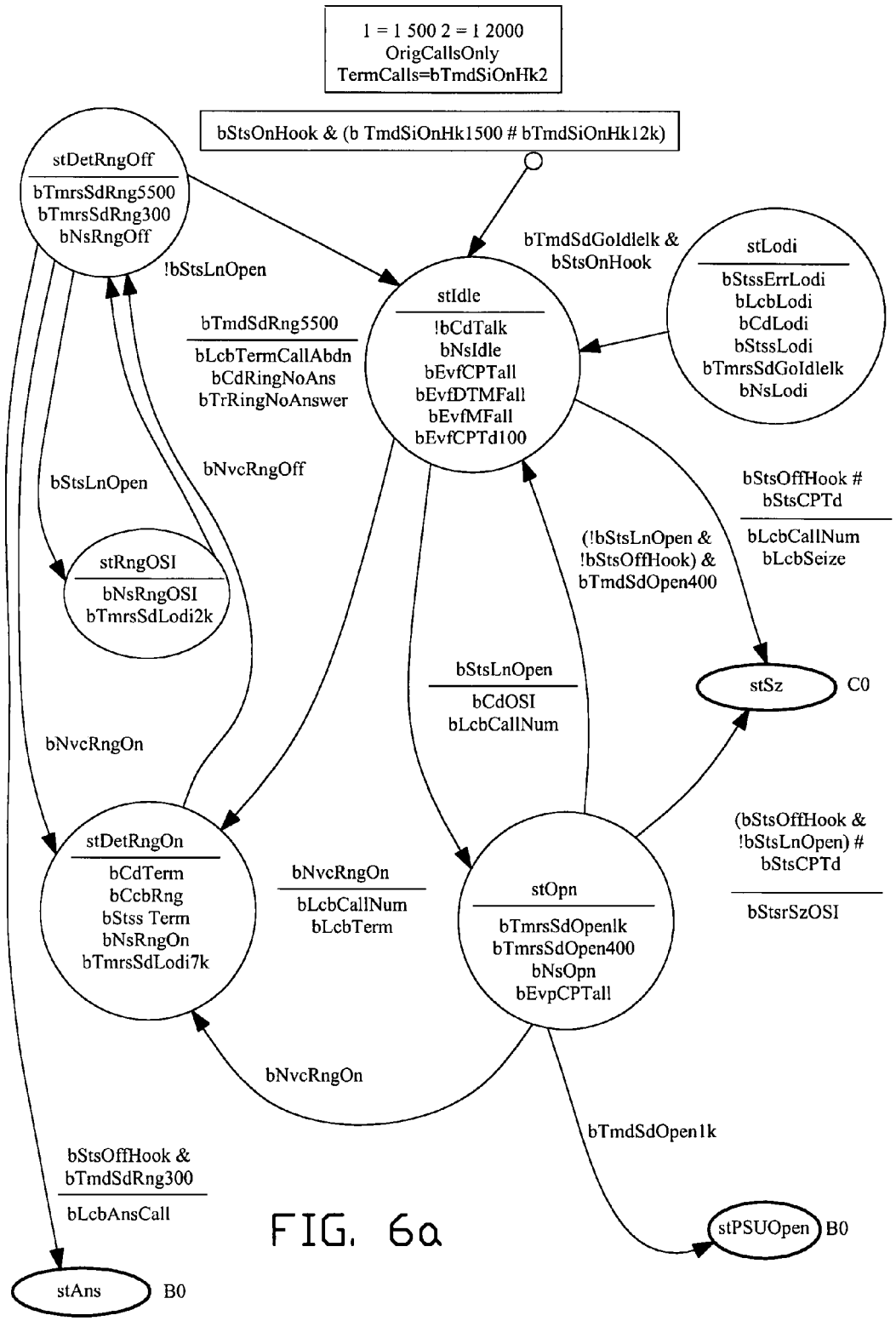
Figure 6B:
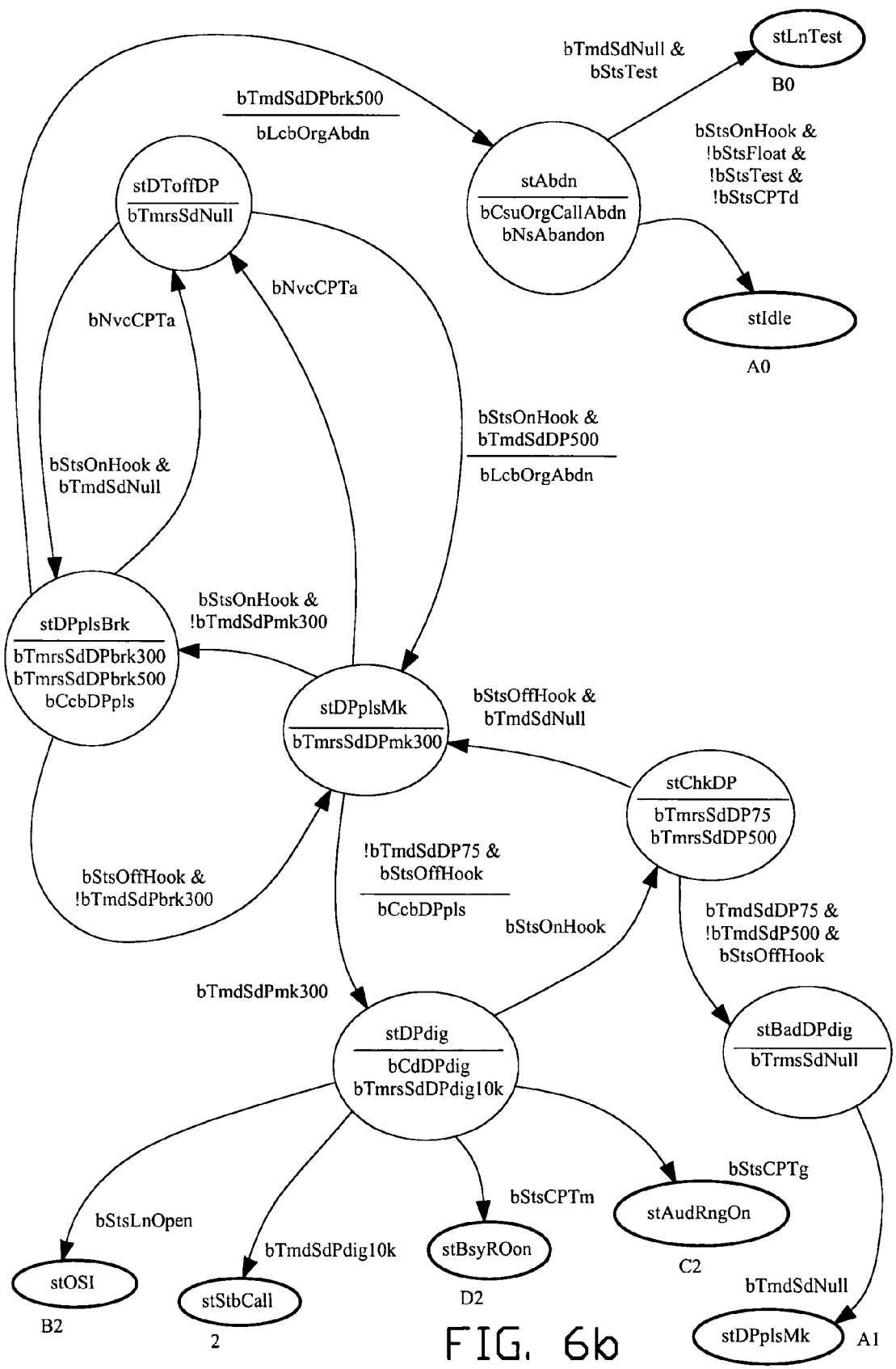
Figure 6C:
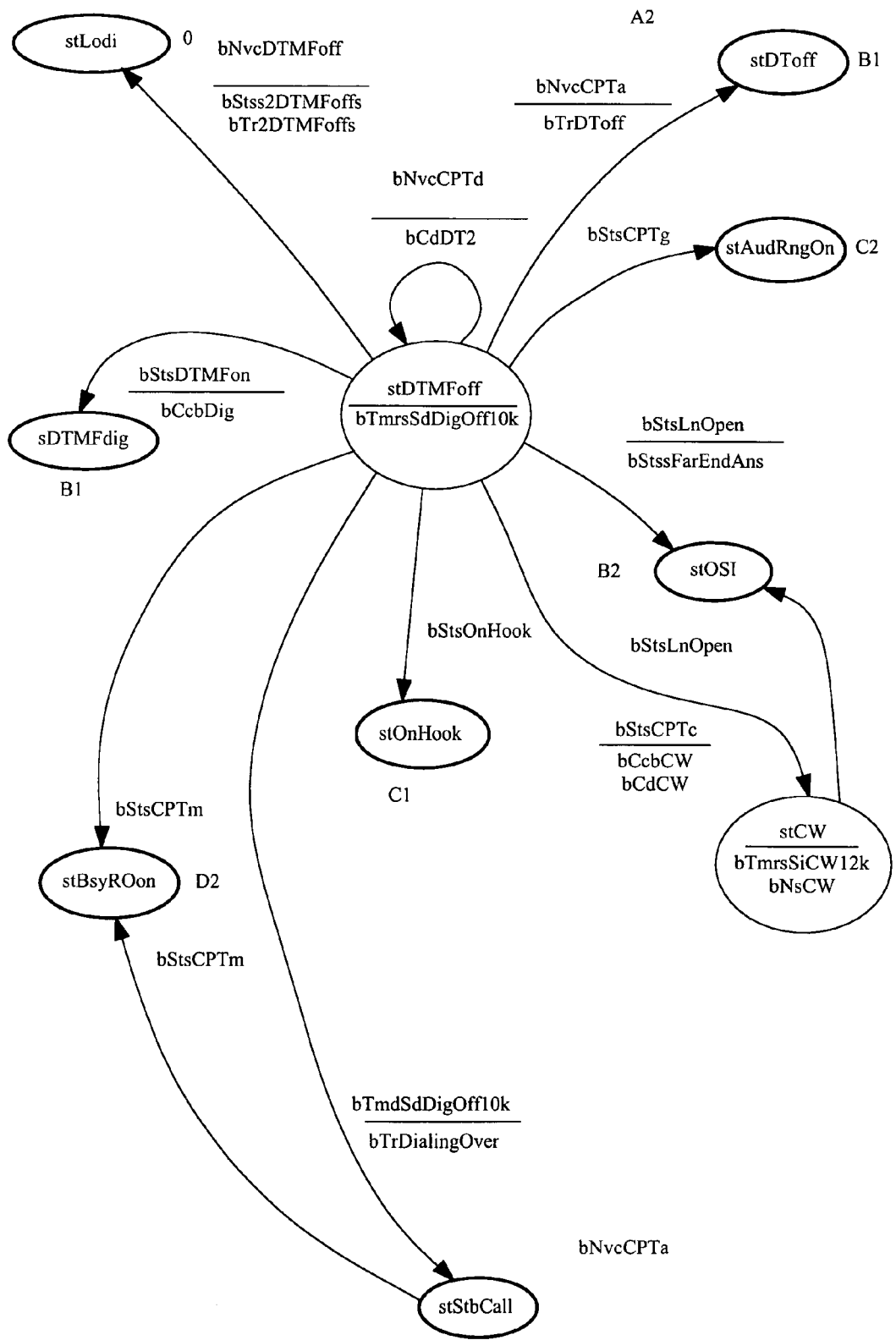
Figure 6D:
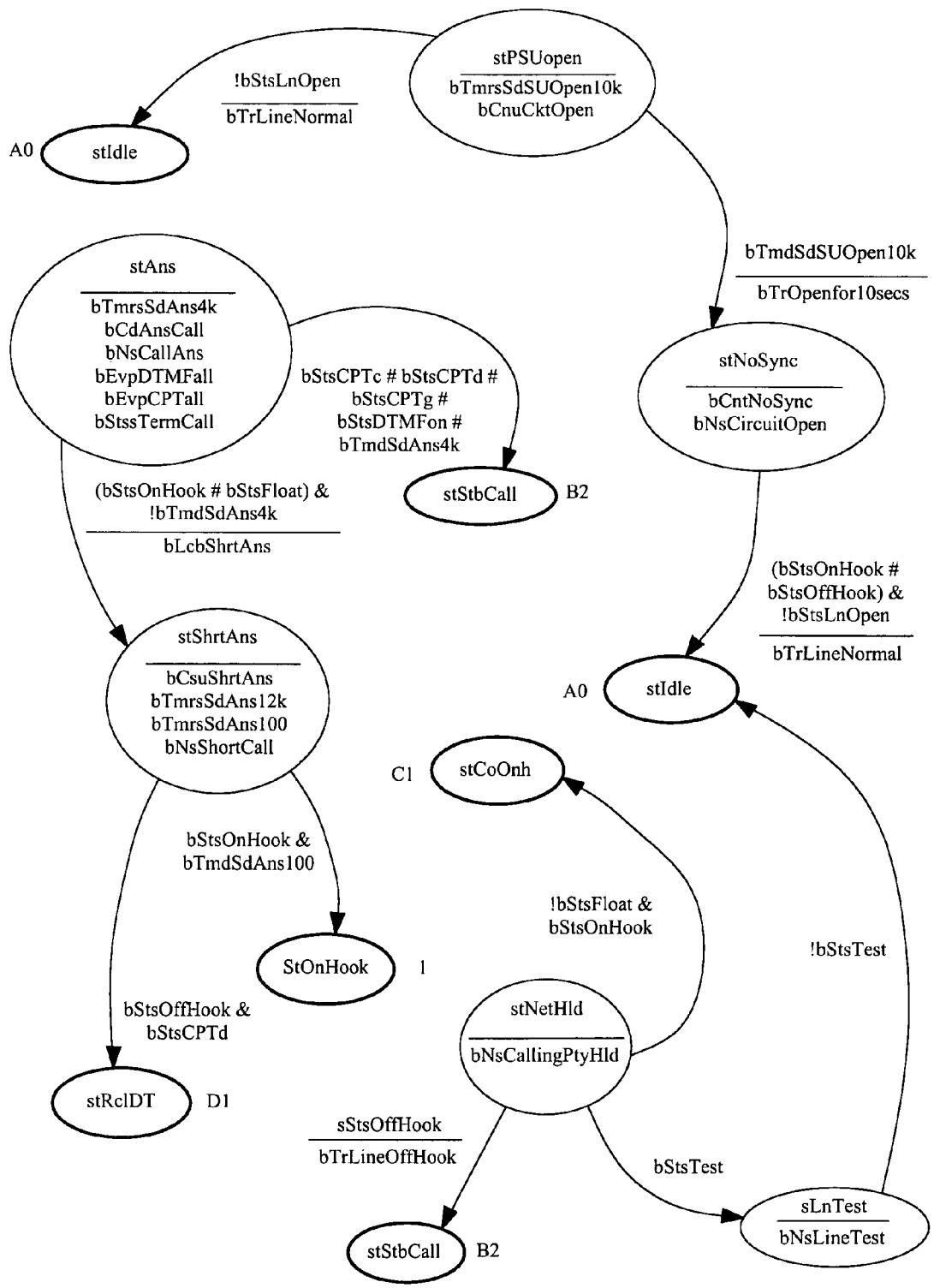
Figure 6E:
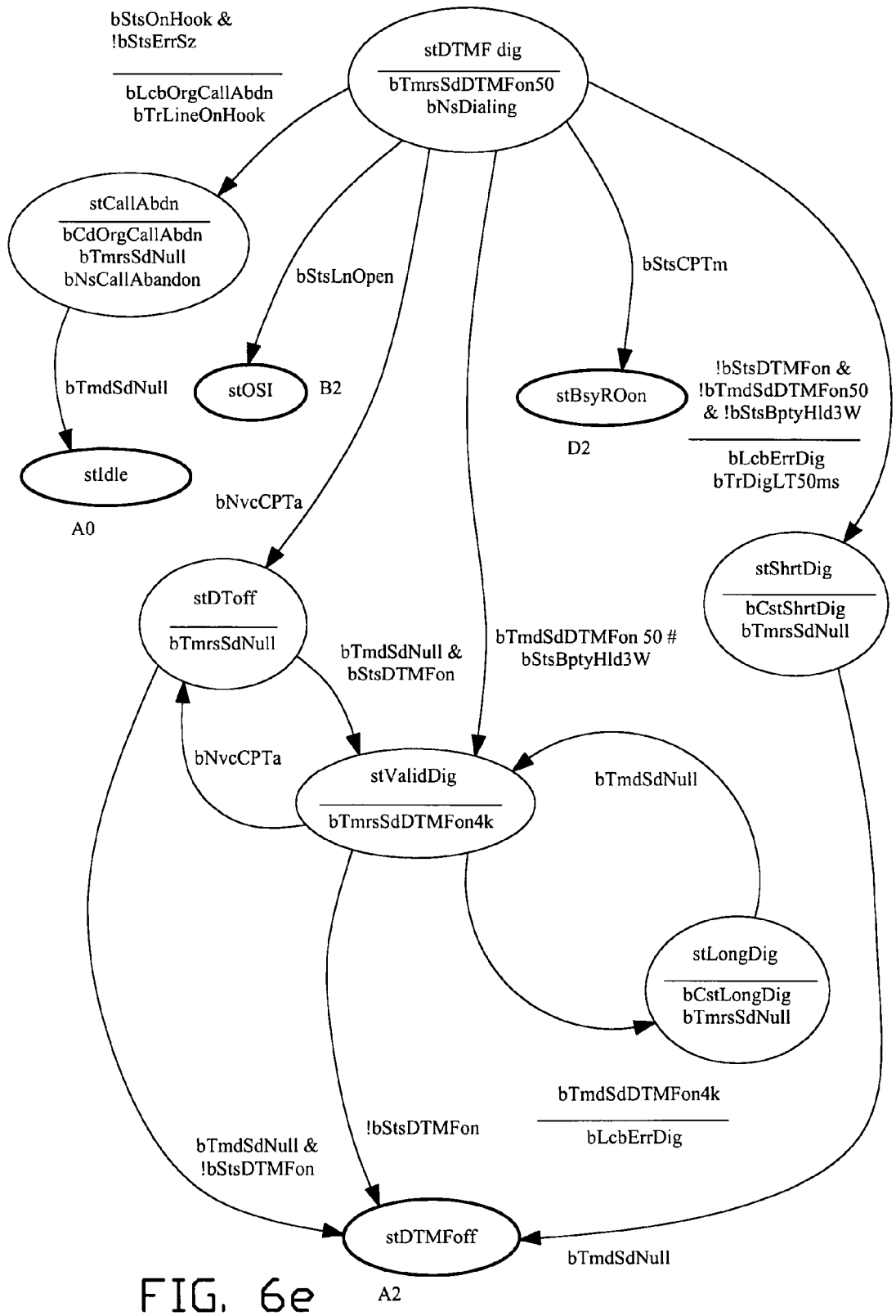
Figure 6F:
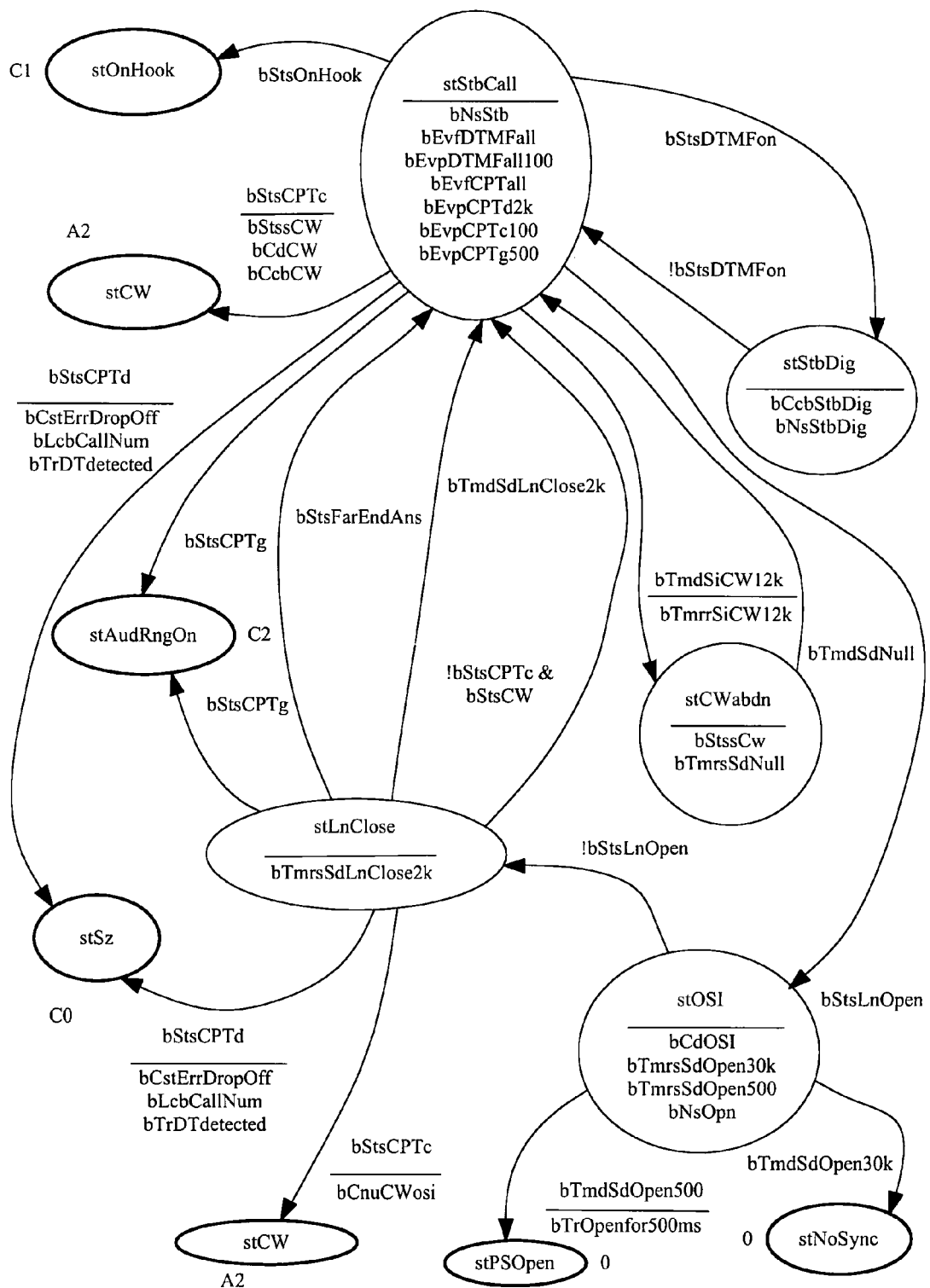
Figure 6I:
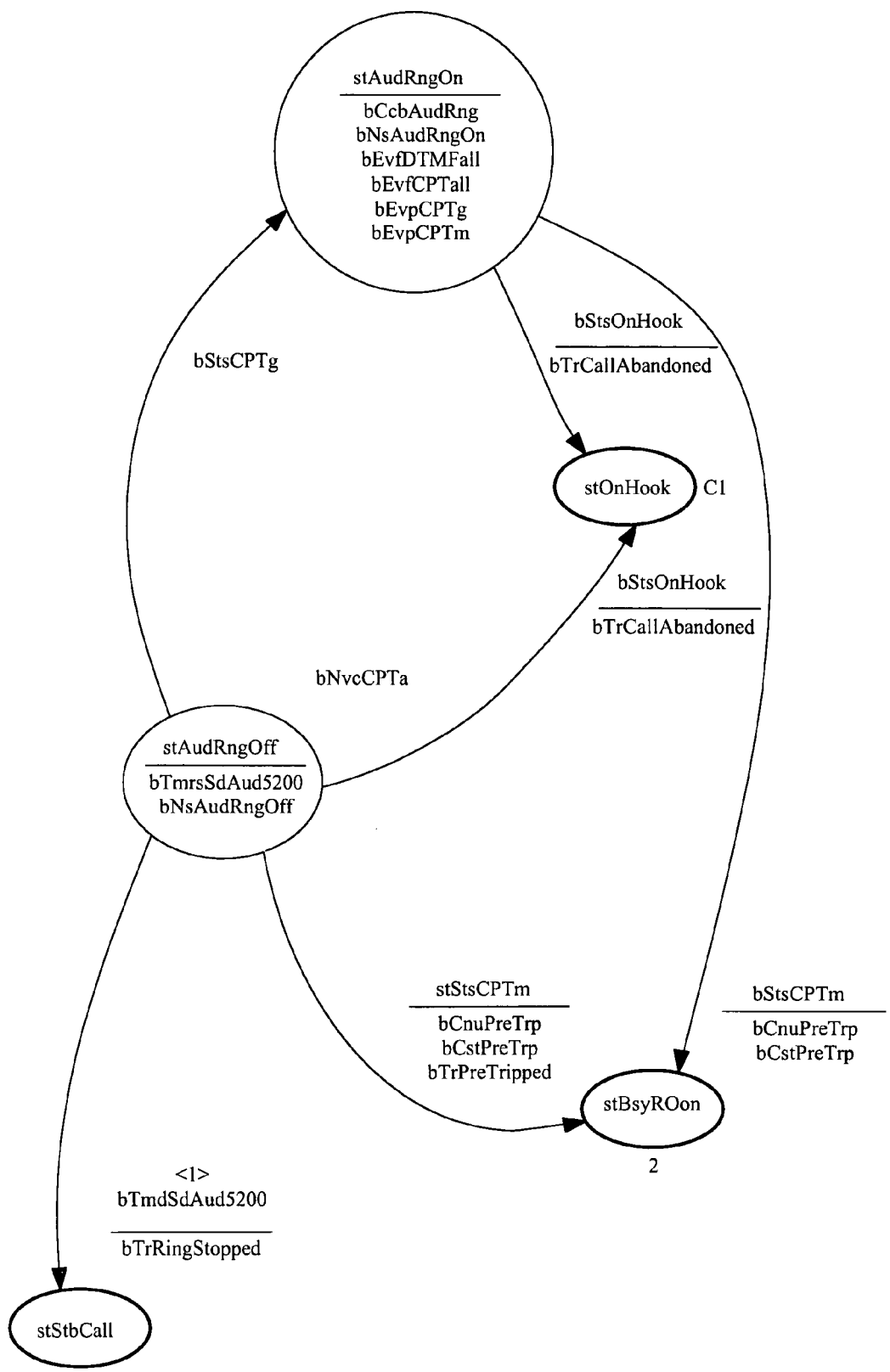
Figure 6J:
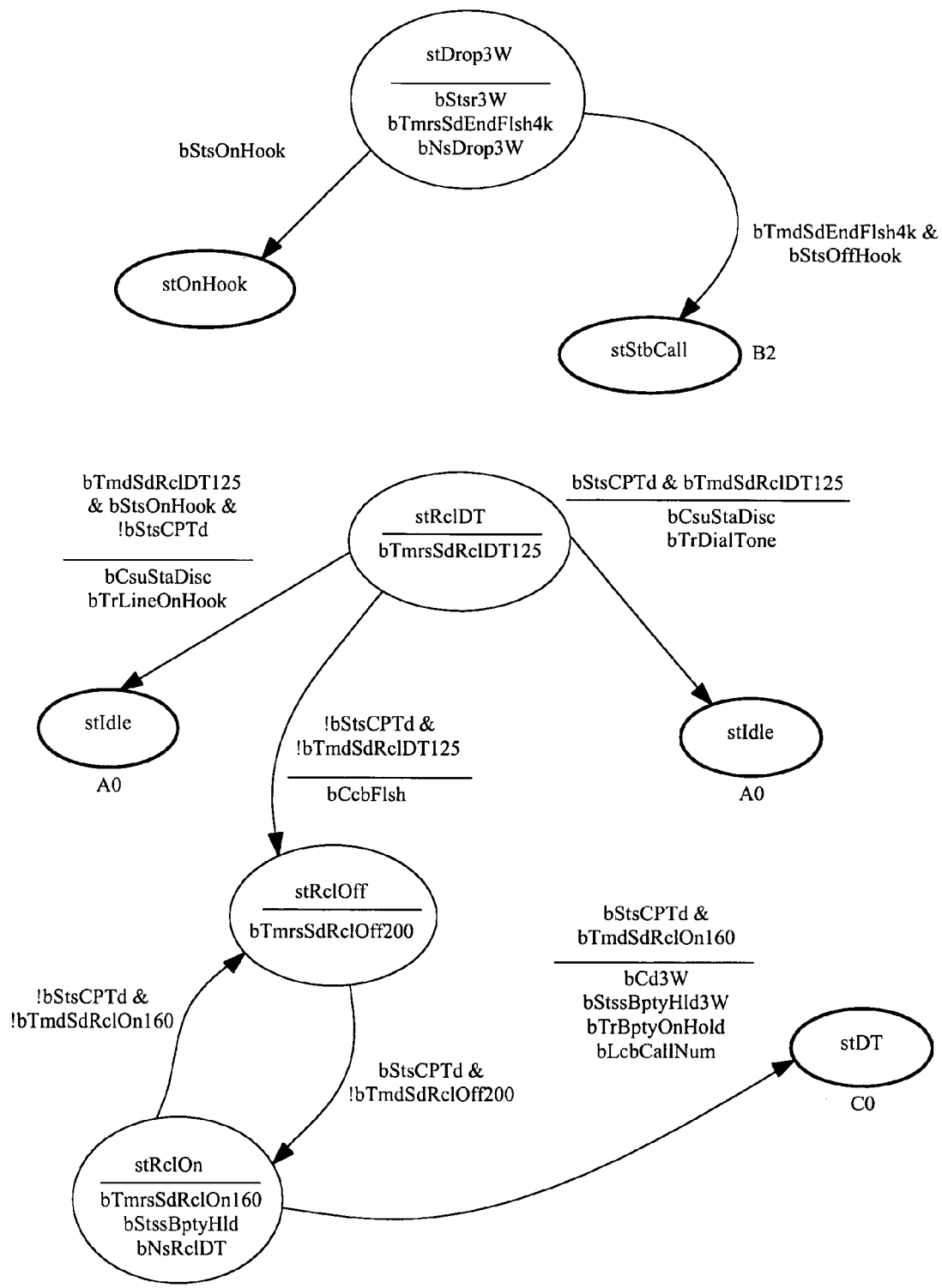
Figure 6K:
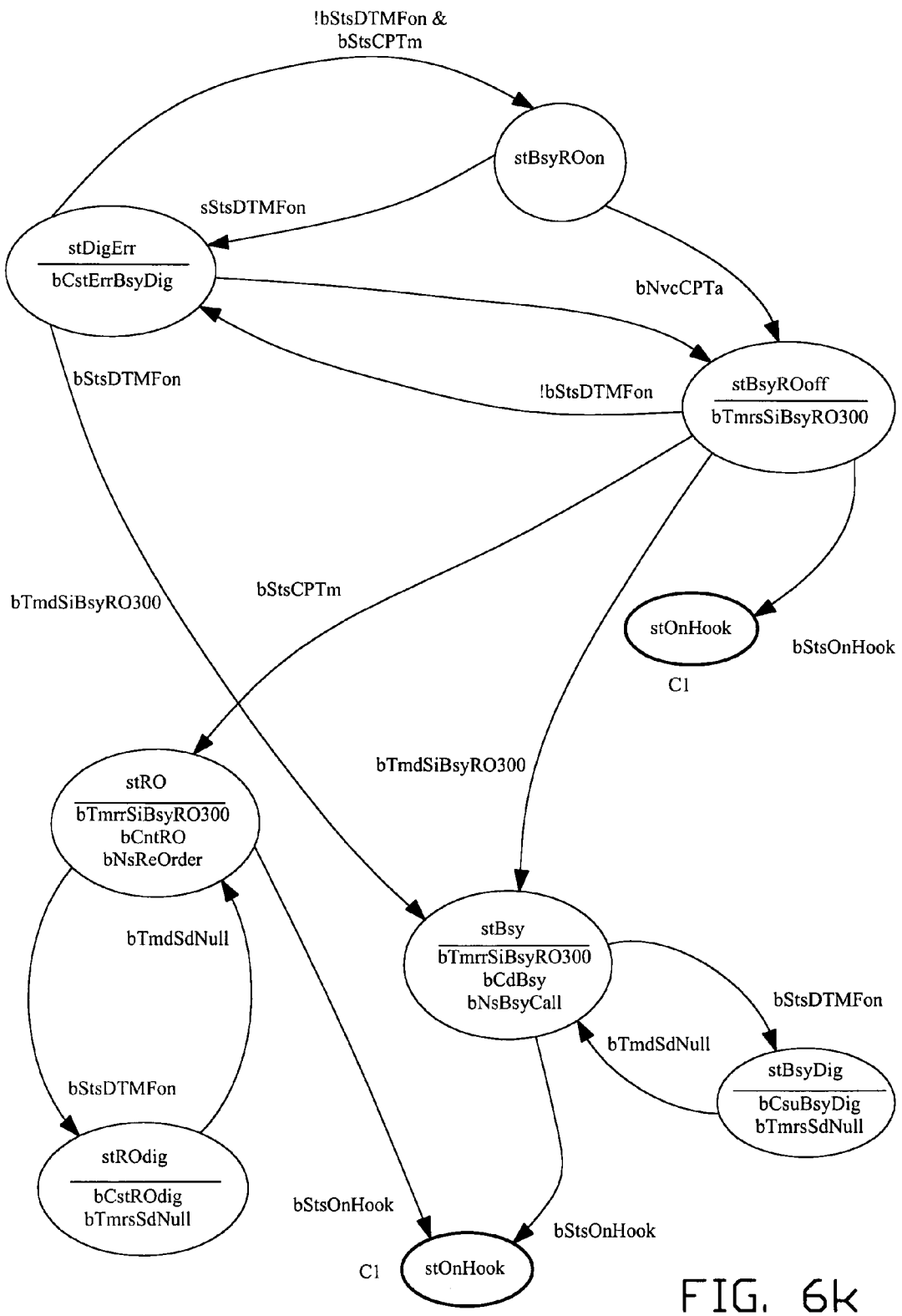
Figure 61:
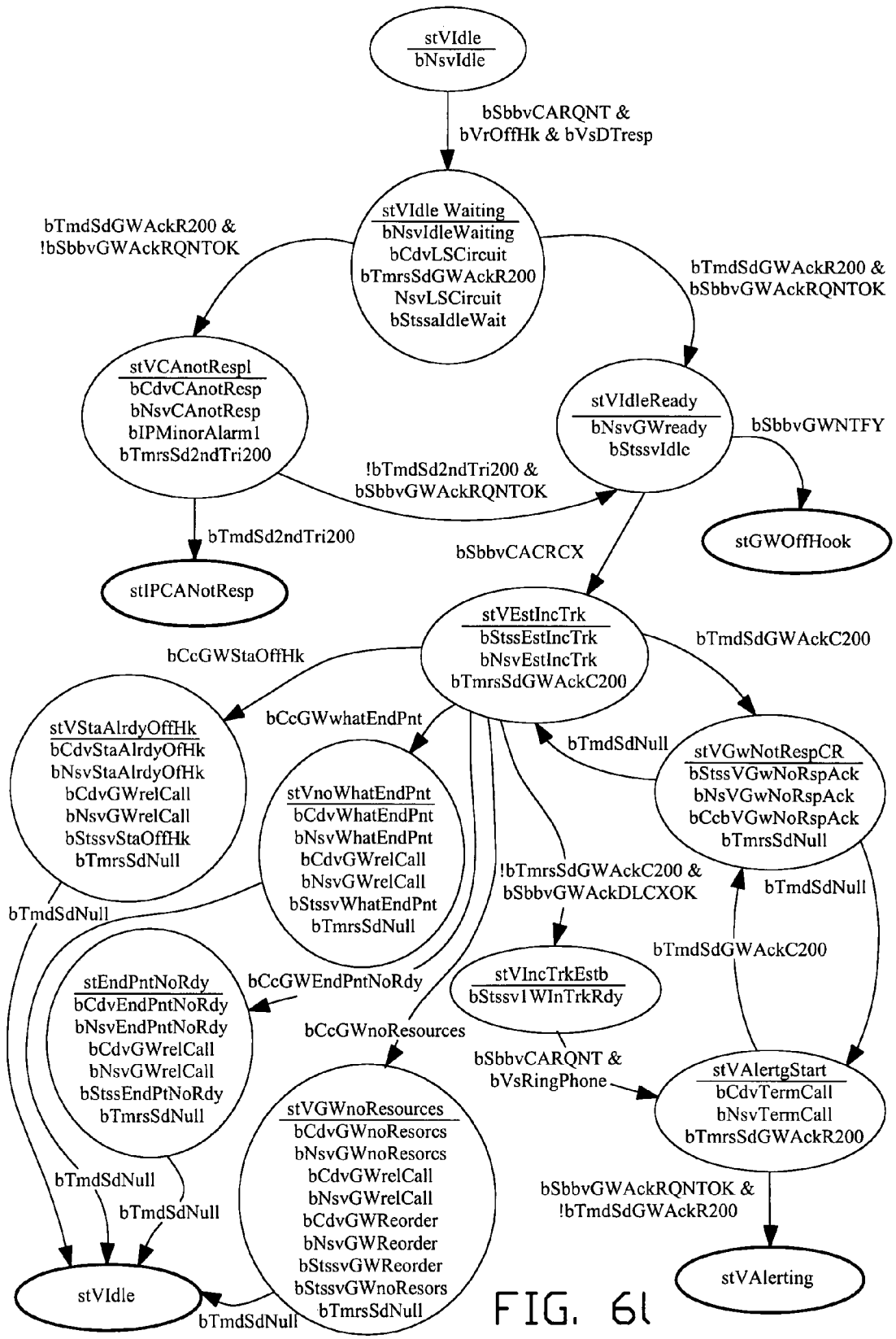
Figure 6M:
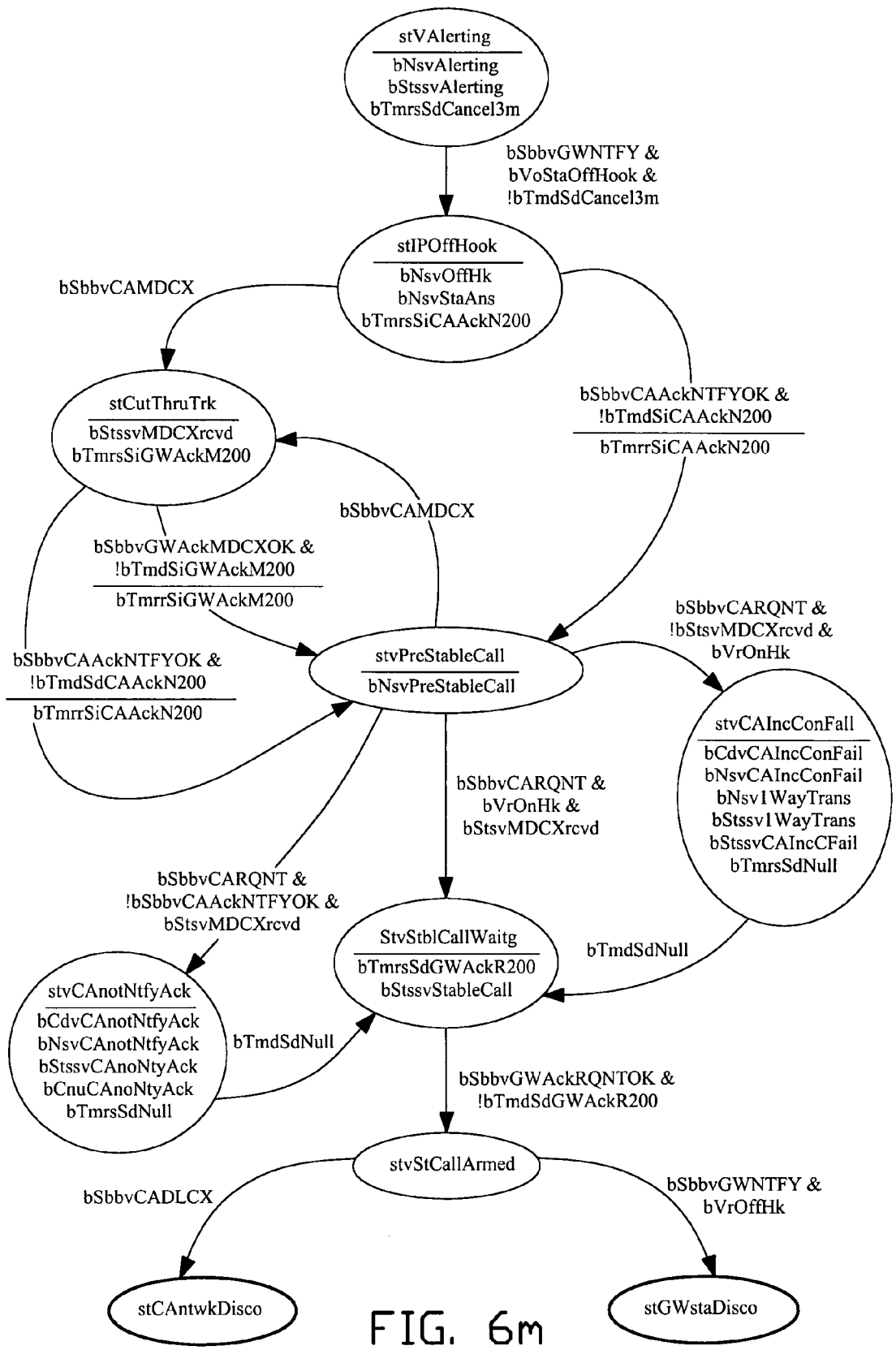
Figure 6N:
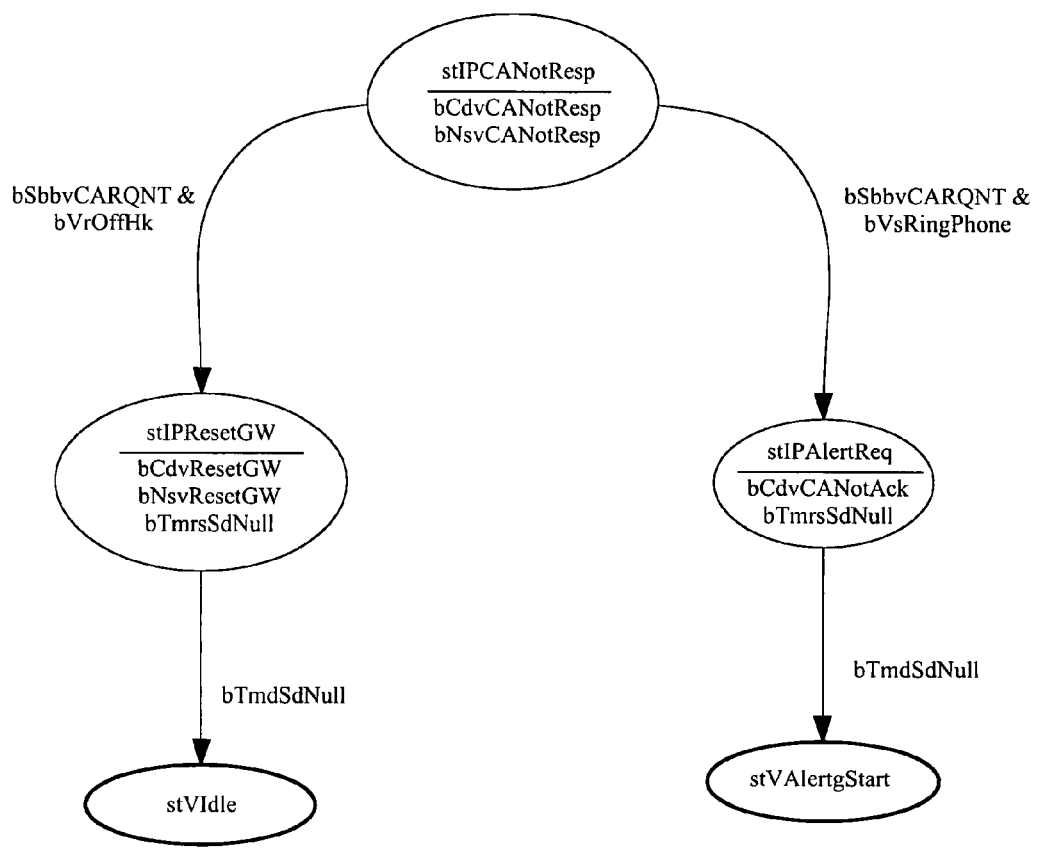
Figure 6P:
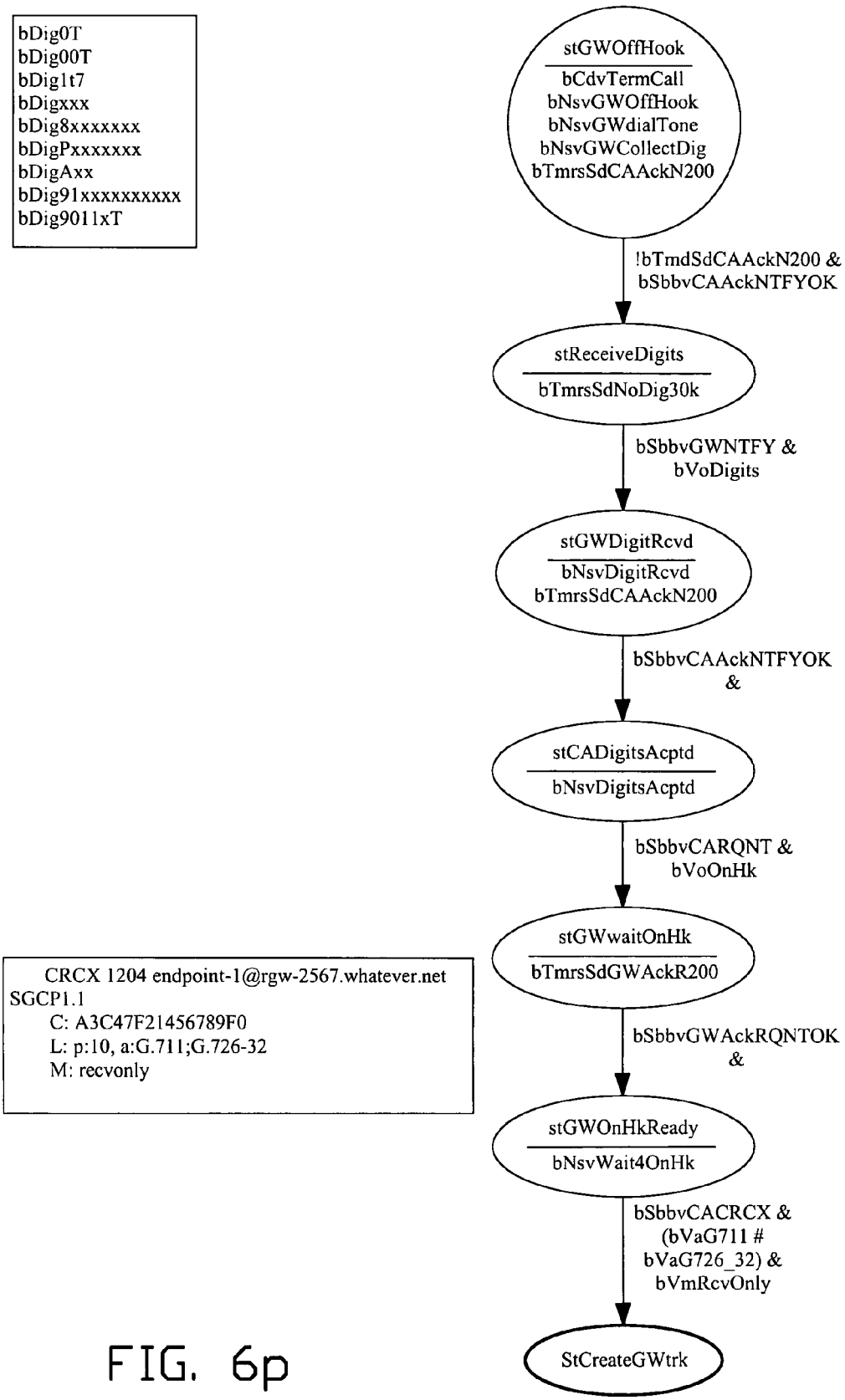
Figure 6Q:
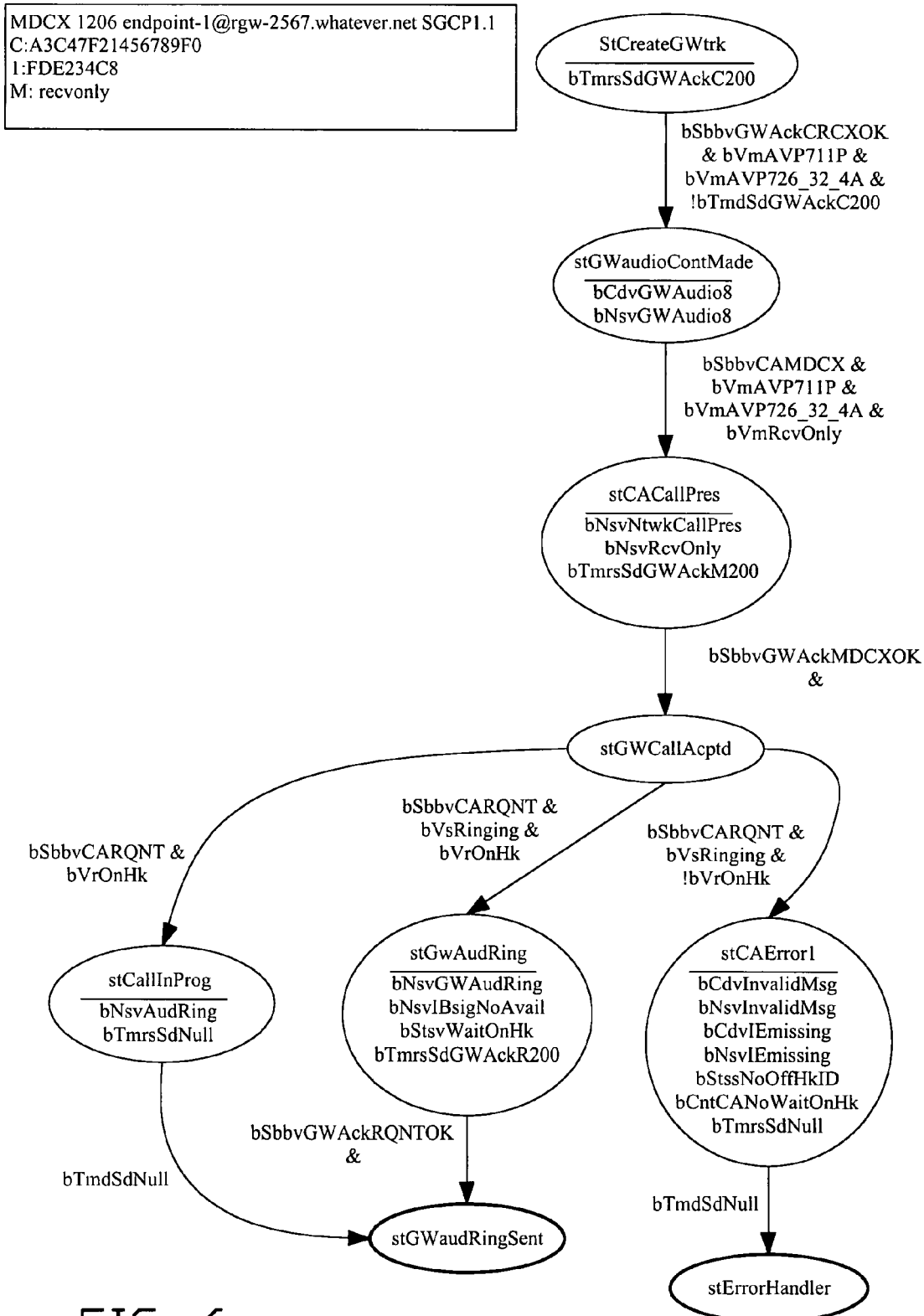
Figure 6R:
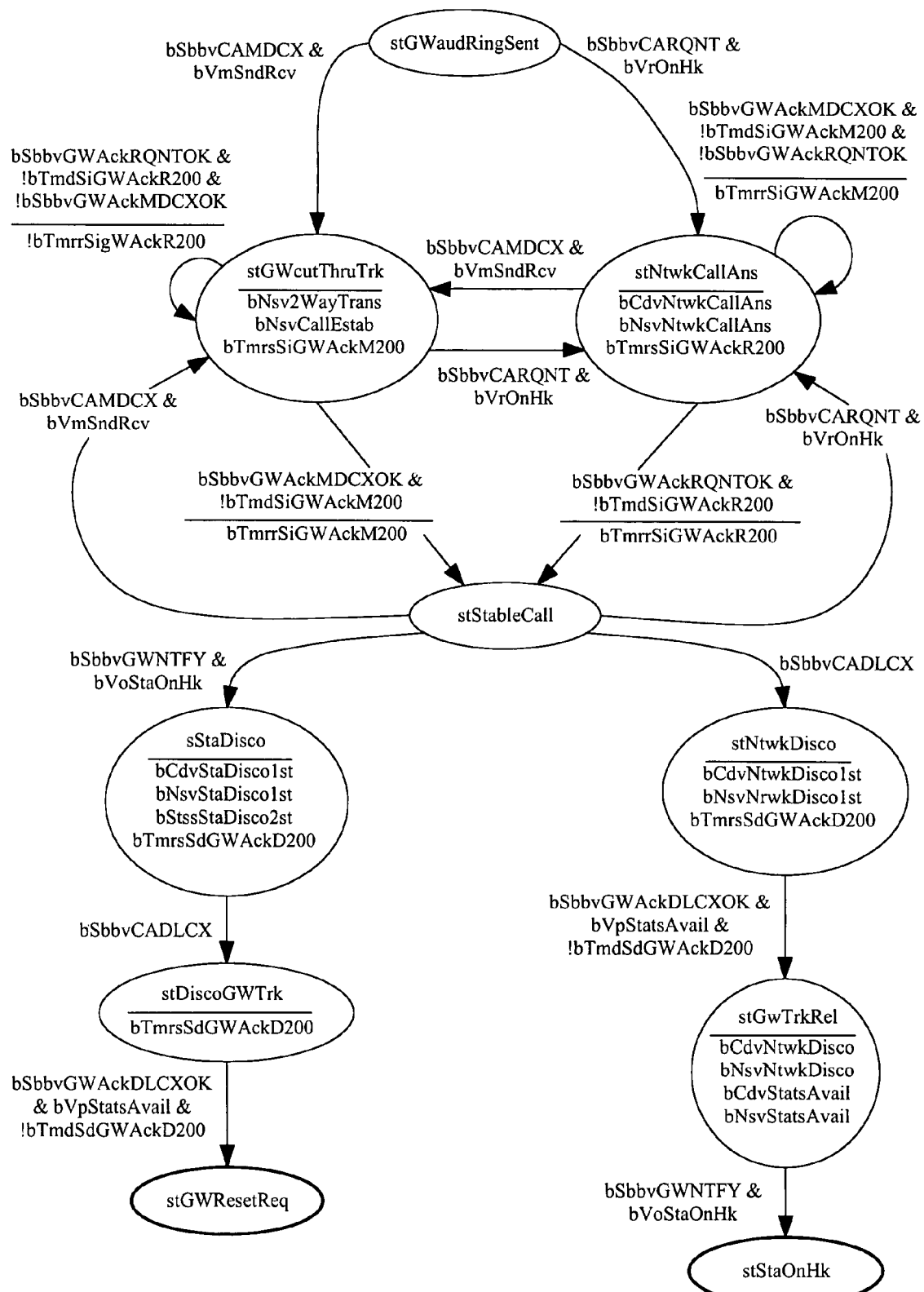
Figure 6S:
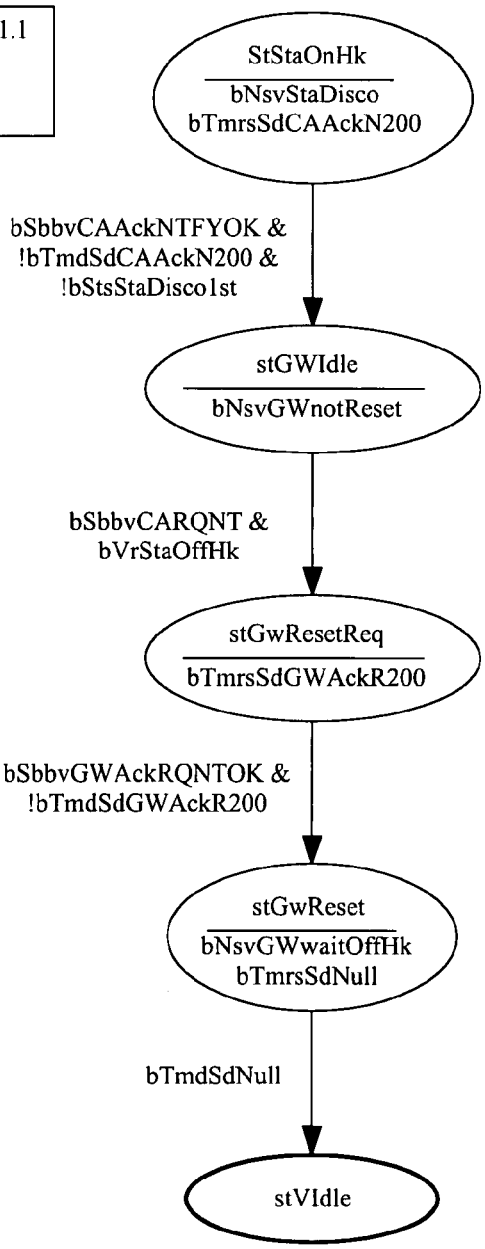
Figure 6T:
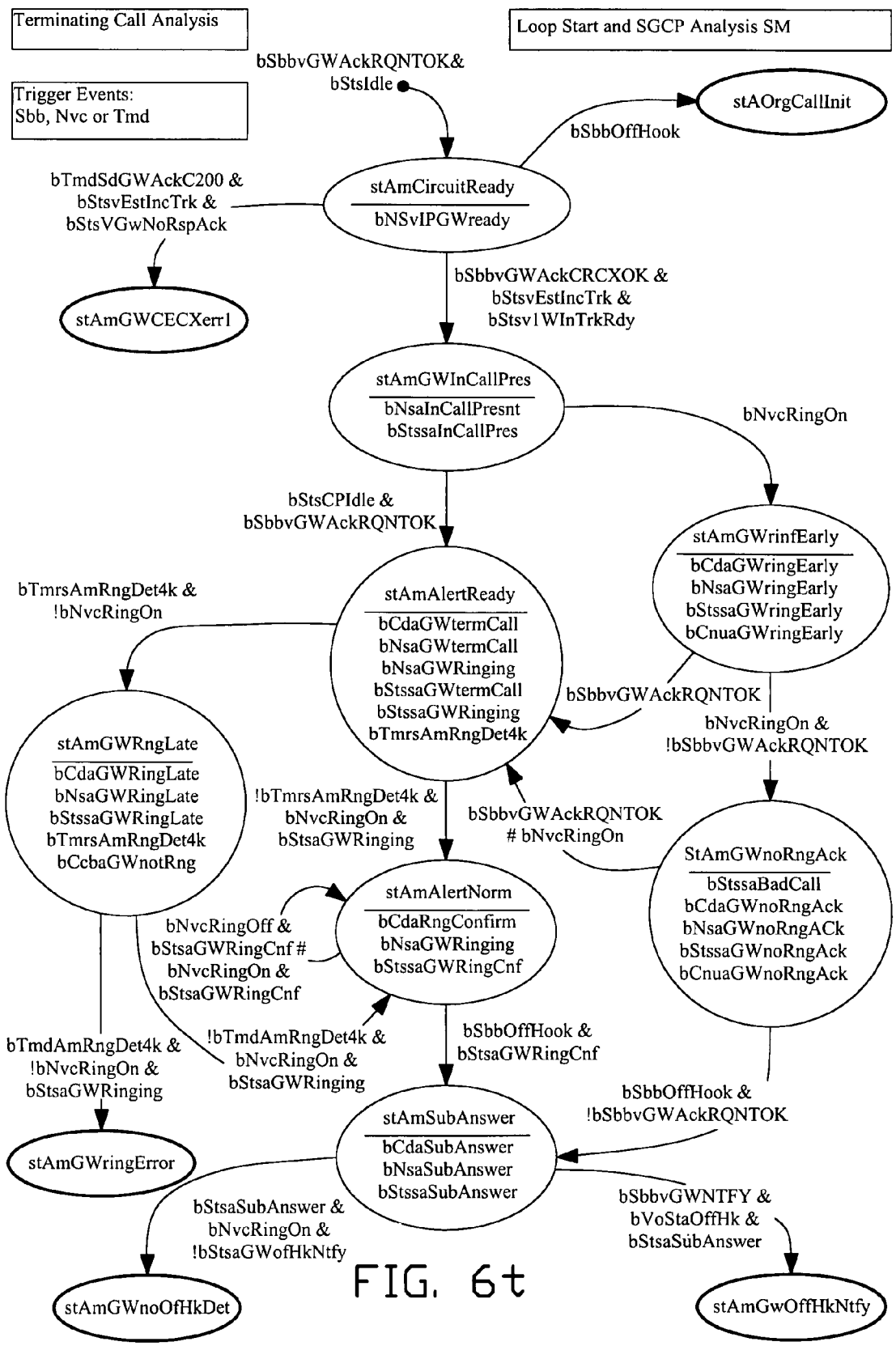
Figure 6U:
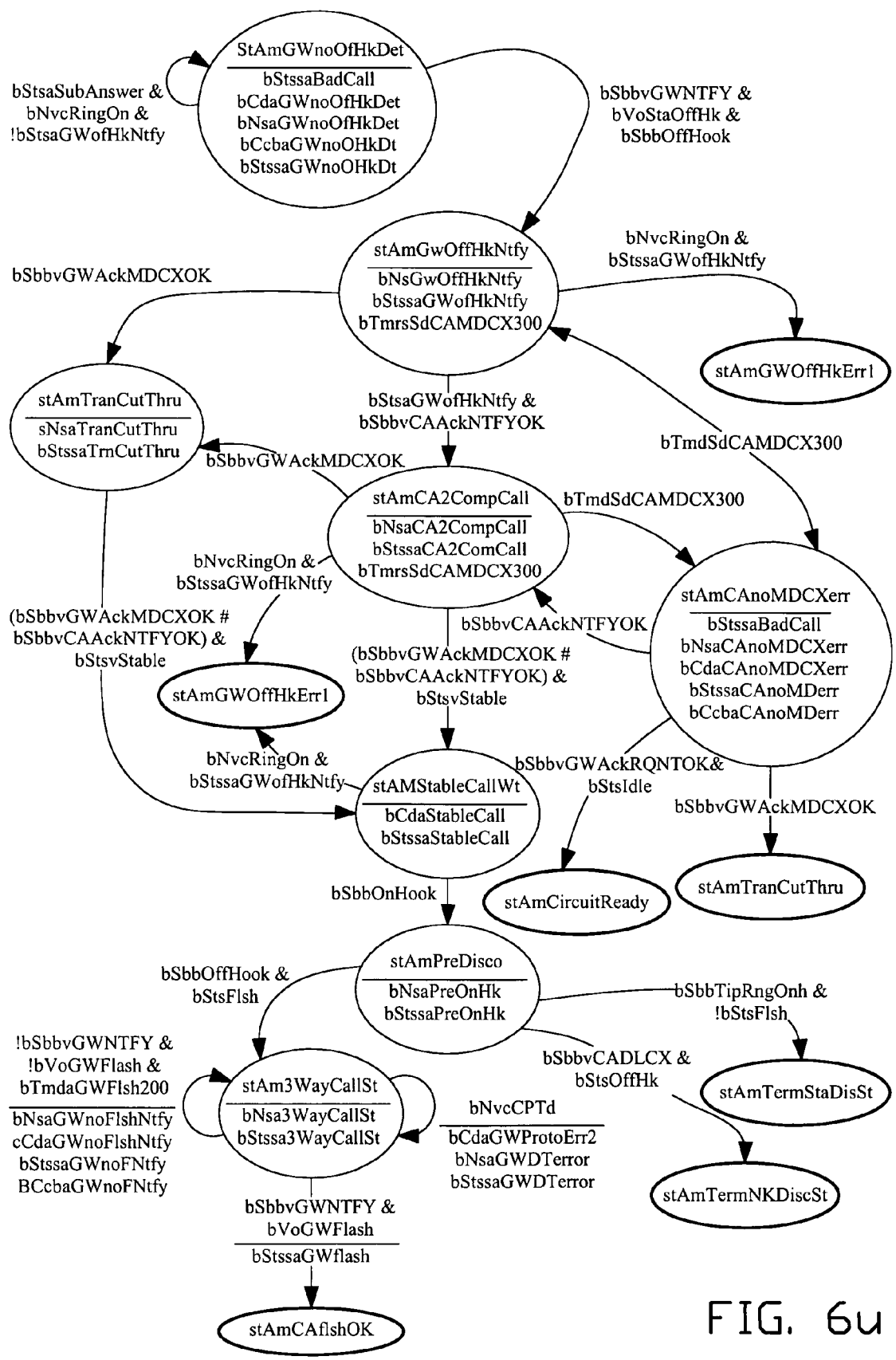
Figure 6V:
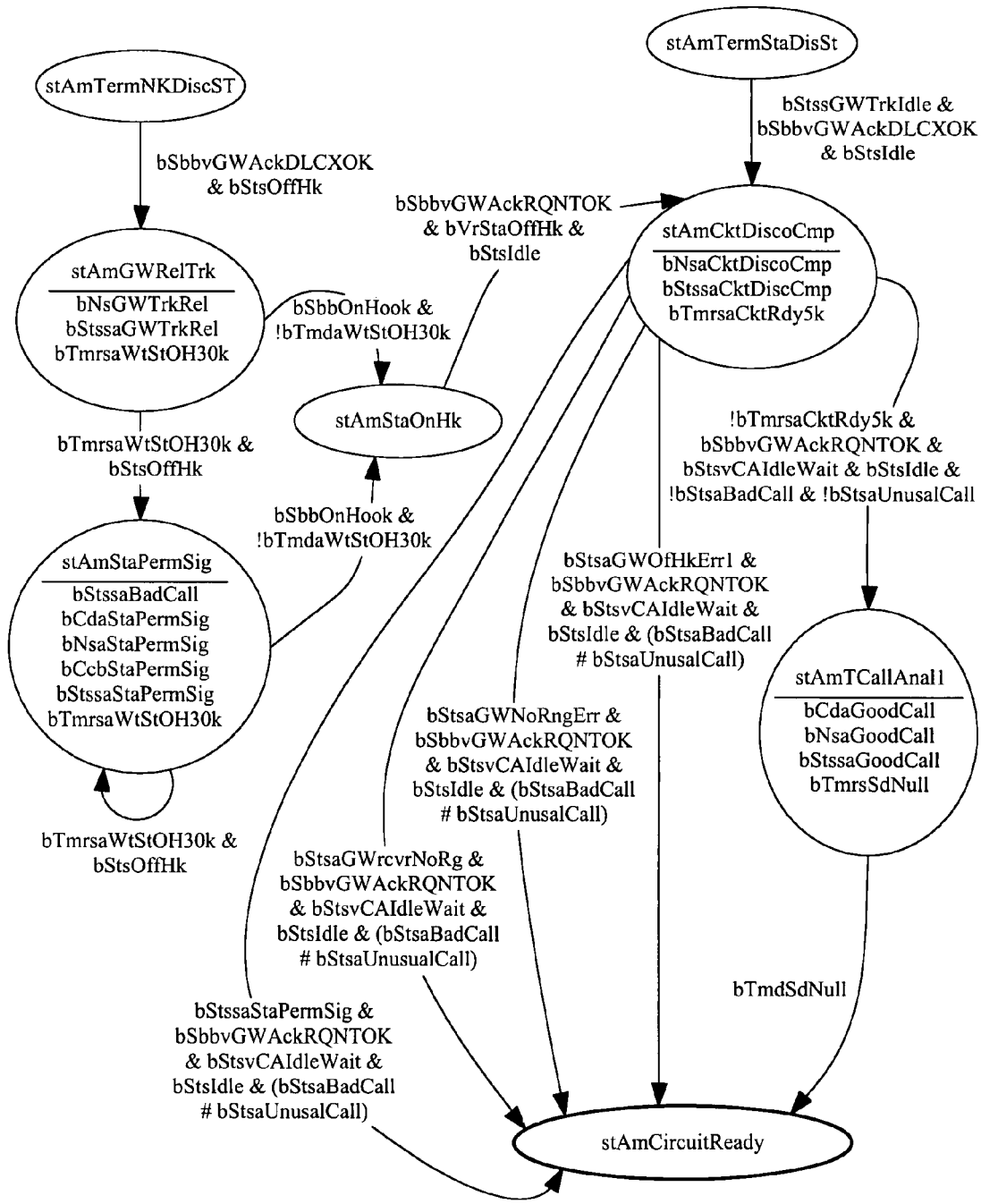
Figure 6W:
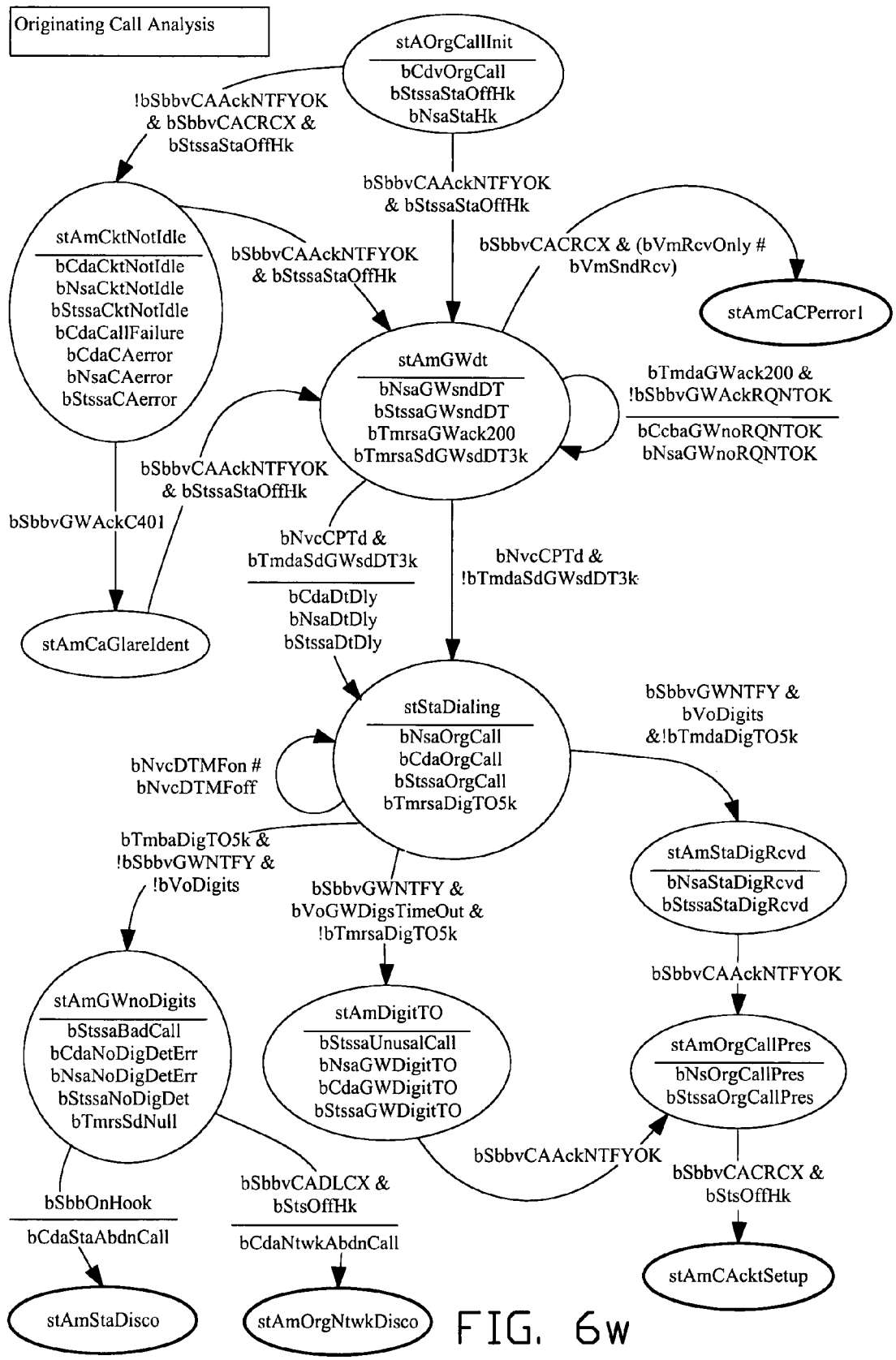
Figure 6X:
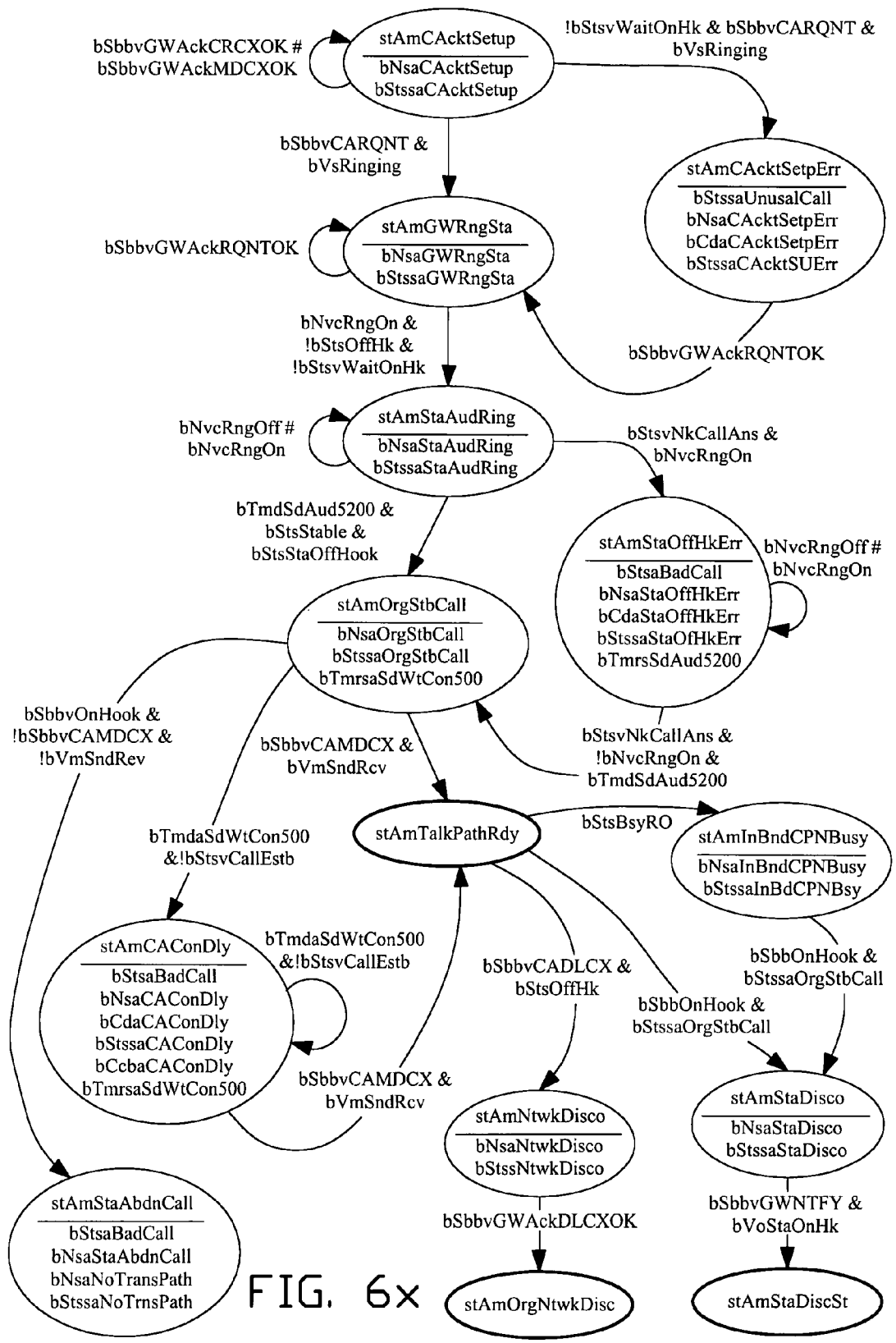
Figure 6Y:
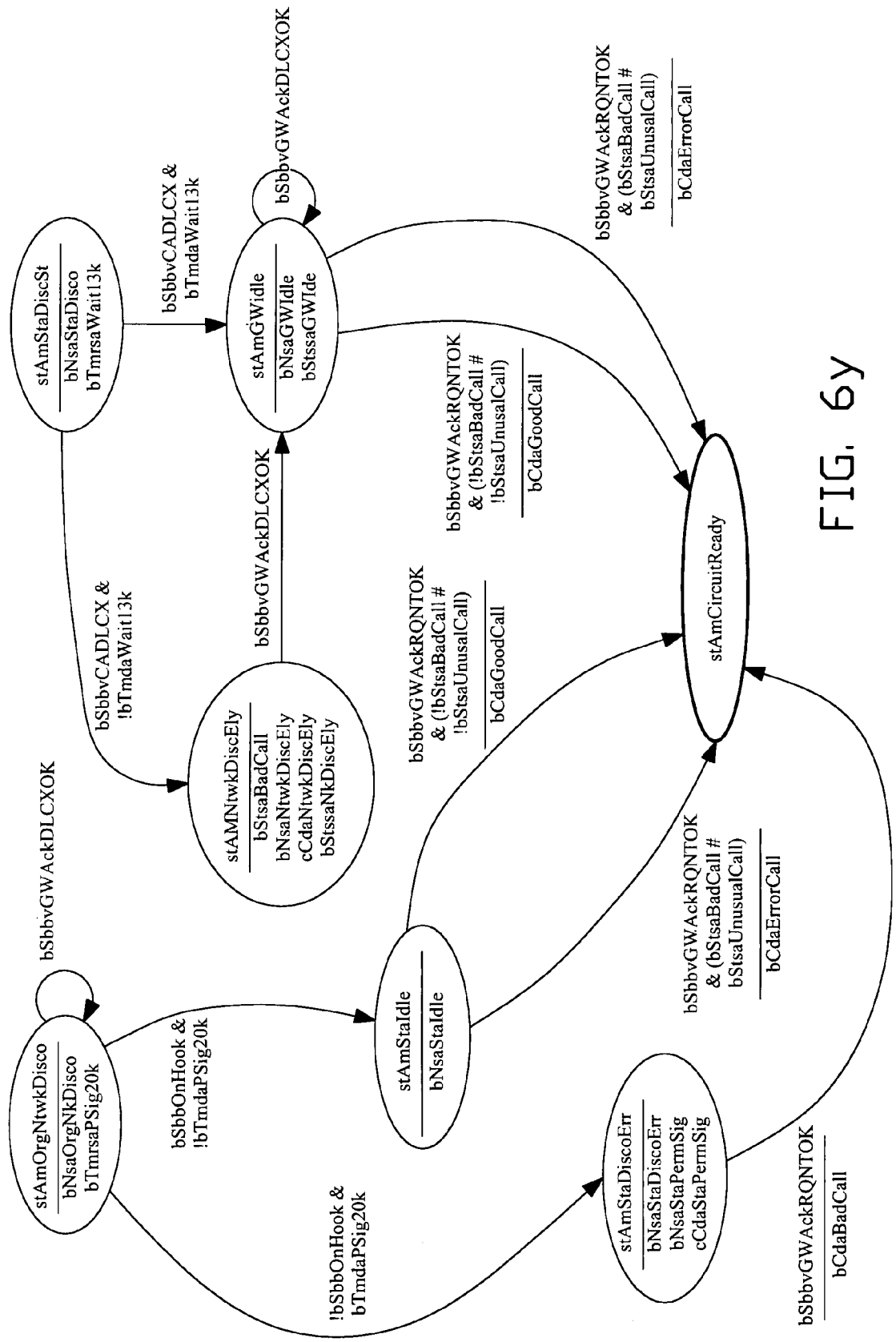
Figure 6Z:
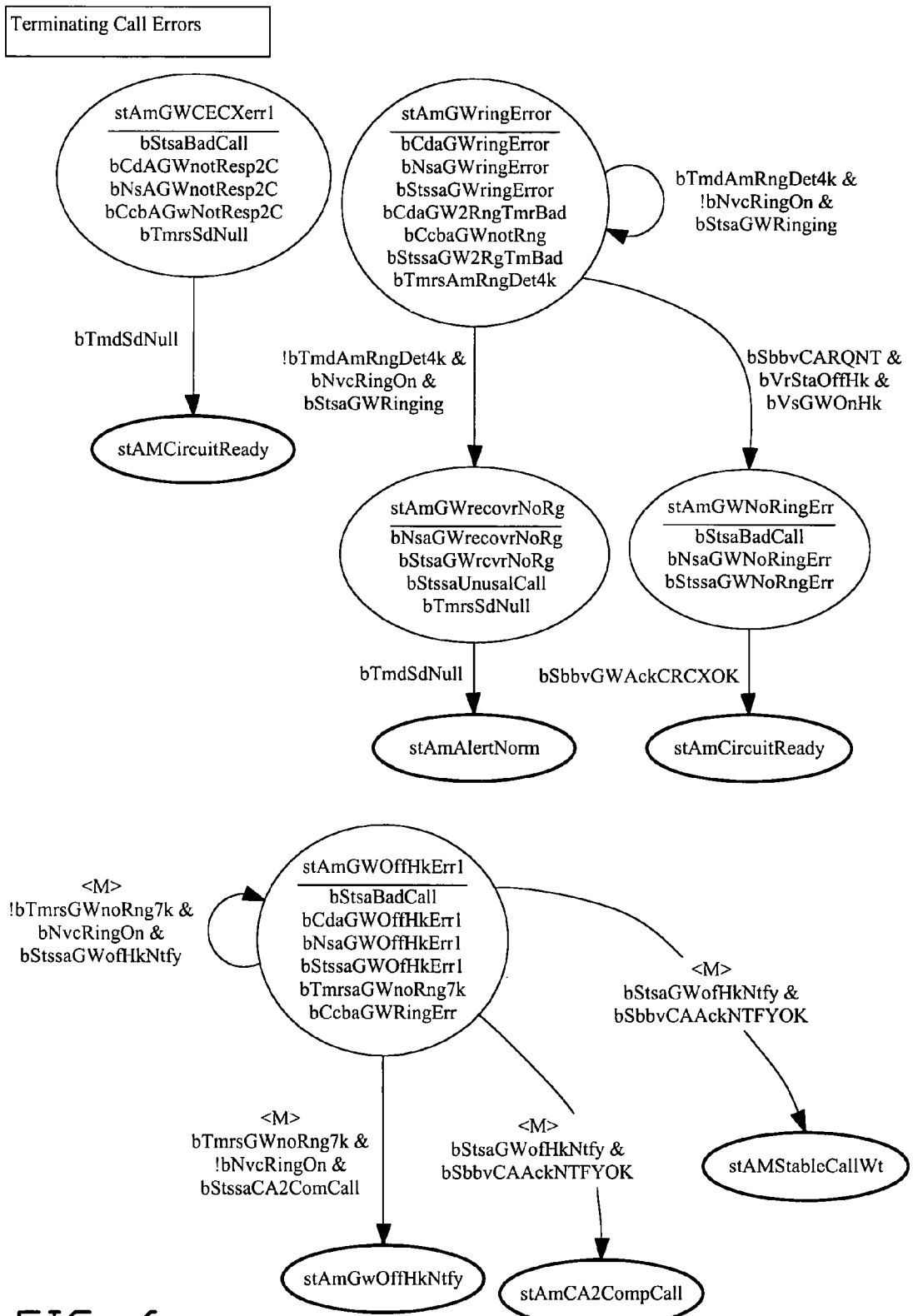

FIG. 5B illustrates an exemplary section of a typical Analysis state machine/multi protocol analyzer. This state machine does not receive events from any sensor, instead it uses the state and status information from the status handler as indicators to transition between analysis states. The analysis state machine is triggered by the timer processor each time one of the other state machines have processed a new event and has settled into the sleep state. In this example, the analysis state machine is in the stAMIdle state 484. The fist event to be detected in an NGTN Notification Request message, bSbvRQNTrHd, 485. This causes the state machine to transisition to the GW circuit ready state, stAMCircuitReady 486. This is the default state for all gateways.

The next event to be detected is another NotificationRequest message from the call controller to the Gateway, bStsIPAlrtStart 487. The call progress state machine is still in the Idle state. This information, bStsCPIdle, is made available to the analysis state machine and is used to qualify the bStsIPAlrtStart indication, bStsCPIdle & bStsIPAlrtStart 487. This means that both conditions must be true before the transition to the next state can occur. If instead of a call controller NotificationRequest message, a station Off Hook had occurred, then the transition bStsCPIdle & bStsIPStsOffHk 494 would have been true and the state machine would have transitioned to the originating call start state, stAMOrgCallStart 496.

Continuing reference to FIG. 5B, since the call controller has initiated a call, the analysis state machine sets bCdAMTermCall variable, indicating that this is a terminating call. The next event to be detected is the GW Ack message detection, bStsIPAlertg 489. This indicates that the Gateway can perform the alerting task, place ringing current on the station's line, and will do so at the next ringing cycle. Again, the station must be idle before ringing can occur, so the call progress state is used to qualify the transition, bStsCPIdle & bStsIPAlertg 489. This causes the state machine to transition to the next state, stIPGWalerting 490.

The next event to be detected is the station ringing from the call progress state machine, bStsStaRingOn 491. To validate that the GW was told to ring the station, the NGTN status is used to qualify the transition, bStsStaRingOn & bStsIPAlertg 491. This causes a transition to the call alerting normal state, stAMAlertNorm 492. As long as the station is ringing, bStsStaRingOff & bStsIPAlertg # bStsStaRingOn & bStsIPAlertg 493, the analysis state machine will stay in the stAMAlertNorm state 492 via transition 493.

If the station answers the call, bStsStaOffHook 497, and the GW has not been told to abandon the call, bStsIPAlertg 497, then the state machine transitions to the call answered state, stAMCallAns 498. If however the station does not answer the call and the caller hangs up, bStsIPOnHook 495, then the state machine transitions to the stAMCallAbdn state 499. Notice that the station could be either in the ring on or ring off state when this occurs, (bStsStaRingOff # bStsStaRingOn) & bStsIPOnHook 495.

During this process, notable states were set to indicate the stages of analysis reached, e.g., bNSvIPGWready, bNsvIPGWOK, bNsvAlerting, bNsGWRinging, bNSCPCallAns. This information stored, in time order with the call progress and NGTN status information. FIGS. 6*r*-6*z*1 provide more detailed state diagrams of the analysis state machines.

Though a state machine can be developed to define the call progress or NGTN protocol used by switch network elements, it does not provide the ability to save status information in memory nor is it capable of tracking and processing timers. Typically these functions would be performed by external hardware that is not available to normal processors or would be very cumbersome and expensive to add to normal processor mother boards. Hardware timers would also be difficult to modify as additional call progress protocol procedures are introduced by network switch vendors. Therefore, it is preferable that the event analyzer modules, protocol independent call processor module and analysis state machine performs these functions using C++ Objects which can be easily updated and maintained. Thus each module would be an object instantiated for each circuit monitored. Alternately, the system can be embodied as different processes executed by one or more processors.

Though an embodiment of the call progress and NGTN state machines and its associated protocol independent call processor module and analysis state machine is discussed in detail above, other methods such as data flow diagramming tools, expert system tools such as CLIPS tools, LISP programming language, Siefuzzy fuzzy logic tools, etc.

Figure 7:
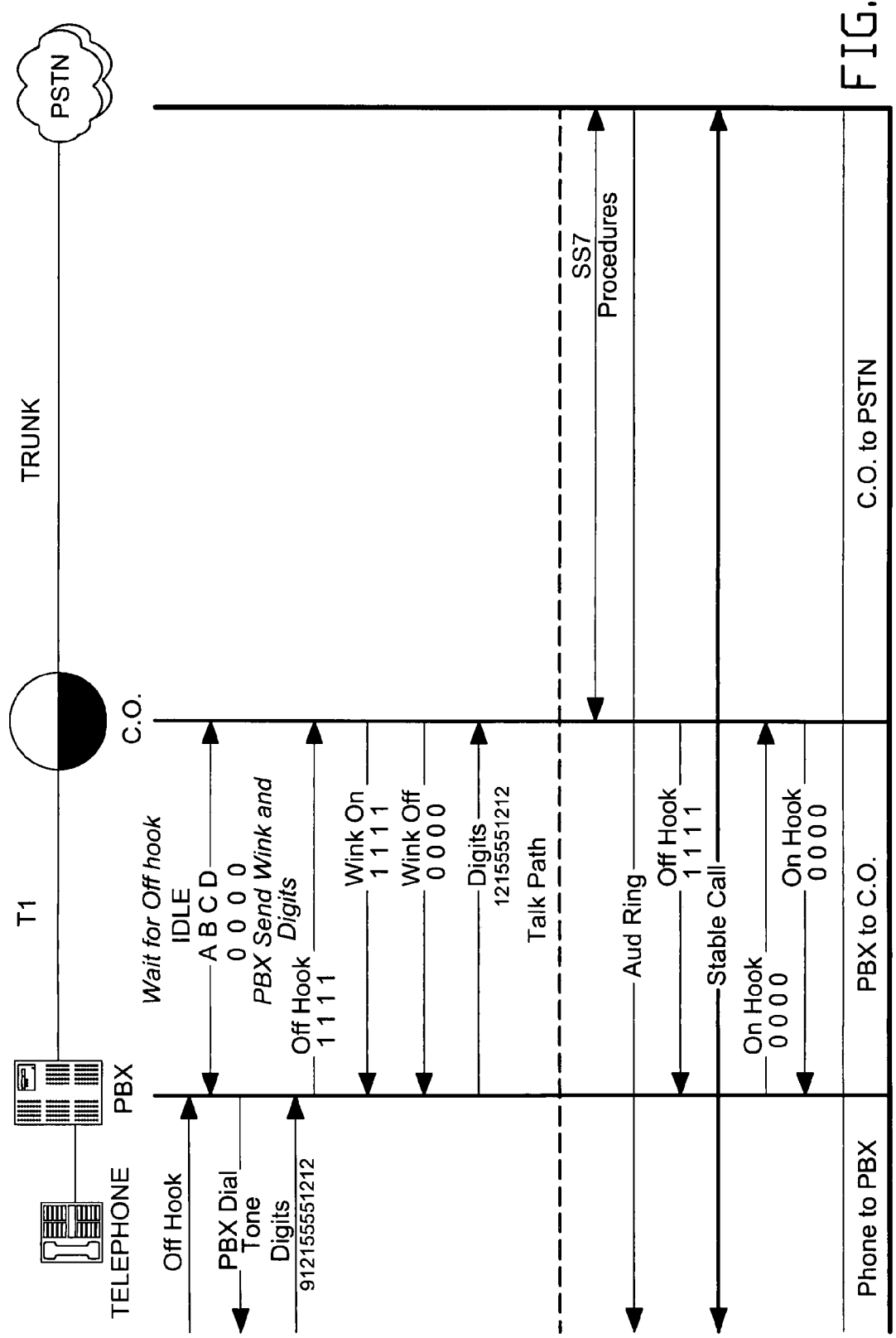
FIG. 7 illustrates an exemplary embodiment of how a call is normally handled in the PSTN.

FIG. 7 shows how a call is normally handled in the PSTN. The subscriber initiates signaling events by picking up a phone waiting for dial tone and dialing digits. The PBX translates these events into T1 signaling events (ABCD signaling Bits) and digit events (Multi-Freq. Digits). The PSTN Central Office (CO) receives these events and responds to them with the same type of signaling events (Wink and Off Hook). When sufficient information has been received the CO translate the information into Signaling System 7 (SS7) events. SS7 messages are used to communicate call-handling information to other COs in the PSTN. In this case, SS7 message initiates a call to the CO where the subscriber, identified by the dialed digits, resides. In order for a call to be placed successfully, all the correct procedures must be performed and the information must be accurate. If a procedure is not followed correctly or if the information is corrupt, the network elements may not be able to perform the required actions or generate the appropriate information.

Figure 8:
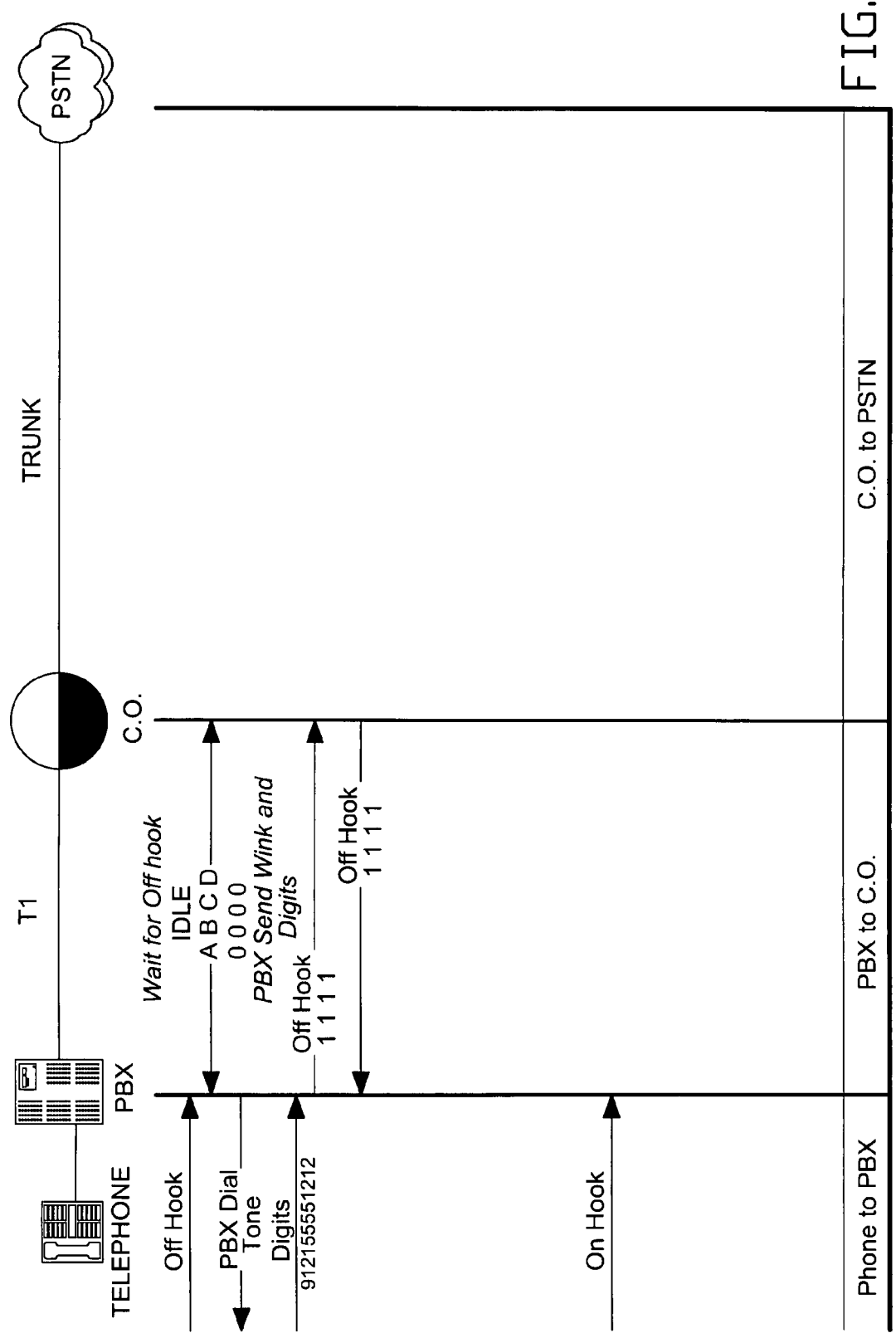
FIG. 8 illustrates an exemplary embodiment of how a call is handled in the PSTN when the CO is not provisioned for Wink Start.

FIG. 8 shows what can happen if the CO is not provisioned correctly. In this example, the PBX is provisioned for Wink Start, but the circuit in the CO is provisioned for Immediate Start. The PBX and CO are at a stalemate. Neither one can complete the call. As a result, the subscriber will eventually give up and most likely, try the call again. This scenario is common in the PSTN today. It is usually identified when the circuits are installed and corrected before the user experiences trouble. However, in the Next Generation Telephony Network (NGTN), the new service provider may not know how the subscriber's PBX is configured. The original service provider will not offer help or give the new service provider access to circuit or trouble history information. The subscriber does not always know how their circuits are configured, the "Telephone Company took care of that." As a result, the new service provider must either guess or, through trial and error, determine how the subscriber's equipment works.

Figure 9:
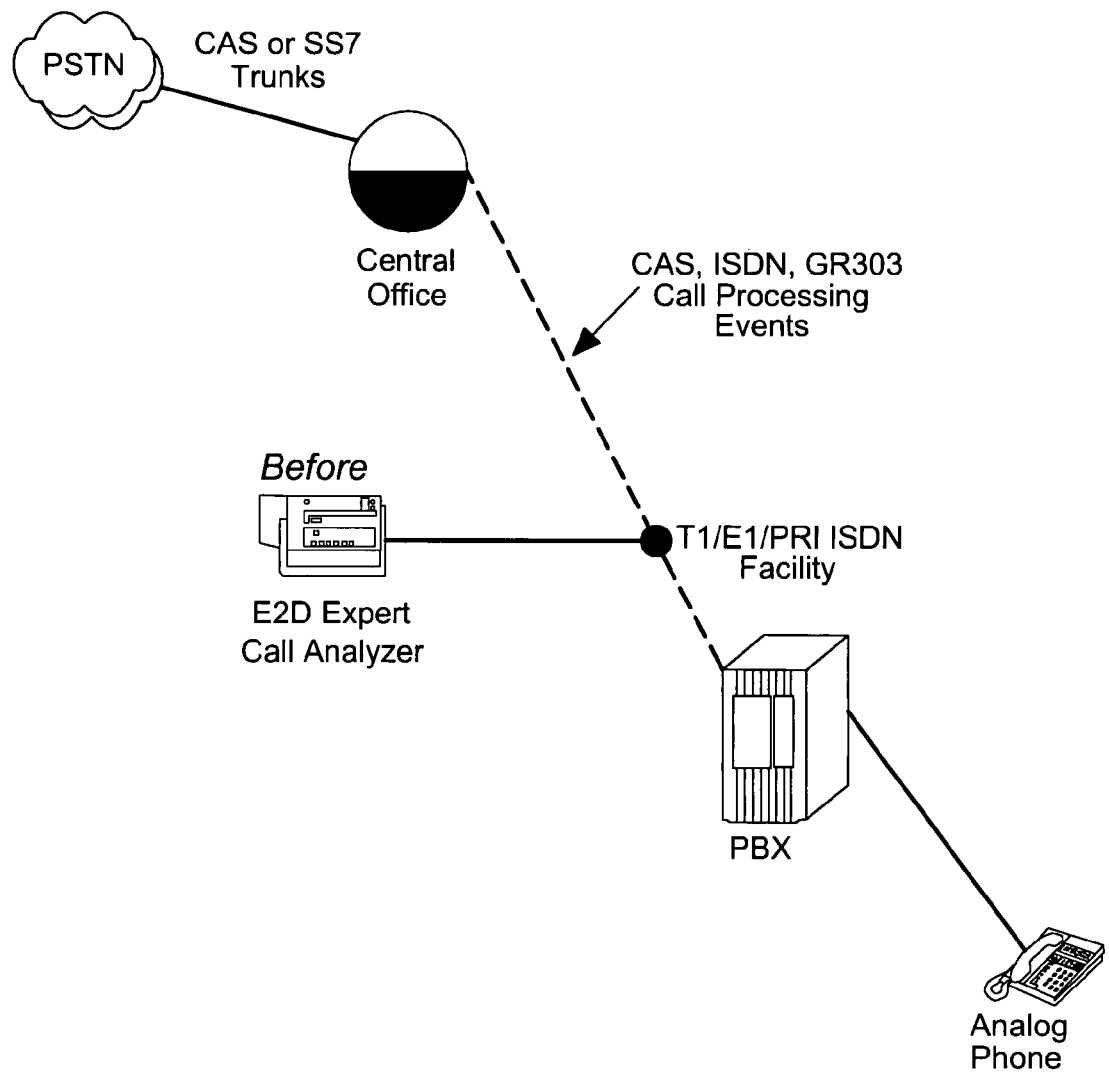
FIG. 9 illustrates an exemplary configuration for a subscriber's service benchmarking.

The invention can be used to capture signaling and call progress tones (CPT) on the subscriber's PBX before the circuits are converted to the NGTN. FIG. 9 shows a configuration to benchmark the subscriber's service. The invention captures all signaling and CPT events and converts them to calls. It analyzes these calls for anomalies and saves the calls and analysis to a relational database. Reports can be generated from this data characterizing the subscriber's services.

FIG. 10 shows an example of a configuration report. Referring to FIG. 10, a benchmark of the subscriber's usage by circuit allows the new service provider to determine how the subscriber uses their service. The new service provider can then engineer the service accordingly or suggest to the subscriber ways to improve their service. It also identifies what type of usage to provide (Voice, Data, FAX, IVR, etc.). This information is invaluable since most NGTN service providers will recommend voice compression to provide additional bandwidth for data services (Frame Relay, ATM, ISDN, etc.). Modem traffic can not be compressed and, depending on the type of NGTN architecture, "modem spoofing" might be required.

Configuration data can also be extracted from the database, allowing the new service provider to provision the NGTN equipment. One of the most difficult tasks a service provider must perform is determining when the user has finished dialing. PSTN switches use extensive translation tables to accomplish this feat, analyzing each digit or digit group as it is dialed. Even PBX's must have dialing translations to determine when to outpulse digits. NGTN equipment uses Digit Maps. These maps are an attempt to provide a means of determining when a subscriber has finished dialing. For example, A gateway Digit Map: (0T|00T|[1-7]xxx|8xxxxxxx|#xxxxxxx|*xx|91xxxxxxxxxx|9011x.T)

This map will consider dialing complete when,
a. 0 and timer T expires, or
b. 00 and timer T has expired, or
c. Any 3 digit sequence where the first digit is between 1 and 7, or
d. a digit string starting with 8 followed by 7 digits, or
e. a digit string starting with # followed by 7 digits, or
f. a digit string starting with * followed by 2 digits, or
g. a digit string starting with 91 followed by 10 digits, or
h. a digit string starting with 9011 and any digits until timer T expires Any digit string not matching one of these criteria will be ignored. But what would happen if the subscriber dials 9 1010 220 1 415 555 1212? Nothing will happen. Worse yet, what happens if the subscriber dials 9 911? Again, nothing happens. These patterns don't match any of the allowed digit maps.

Normally, the only way to obtain this information is to review phone bills. Unfortunately, phone bills do not capture incoming, Intra-PBX, and IVR/Voice Mail digit information and do not identify call treatment such as Toll Diversion and Answer Supervision requirements. The invention captures all digit information and can build a digit map representative of the subscriber. FIG. 11 shows the Digit Map report supported by the invention.

In addition to configuration and Digit Map information, the invention also provides call handling performance data. FIG. 12 shows a sample Call Handling report. This data can be used by the new service provider to identify faulty circuits, network load requirements, Potential PBX problems, etc.

This pre-service benchmark can be used to demonstrate to the subscriber service and network configuration improvements as well as eliminating subscriber concerns that the service is worse than it was before.

Figure 13:
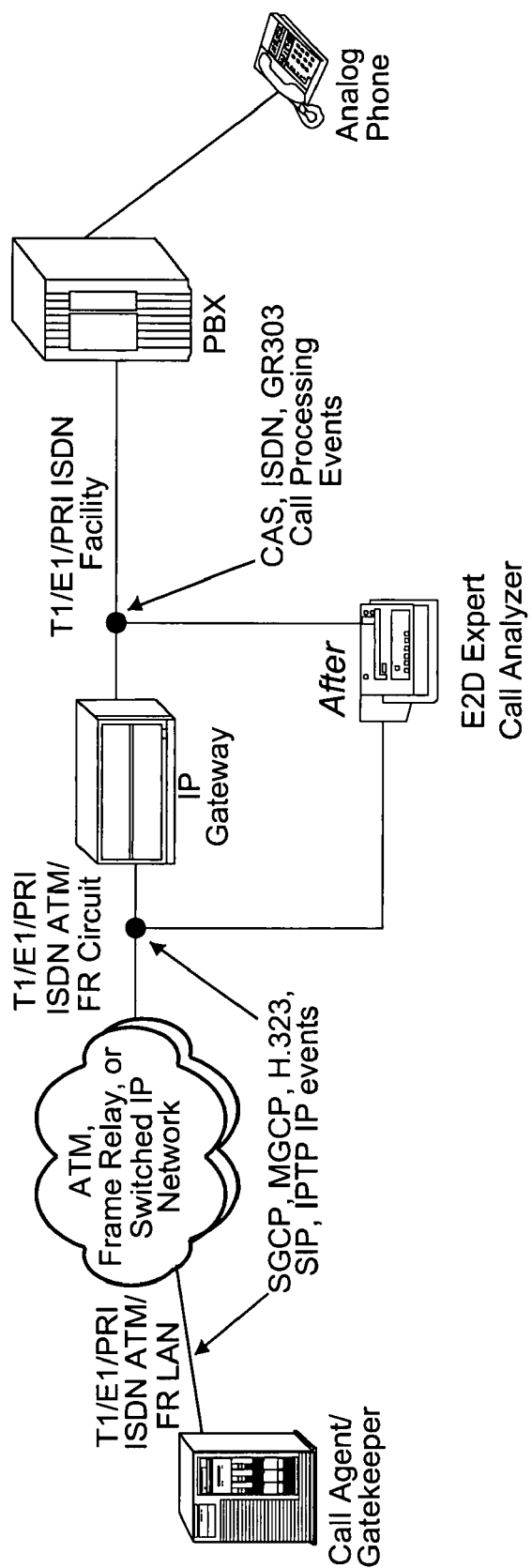
FIG. 13 illustrates an exemplary configuration for NGTN post cutover benchmarking.

After the pre-service benchmark is taken and used to configure the NGTN configuration, and the subscriber is converted over to the new NGTN equipment, a second benchmark can be taken. FIG. 13 shows how this can be done.

Figure 14:
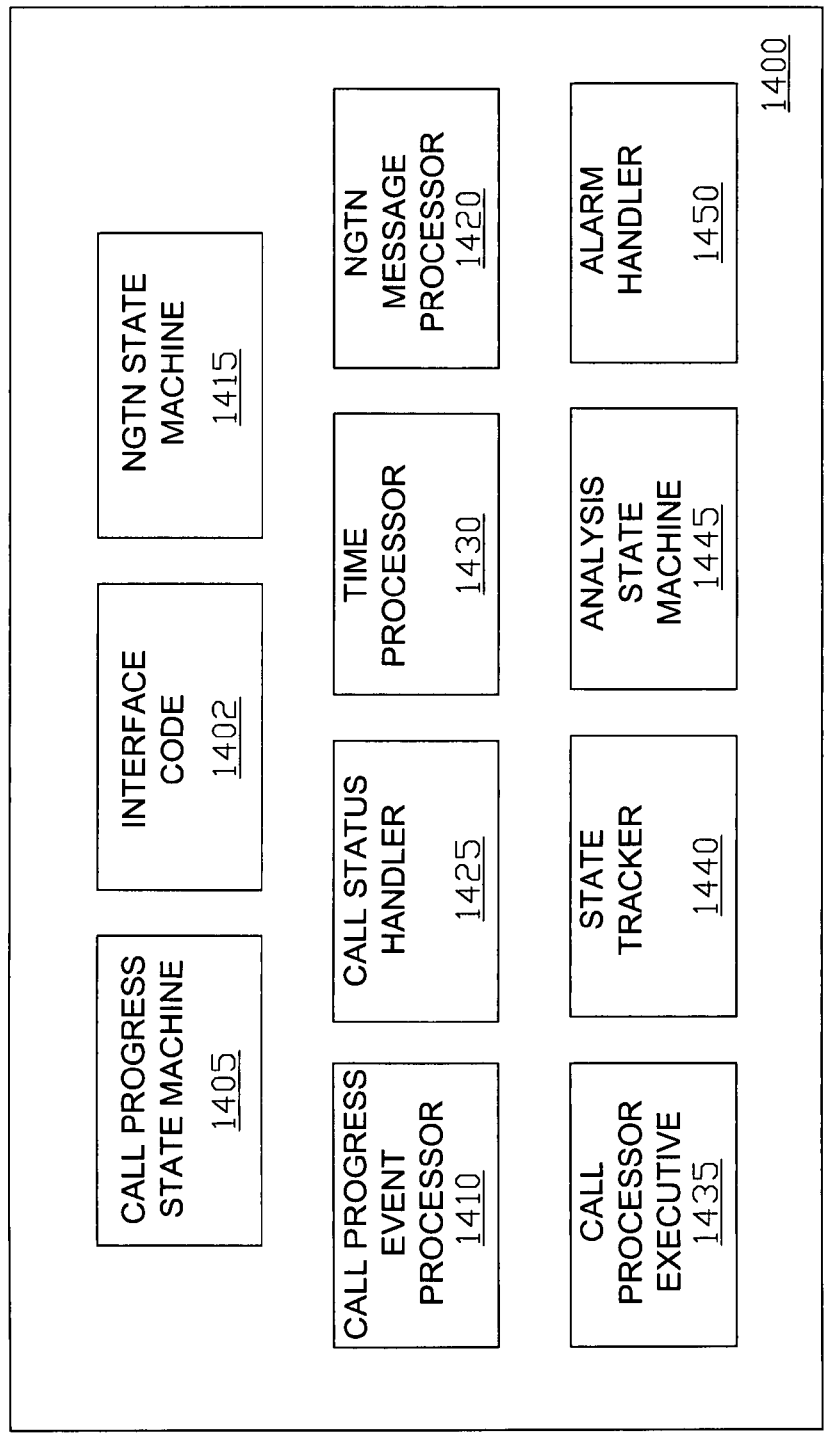
FIG. 14 illustrates an exemplary embodiment of a computer-readable medium containing instructions for carrying out the call analyzer functions.

FIG. 14 illustrates an exemplary embodiment of a computer-readable medium 1400 containing various sets of instructions, code sequences, configuration information, and other data used by a computer or other processing device. The embodiment illustrated in FIG. 14 is suitable for use with call analyzer method described above. The various information stored on medium 1400 is used to perform various data processing operations. Computer-readable medium 1400 is also referred to as a processor-readable medium. Computer-readable medium 1400 can be any type of magnetic, optical, or electrical storage medium including a diskette, magnetic tape, CD-ROM, memory device, or other storage medium.

Computer-readable medium 1400 includes interface code 1402 that controls the flow of information between various devices or components in the computer system. Interface code 1402 may control the transfer of information within a device (e.g., between the processor and a memory device), or between an input/output port and a storage device. Additionally, interface code 1402 may control the transfer of information from one device to another. The computer-readable medium 1400 may also include codes implementing the different state machines described above, such as, for example, the call progress state machine 1405, the call progress event processor 1410, the NGTN state machine 1415, the NGTN message processor 1420, the call status handler 1425, the timer processor 1430, the call processor executive 1435, the state tracker 1440, the analysis state machine 1445, and the alarm handler 1450.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A call processing system for monitoring status of a call in a network comprising:
    a first set of sensors connected to one or more subscriber or PSTN network circuits, the first set of sensors configured to sense raw call progress signaling information on the circuit;
    a second set of sensors connected to a call control channel of a next generation telephony network (NGTN) network element, the second set of sensors configured to sense NGTN call control message information from the NGTN network element; and
    an event analyzer coupled to the first set of sensors and the second set of sensors, the event analyzer configured to:
        selectively receive the raw call progress signaling information and the NGTN call control message information, and
        process the raw call progress signaling information and the NGTN call control message information to generate logical call handling events;
    wherein the event analyzer comprises a call progress event analyzer coupled to the first set of sensors and configured to receive the raw call progress signaling information, the call progress event analyzer comprising:
        a call progress event processor configured to:
            convert the raw call progress signaling information into logical call handling events, pass the logical call handing events to a protocol independent call processor, and accumulate dialed and mid-call digit information for channel associated signaling circuits and element information for common channel signaling circuits; and a call progress state machine configured to:

receive and analyze logical event information from the protocol independent call processor, and receive and analyze the digit information and the element information from the call progress event processor.

2. A call processing system for monitoring status of a call in a network comprising:

a first set of sensors connected to one or more subscriber or PSTN network circuits, the first set of sensors configured to sense raw call progress signaling information on the circuit;

a second set of sensors connected to a call control channel of a next generation telephony network (NGTN) network element, the second set of sensors configured to sense NGTN call control message information from the NGTN network element; and an event analyzer coupled to the first set of sensors and the second set of sensors, the event analyzer configured to:

selectively receive the raw call progress signaling information and the NGTN call control message information, and process the raw call progress signaling information and the NGTN call control message information to generate logical call handling events;

wherein the event analyzer further comprises an NGTN event analyzer coupled to the second set of sensors and configured to receive the NGTN call control message information, the NGTN event analyzer comprising:

a NGTN message processor configured to:

decode NGTN call control message information, convert the NGTN call control message information into logical call handling events, pass the logical call handling events to a protocol independent call processor; and accumulate call control message information element information; and a NGTN state machine configured to:

receive and analyze the logical event information from the protocol independent call processor, and receive and analyze call control message information element information from the NGTN message processor.

3. The system of claim 2, further comprising the protocol independent call processor configured to selectively receive the logical call handling events from the event analyzer, the protocol independent call processor comprising:

a timer processor coupled to the event analyzer, the timer processor configured to:

calculate an elapsed time from a previous call progress event or an elapsed time from a previous NGTN message event, the elapsed time causing an elapsed-time event for the call progress state machine or the NGTN state machine, enable one or more timers used to determine wait time for an expected call progress event or NGTN message event, wherein an expiring timer causing an expired-timer event for the call progress state machine or the NGTN state machine, and send the logical call handling event to the call progress state machine or the NGTN state machine.

4. The system of claim 3, further comprising a call status handler configured to:

maintain current call status information for each call progress event received from the call progress event processor, wherein a capturing of the raw call progress signaling information by the first set of sensors is indicative of an occurrence of the call progress event, and maintain current call status information for each message event received from the NGTN message processor, wherein a capturing of the NGTN call control message by the second set of sensors is indicative of an occurrence of the message event.

5. The system of claim 3, further comprising a state tracker configured to track a current state of the call progress state machine and of the NGTN state machine, the state tracker providing call state information and call status information to the call progress state machine and the NGTN state machine, the current state used by the call progress state machine and the NGTN state machine to transition to a new state.

6. The system of claim 5, wherein the transitioning from the current state to the new state is dependent on the current call status from the call status handler and a new call progress event received from the call progress event processor or a new message event received from the NGTN message processor.

7. The system of claim 6 wherein, upon transitioning to the new state, the call progress state machine and the NGTN state machine update the call status handler with a new call status, update the state tracker with the new state, inform the timer processor that a current cycle is completed, and when required, enable a new timer in the timer processor.

8. The system of claim 3, further comprising a call processor executive configured to:

receive the call state information and the call status information, translate the call state information and the call status information, and transmit the translated information to an external device.

9. The system of claim 3, wherein the timer processor is further configured to select a most recent call progress event or message event and clock the call progress state machine or the NGTN state machine respectively, and wherein, when clocked, the call progress state machine analyzes the most recent call progress event and the NGTN state machine analyzes the most recent message event.

10. The system of claim 9, wherein, after the most recent call progress event or message event is analyzed, the protocol independent call processor, the call progress state machine and the NGTN state machine wait for a next call progress event or message event to occur.

11. The system of claim 9, wherein the timer processor is further configured to determine wait time for an expected call progress event or message event based on receipt time of the previous call progress event or message event.

12. A call processing system for monitoring status of a call in a network comprising:

a first set of sensors connected to one or more subscriber or PSTN network circuits, the first set of sensors configured to sense raw call progress signaling information on the circuit;

a second set of sensors connected to a call control channel of a next generation telephony network (NGTN) network element, the second set of sensors configured to sense NGTN call control message information from the NGTN network element;

an event analyzer coupled to the first set of sensors and the second set of sensors, the event analyzer configured to:

selectively receive the raw call progress signaling information and the NGTN call control message information, and process the raw call progress signaling information and the NGTN call control message information to generate logical call handling events; and a multi-protocol call analyzer triggered by the timer processor at timer expiration and at end of NGTN state machine or Call Progress state machine cycle, the multi-protocol call analyzer configured to:

use information from the call status handler to transition to a new state, wherein a state of the multi-protocol call analyzer comprises an alarm state or error state, a new analysis state, or both the alarm state and the new analysis state, pass the new analysis state information to the state tracker, pass a new call status information to the call status handler, pass a new timer set information to the timer processor, and notify the timer processor and an alarm handler when entering the alarm state.

13. A call processing system for monitoring status of a call in a network comprising:

a first set of sensors connected to one or more subscriber or PSTN network circuits, the first set of sensors configured to sense raw call progress signaling information on the circuit;

a second set of sensors connected to a call control channel of a next generation telephony network (NGTN) network element, the second set of sensors configured to sense NGTN call control message information from the NGTN network element;

an event analyzer coupled to the first set of sensors and the second set of sensors, the event analyzer configured to:

selectively receive the raw call progress signaling information and the NGTN call control message information, and process the raw call progress signaling information and the NGTN call control message information to generate logical call handling events; and an alarm handler configured to:

receive call handling error information corresponding to the alarm state from the multi-protocol call analyzer, accumulate alarm counts, and trigger an alarm message to external network management systems when the alarm count exceed a defined threshold.

14. A method, comprising:

sensing a raw call progress signaling information from one or more subscriber or PSTN network circuits;

sensing a next generation telephony network (NGTN) message information from a NGTN call control channel of a network element;

generating logical call handling events from the raw call progress signaling information and from the NGTN message information, wherein generating logical call handling events from the raw call progress signaling information comprises:

converting the raw call progress signaling information into the logical call handling event;

setting an elapsed time event, the elapsed time being the time between the call progress event and a most recent call progress event; and determining if a timer expiration event occur, the timer set for an expected call progress event; and processing the logical call handling events corresponding to the raw call progress signaling information and the NGTN message information.

15. The method of claim 14, wherein generating logical call handling events from the raw call progress signaling information further comprises:

updating the current call status;

enabling a new timer when there is an expected call progress event; and waiting for a next call progress event to occur.

16. A method, comprising:

sensing a raw call progress signaling information from one or more subscriber or PSTN network circuits;

sensing a next generation telephony network (NGTN) message information from a NGTN call control channel of a network element;

generating logical call handling events from the raw call progress signaling information and from the NGTN message information, wherein generating logical call handling events from the NGTN message information comprises:

converting the NGTN message information into the logical handling event;

setting the elapsed time event to be the time between the NGTN message event and a most recent NGTN message event; and determining if the timer expiration event occur, the timer set for an expected NGTN message event; and processing the logical call handling events corresponding to the raw call progress signaling information and the NGTN message information.

17. The method of claim 16, wherein generating logical call handling events from the NGTN message information further comprises:

updating the current call status;

enabling a new timer when there is an expected NGTN message event; and waiting for a next NGTN message event to occur.

18. A method, comprising:

sensing a raw call progress signaling information from one or more subscriber or PSTN network circuits;

sensing a next generation telephony network (NGTN) message information from a NGTN call control channel of a network element;

generating logical call handling events from the raw call progress signaling information and from the NGTN message information; and processing the logical call handling events corresponding to the raw call progress signaling information and the NGTN message information by analyzing the logical call handling event, the timer expiration event, the elapsed time event, and the current call status such that when an error condition occurs an alarm is generated; maintaining the current call status; providing call records and analysis information associated with the call progress event and the NGTN message event to external display devices; generating call status and call handling error information; accumulating alarm counts; and triggering an alarm message to external network management systems when the alarm counts exceed a defined threshold.

19. A computer readable medium containing instructions which, when executed in a processing system, causes the processing system to perform a method for determining and monitoring status of calls in a network, comprising:

sensing a raw call progress signaling information from one or more subscriber or PSTN network circuits;

sensing a next generation telephony network (NGTN) message information from a NGTN call control channel of a network element;
generating logical call handling events from the raw call progress signaling information and from the NGTN message information, wherein generating logical call handling events from the raw call progress signaling information comprises:
 converting the raw call progress signaling information into the logical call handling event;
 setting an elapsed time event, the elapsed time being the time between the call progress event and a most recent call progress event; and
 determining if a timer expiration event occur, the timer set for an expected call progress event; and
processing the logical call handling events corresponding to the raw call progress signaling information and the NGTN message information.

20. The computer readable medium of claim 19, wherein generating logical call handling events from the raw call progress signaling information further comprises:
 updating the current call status associated with the call progress event;
 enabling a new timer when there is an expected call progress event; and
 waiting for a next call progress event to occur.

21. A computer readable medium containing instructions which, when executed in a processing system, causes the processing system to perform a method for determining and monitoring status of calls in a network, comprising:
 sensing a raw call progress signaling information from one or more subscriber or PSTN network circuits;
 sensing a next generation telephony network (NGTN) message information from a NGTN call control channel of a network element;
 generating logical call handling events from the raw call progress signaling information and from the NGTN message information, wherein generating logical call handling events from the NGTN message information comprises:
  converting the NGTN message information into the logical call handling event;
  setting the elapsed time event to be the time between the NGTN message event and a most recent NGTN message event; and
  determining if the timer expiration event occur, the timer set for an expected NGTN message event; and
 processing the logical call handling events corresponding to the raw call progress signaling information and the NGTN message information.

22. The computer readable medium of claim 21, wherein generating logical call handling events from the NGTN message information further comprises:
 updating the current call status associated with the NGTN message event;
 enabling a new timer when there is an expected NGTN message event; and
 waiting for a next NGTN message event to occur.

23. A computer readable medium containing instructions which, when executed in a processing system, causes the processing system to perform a method for determining and monitoring status of calls in a network, comprising:
 sensing a raw call progress signaling information from one or more subscriber or PSTN network circuits;
 sensing a next generation telephony network (NGTN) message information from a NGTN call control channel of a network element;
 generating logical call handling events from the raw call progress signaling information and from the NGTN message information; and
 processing the logical call handling events corresponding to the raw call progress signaling information and the NGTN message information by analyzing the logical call handling event, the timer expiration event, the elapsed time event, and the current call status such that when an error condition occurs an alarm is generated; maintaining the current call status corresponding to the call progress event and to the NGTN message event; providing call records and analysis information associated with the call progress event and the NGTN message event to external display devices; generating call status and call handling error information corresponding to the call progress event and to the NGTN message event; accumulating alarm counts; and triggering an alarm message to external network management systems when the alarm counts exceed a defined threshold.

* * * * *